US012764025B2

(12) United States Patent
Desanti et al.

(10) Patent No.: US 12,764,025 B2
(45) Date of Patent: Oct. 13, 2026

(54) TOPOLOGIES FOR SCALE-OUT FABRICS

(71) Applicant: DELL PRODUCTS L.P., Round Rock, TX (US)

(72) Inventors: Claudio Desanti, Santa Cruz, CA (US); Joseph Lasalle White, San Jose, CA (US)

(73) Assignee: DELL PRODUCTS L.P.

( * ) Notice: Subject to any disclaimer, the term of this patent is extended or adjusted under 35 U.S.C. 154(b) by 13 days.

(21) Appl. No.: 19/041,990

(22) Filed: Jan. 30, 2025

(65) Prior Publication Data

US 2026/0222300 A1 Jul. 30, 2026

(51) Int. Cl.
*H04L 41/12* (2022.01)
*H04L 12/40* (2006.01)

(52) U.S. Cl.
CPC ........ *H04L 41/12* (2013.01); *H04L 12/40006* (2013.01)

(58) Field of Classification Search
None
See application file for complete search history.

(56) References Cited

U.S. PATENT DOCUMENTS

2021/0288921 A1* 9/2021 Levy .................... H04L 49/1515
2021/0320820 A1* 10/2021 Ruan .................... H04L 12/4633
2024/0195778 A1* 6/2024 Mahalingam ........... H04L 47/33
2026/0128793 A1* 5/2026 Castro .................. H04B 10/272

OTHER PUBLICATIONS

Mandakolathur, Karthik and Jeaugey, Sylvain, "Doubling all2all Performance with NVIDIA Collective Communication Library 2.12," NVIDIA Technical Blog, Feb. 28, 2022, available at https://developer.nvidia.com/blog/doubling-all2all-performance-with-nvidia-collective-communication-library-2-12/.NVIDIA Developer+3NVIDIADeveloper+3 (14 pages).

* cited by examiner

*Primary Examiner* — June Sison
(74) *Attorney, Agent, or Firm* — BAUGH LAW, LLC

(57) ABSTRACT

Recently, there has been a dramatic increase in the development and use of machine learning and artificial intelligence (ML/AI) applications. The exponentially growing complexity of ML/AI models and their voracious data needs have created needs for large but well-designed data centers—even the network topology needs to be critically considered. Presented herein are embodiments of topologies for data center system that comprise both a high bandwidth scale-up fabric and a scale-out fabric. In one or more embodiments, the scale-out fabric may comprise as many rails as allowed by the radix of the switch (i.e., 36 rails for 64-port switches and 72 rails for 128-port switches), and in one or more embodiments, the rails preferably span a minimum number of tiers as possible and reserve the upper tier for the rail crossing function. If the last tier is used for the rail crossing function, it may be oversubscribed.

20 Claims, 53 Drawing Sheets
(44 of 53 Drawing Sheet(s) Filed in Color)

Rail-Optimized Topology

300A

300B

Top-of-Rack (TOR) Wired Clos Topology

Pure Rail Topology

Rail-Optimized Topology

700

- 1 RailPod, 1152 GPUs
- 118 Switches
  - 64 Leaf switches
  - 36 Spine switches
  - 18 SuperSpines

800B

- 16 x NVL72 = 1152 GPUs
- 68 Switches
  - 36 Leaf switches
  - 32 Spine switches

1300A

1300B

- 8 x NVL72 = 576 GPUs
- 68 Switches
  - 18 Leaf switches
  - 16 Spine switches

1700

2200

- 2 RailPods, 1152 GPUs
- 104 Switches
    - 36 Leaf switches
    - 36 Spine switches
    - 32 SuperSpine switches

| Scale | NVIDIA with QM9700 | | Embodiments with QM9700 | | |
|---|---|---|---|---|---|
| | # of Switches | # of Tiers | # of Switches | # of Tiers | Reference |
| 18432 GPUs | 1888 | 3 | 1664 | 3 | **FIG. 21** |
| 9216 GPUs | 944 | 3 | 832 | 3 | **FIG. 18** |
| 4608 GPUs | 472 | 3 | 416 | 3 | **FIG. 25** |
| 2304 GPUs | 236 | 3 | 208 | 3 | **FIG. 26** |
| 1728 GPUs | – | – | 86 | 2 | **FIG. 27** |
| 1152 GPUs | 118 / 82 | 3 / 2 | 68 | 2 | **FIG. 28** |
| 576 GPUs | 41 | 2 | 34 | 2 | **FIG. 29** |
| 288 GPUs | 22 | 2 | 17 | 2 | **FIG. 30** |
| 144 GPUs | - | - | 9 | 2 | **FIG. 31** |

FIG. 24

- 2 Racks, 144 GPUs
- 9 Switches
  - 6 Leaf switches
  - 3 Spine switches

| Scale | NVIDIA with | | Embodiments with QM9700 switches | | | Embodiments with Z9664 switches | | |
|---|---|---|---|---|---|---|---|---|
| | # of Switches | # of Tiers | # of Switches | # of Tiers | Reference | # of Switches | # of Tiers | Reference |
| 36864 GPUs | --- | | --- | | | 3328 | 3 | **FIG. 33** |
| 18432 GPUs | 1888 | 3 | 1664 | 3 | **FIG. 21** | 1664 | 3 | - |
| 9216 GPUs | 944 | 3 | 832 | 3 | **FIG. 18** | 832 | 3 | - |
| 4608 GPUs | 472 | 3 | 416 | 3 | **FIG. 25** | 416 | 3 | - |
| 2304 GPUs | 236 | 3 | 208 | 3 | **FIG. 26** | 208 | 3 | **FIG. 34** |
| 1728 GPUs | – | – | 86 | 2 | **FIG. 27** | - | - | - |
| 1152 GPUs | 118 / 82 | 3 / 2 | 68 | 2 | **FIG. 28** | 68 | 2 | **FIG. 35** |
| 576 GPUs | 41 | 2 | 34 | 2 | **FIG. 29** | 34 | 2 | **FIG. 36** |
| 288 GPUs | 22 | 2 | 17 | 2 | **FIG. 30** | 17 | 2 | **FIG. 37** |

FIG. 32

- 16 racks, 1152 GPUs
- 208 Switches
  - 36 Leaves
  - 36 Spines

"-" = Z9664 switch

72 Intra-Rack DAC Cables may be used

| | NVIDIA Topology (OSFP – QM9700) | Embodiment Topology (OSFP – QM9700) |
|---|---|---|
| Latency / Traffic Management | 3 hops for Intra-Pod communications<br>5 hops for Inter-Pod communications | 1 hop for Intra-Pod communications<br>3 hops for Inter-Pod communications |
| Number of Switches<br>Leaves / Spines / Superspines | **844**<br>**448 / 252 / 144** | 428<br>**252 / 144 / 32** |
| Scale-out Fabric Racks | **65** | 22 |
| Fabric Transceivers | 8064 (twin) | 8064 (twin) |
| Fabric optical cables | 8064 | 8064 |
| Fabric DACs | **4032 (twin)** | **576 (twin)** |

FIG. 42

4300

| | Dell Embodiments | | | | NVIDIA | | | |
|---|---|---|---|---|---|---|---|---|
| Scale (# of GPUs) | Superspines | Spines | Leaves | Total | Superspines | Spines | Leaves | Total |
| 288 | – | 2 | 9 | 11 | – | 6 | 16 | 22 |
| **504** | – | 2 | 9 | **11** | – | – | – | – |
| 576 | – | 3 | 18 | 22 | – | 9 | 32 | 41 |
| **1008** | – | 4 | 18 | **22** | – | – | – | – |
| 1152 | – | 5 | 36 | 42 | – | 18 | 64 | 82 |
| **2016** | – | 8 | 36 | **44** | – | – | – | – |
| **2304** | 16 | 72 | 72 | 160 | 36 | 72 | 128 | 236 |
| 3456 | 16 | 72 | 108 | 196 | 72 | 108 | 192 | 372 |
| **4032** | 16 | 72 | 126 | **214** | – | – | – | – |
| **4608** | 32 | 144 | 144 | 320 | 72 | 144 | 256 | 472 |
| 5760 | 32 | 144 | 180 | 356 | 144 | 180 | 320 | 644 |
| 6912 | 32 | 144 | 216 | 392 | 144 | 216 | 384 | 744 |
| **8064** | **32** | **144** | **252** | **428** | **144** | **252** | **448** | 844 |
| 9216 | 64 | 288 | 288 | 640 | 144 | 288 | 512 | 944 |
| **10368** to **16128** | 64 | 288 | 324 to 504 | **676** to **856** | 288 | 324 to 504 | 576 to 896 | 1188 to 1688 |
| 17280 to 18432 | 128 | 576 | 540 to 576 | 1244 to 1280 | 288 | 540 to 576 | 960 to 1024 | 1788 to 1888 |
| **19584 to 32254** | 128 | 576 | 612 to 1008 | 1326 to 1712 | – | – | – | – |

FIG. 43

$72 = 2^3 \times 3^2$

4505

| # of GPU Rails mapped to a Network Rail | # of Network Rails |
|---|---|
| $2^3 \times 3^2 = 72$ | 1 |
| $2^2 \times 3^2 = 36$ | 2 |
| $2^3 \times 3^1 = 24$ | 3 |
| $2^1 \times 3^2 = 18$ | 4 |
| $2^2 \times 3^1 = 12$ | 6 |
| $2^0 \times 3^2 = 9$ | 8 |
| $2^3 \times 3^0 = 8$ | 9 |
| $2^1 \times 3^1 = 6$ | 12 |
| $2^2 \times 3^0 = 4$ | 18 |
| $2^0 \times 3^1 = 3$ | 24 |
| $2^1 \times 3^0 = 2$ | 36 |
| $2^0 \times 3^0 = 1$ | 72 |

4510

4515

4800

TOPOLOGIES FOR SCALE-OUT FABRICS

BACKGROUND

A. Technical Field

The present disclosure relates generally to information handling systems. More particularly, the present disclosure relates to network topologies.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The ever-increasing development and use of machine learning and artificial intelligence (ML/AI) applications has created a dramatic increase in demand for computing resources and processing resources. Graphics processing units, with their specially designed architectures, are particularly well suited for use in ML/AI applications—both training and inferencing. With increasingly complex ML/AI models, more and more processing systems are needed.

Thus, the exponentially growing complexity of ML/AI models and their ever-growing voracious need for data have created needs for data centers with vast numbers of processing units and supporting infrastructure. The supporting infrastructure, including information handling systems, such as network switches, and cabling, have also become more complex and more closely tied to the ML/AI deployment. For example, in addition to needing large numbers of complex processing information handling systems, aspects such as physical placement, type of cabling, and network topology should be considered. Because of the staggering number of computation operations that are involved in most modern ML/AI applications, even a small fraction of a second delay in processing aggregates into a significant amount.

Accordingly, it is highly desirable to find new, more efficient ways to structure the topology of data centers, particularly those used in high-computation environments, such as ML/AI applications.

BRIEF DESCRIPTION OF THE DRA WINGS

The patent or application file contains at least one drawing executed in color. Copies of this patent or patent application publication with color drawing(s) will be provided by the Office upon request and payment of the necessary fee.

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 24 comprises a table showing a comparison of different embodiments at different scales relative to the typical NVIDIA topology using the same switch (e.g., a QM9700 switch), according to embodiments of the present disclosure.

FIGS. 25-31 depict different topologies, according to embodiments of the present disclosure.

FIG. 32 comprises a table showing a comparison of different embodiments at different scales relative to the typical NVIDIA topology using the same switch (e.g., a Z9664 switch), according to embodiments of the present disclosure.

FIGS. 33-37 depict different topologies, according to embodiments of the present disclosure.

Figure 38:
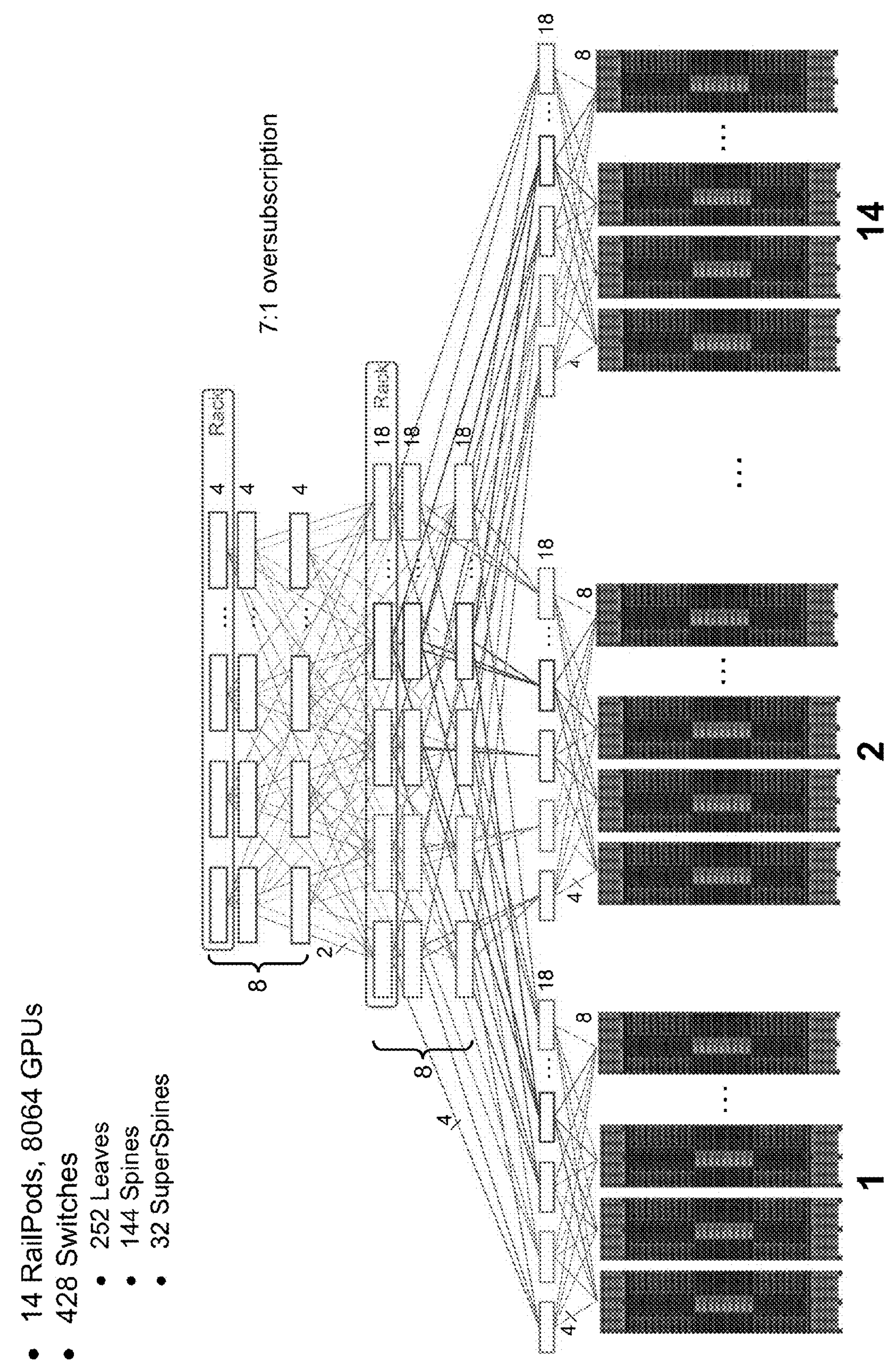

FIG. 38 depicts an example topology with oversubscription, according to embodiments of the present disclosure.

Figure 39:
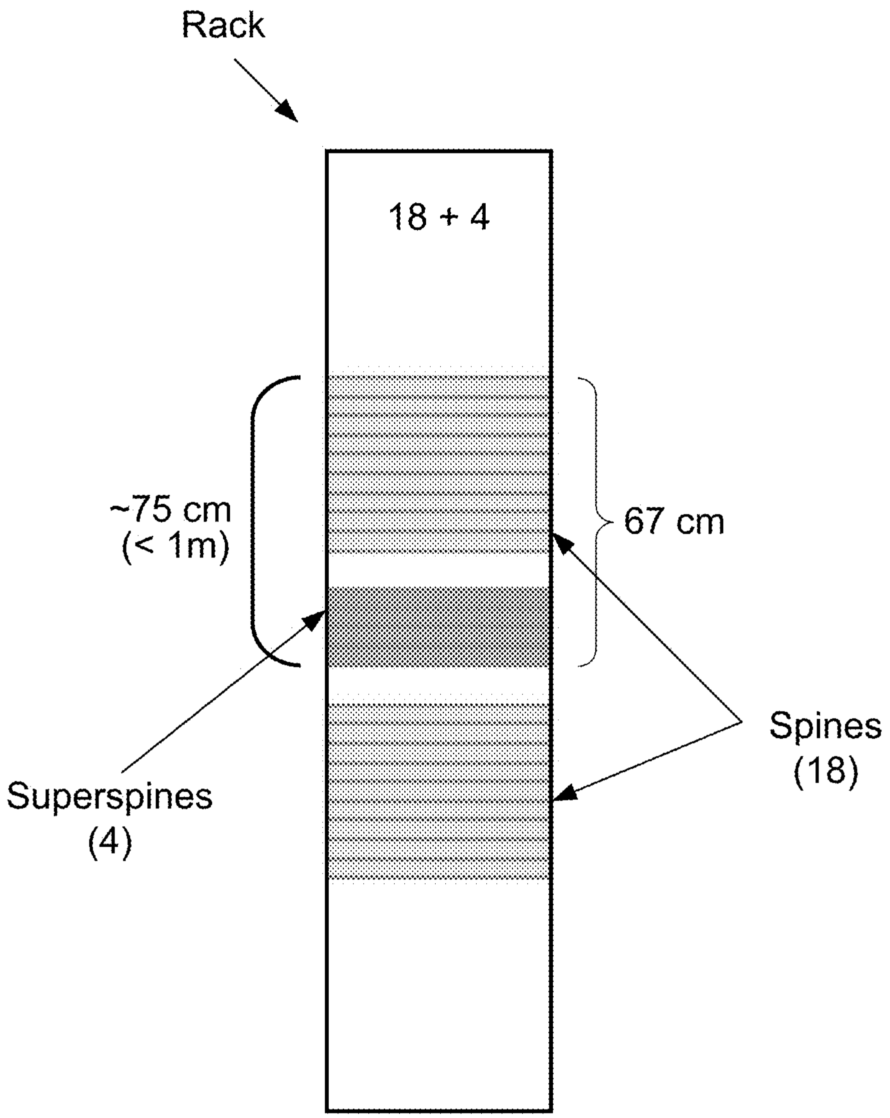

FIG. 39 depicts a possible racking solution for the spine and superspine switches, according to embodiments of the present disclosure.

Figure 40:
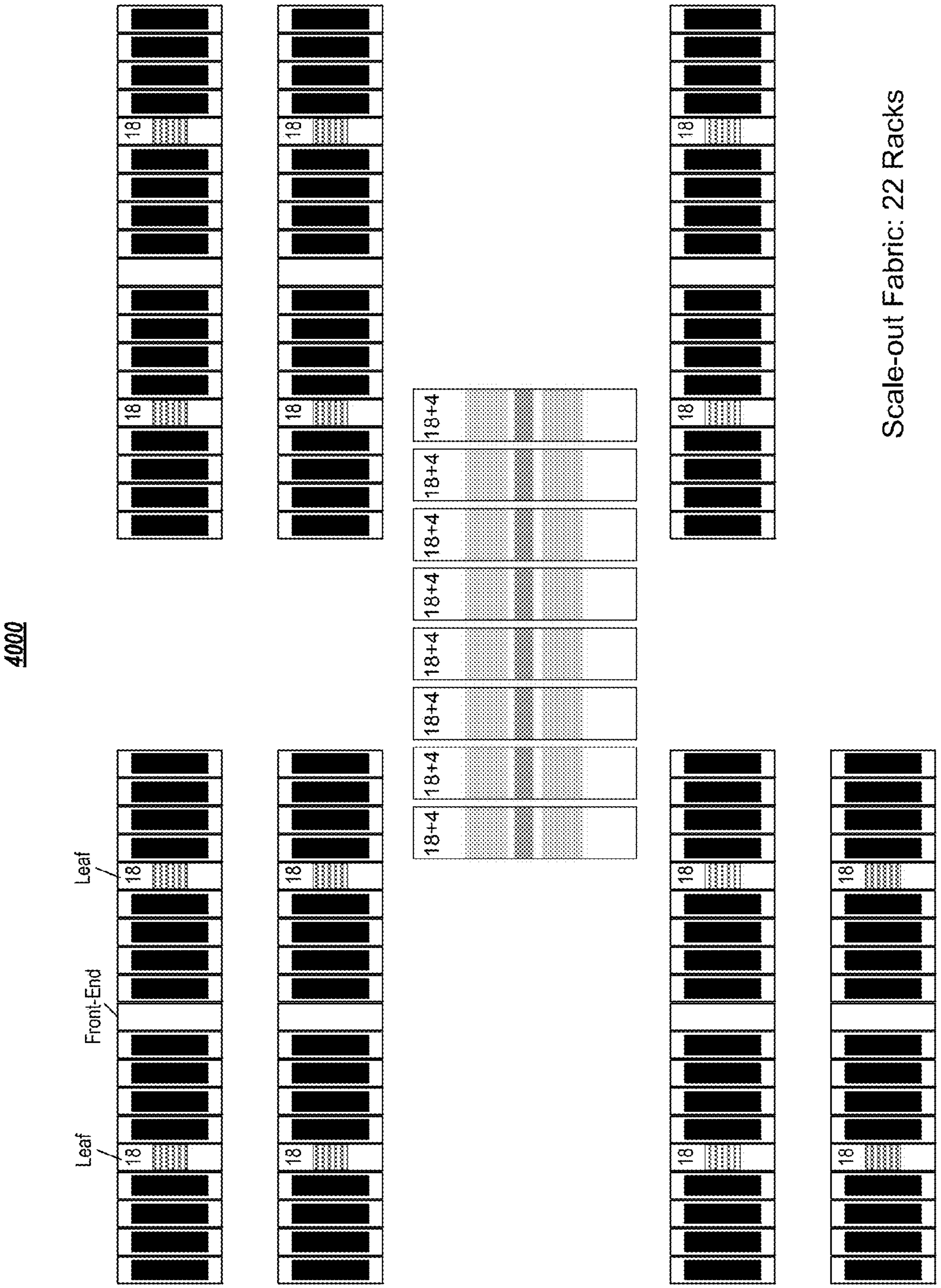

FIG. 40 depicts an example rack implementation, according to embodiments of the present disclosure.

Figure 41:
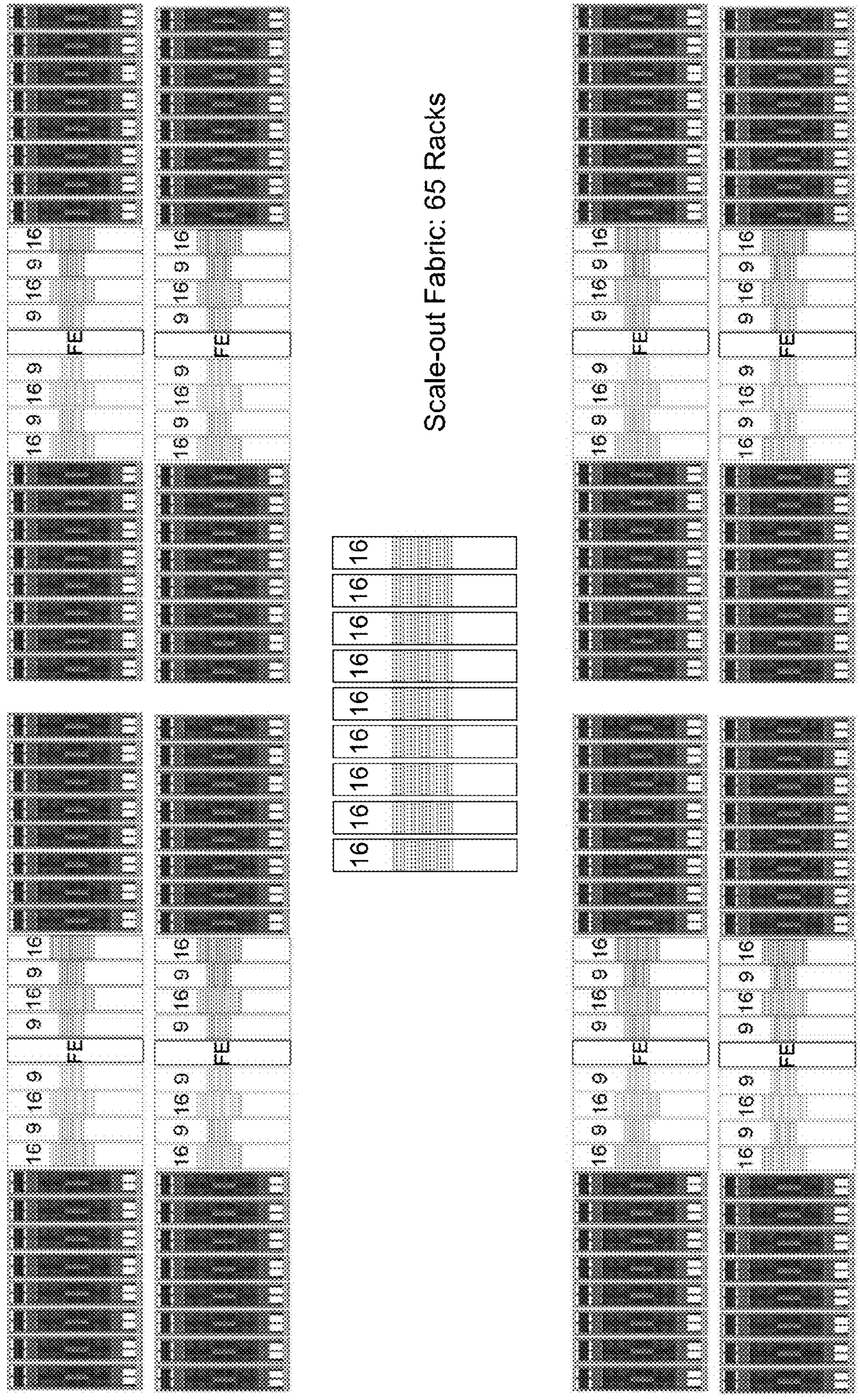

FIG. 41 depicts a rack implementation for an NVIDIA topology for a cluster comprising the same number of GPUs as in FIG. 38.

FIG. 42 comprises a table comparing two topologies, according to embodiments of the present disclosure.

FIG. 43 compares a number of different scale embodiments, according to embodiments of the present disclosure.

Figure 44:
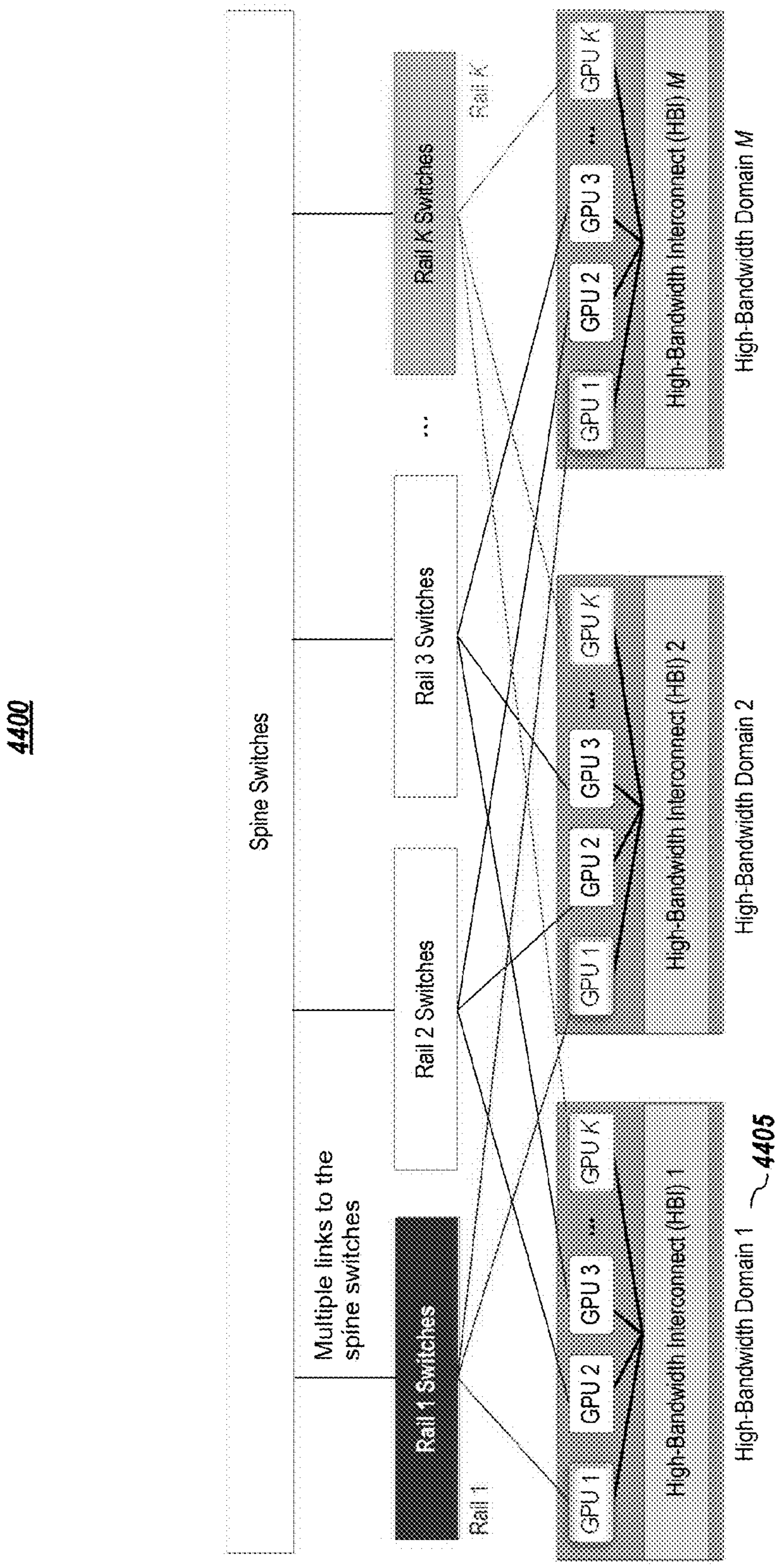

FIG. 44 depicts a cluster of GPUs that utilize network rails, according to embodiments of the present disclosure.

Figure 45:
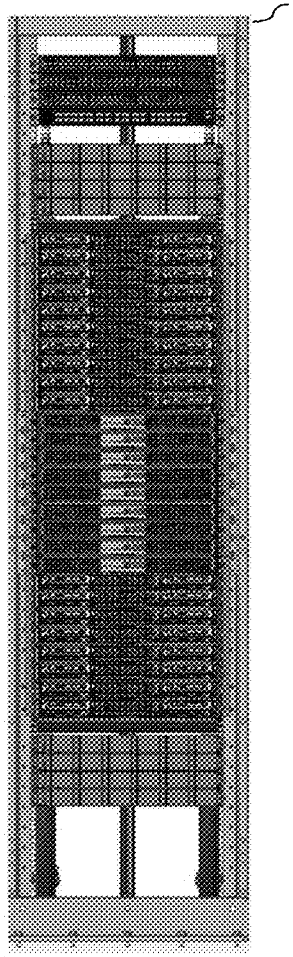

FIG. 45 illustrates a mismatch between the number of ports of a set of GPUs and the number of ports of switches, according to embodiments of the present disclosure.

Figure 46:
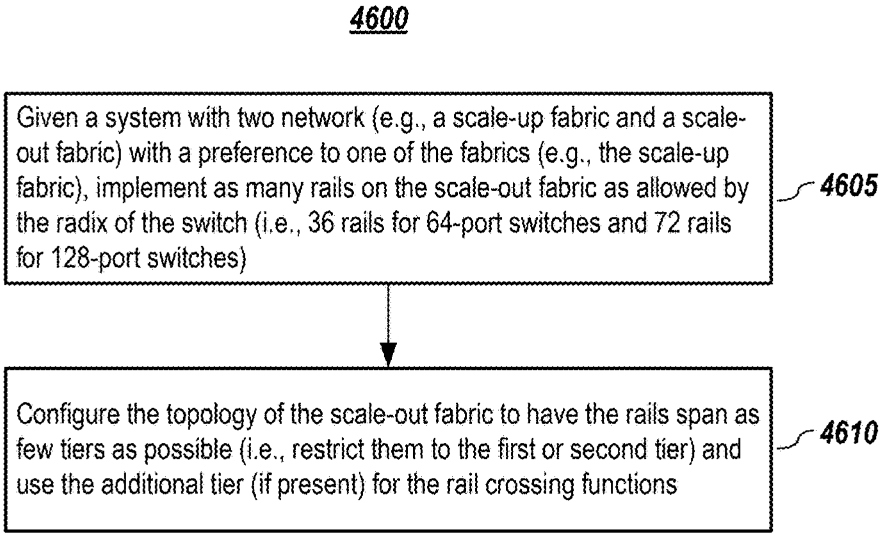

FIG. 46 depicts a methodology for configuring a topology, according to embodiments of the present disclosure.

Figure 47:
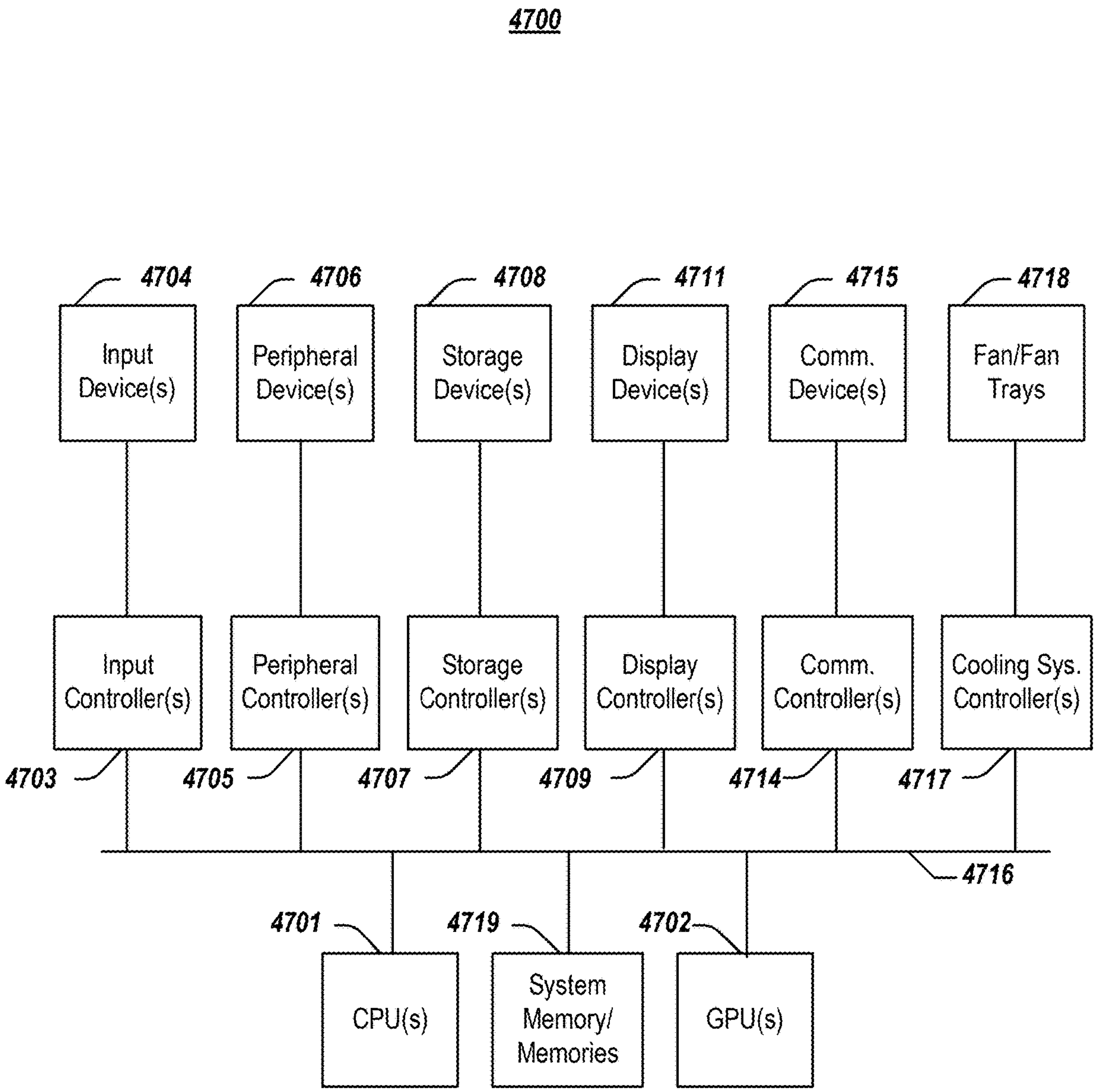

FIG. 47 depicts a simplified block diagram of an information handling system, according to embodiments of the present disclosure.

Figure 48:
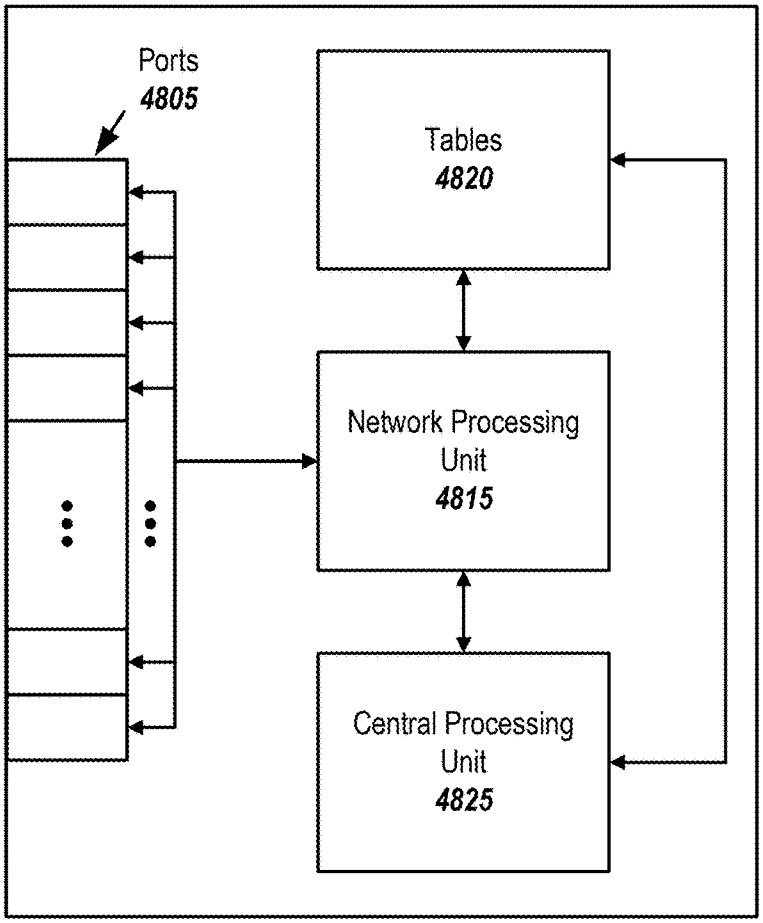

FIG. 48 depicts an alternative block diagram of an information handling system, according to embodiments of the present disclosure.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimized," "optimization," and the like refer to an improvement of an outcome or a process and do not require that the specified outcome or process has achieved an "optimal" or peak state. The current patent document may also interchangeably refer to "enhanced" embodiments as an alternative to "optimized" embodiments or topologies.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of ML/AI applications or NVL72 systems, aspects of the present disclosure are not so limited. Accordingly, the aspects of the present disclosure may be applied or adapted for use in other contexts.

A. General Introduction

Multiple entities, particularly those wanting to develop and/or deploy ML/AI applications, desire high density rack-scale graphics processing unit (GPU) solutions. One such system is the NVL72 system from Nvidia Corporation, a multinational corporation headquartered in Santa Clara, California.

Figure 1:
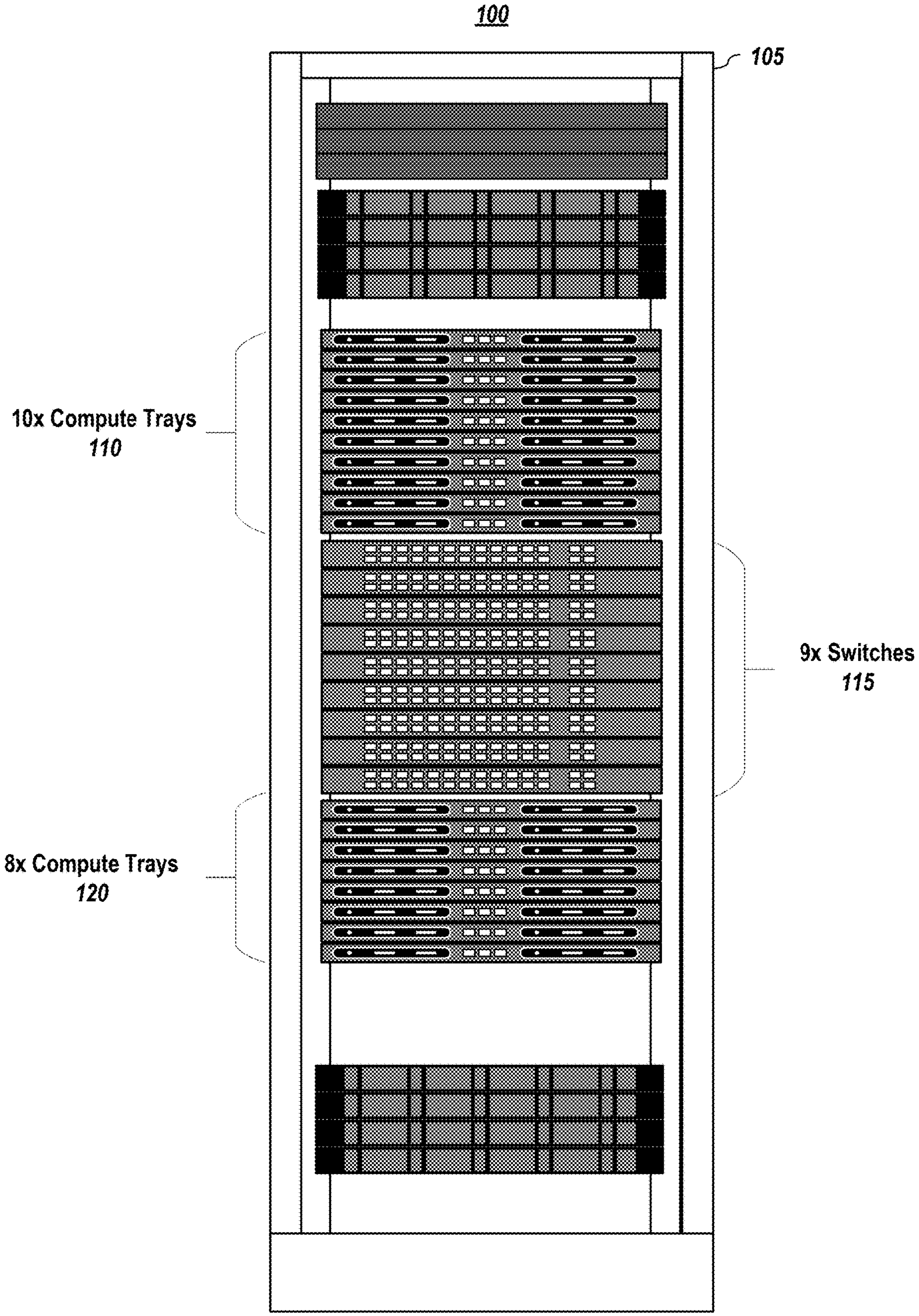
FIG. 1 ("FIG. 1") depicts an example NVL72 system from NVIDIA Corporation, according to embodiments of the present disclosure.

FIG. 1 depicts an example NVL72 system 100. The NVL72 system typically comprises eighteen (18) compute sleds (or trays) 110 and 120 and nine (9) switches 115 for data traffic processing—all housed within a rack 105. The system may comprise additional elements, such as power supplies, cooling system(s), redundancy system(s), additional processing information handling system(s), among other elements common to a network or data center rack.

Figure 2:
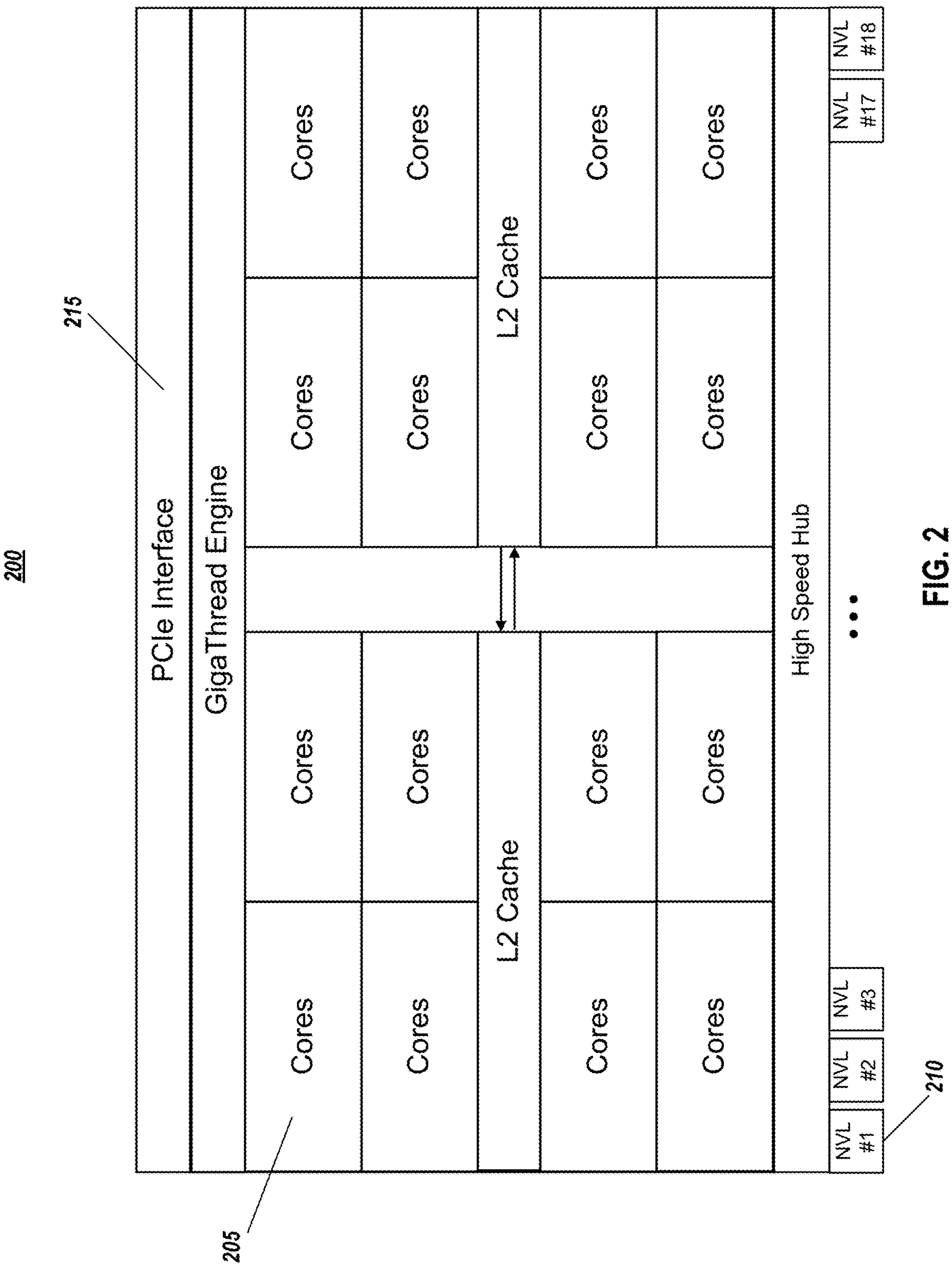
FIG. 2 depicts a simplified view of a typical GPU, such as an NVIDIA H100 by NVIDIA Corporation.

FIG. 2 depicts a simplified view of a typical GPU, such as an NVIDIA H100 by NVIDIA Corporation. The GPU depicted in FIG. 2 represents a high-performance accelerator designed primarily for artificial intelligence (AI), machine learning (ML), and high-performance computing (HPC) workloads. Such GPUs feature a significant performance boost in enhanced computational power, scalability, and energy efficiency. Some key features of the GPU 200 include:

- tensor cores 205 optimized for AI workloads, enabling faster training and inference for deep learning models;
- NVLinks with a high-speed hub 210 and PCIe Gen5 215 for high-bandwidth, low-latency communication, enabling efficient scaling across multiple GPUs;
- a hopper architecture, which introduces support for advanced operations like sparsity, further accelerating AI computations; and
- other supporting elements, such as L2 cache.

The GPU supports increased memory bandwidth and large memory capacity, allowing it to handle massive datasets and complex models. The PCIe interface(s) 215 provide interfaces for a "scale-out" fabric to connect to other systems and the NVLinks 210 provide interfaces for "scale-up" connectivity within the NVL72 unit.

Figure 3A:
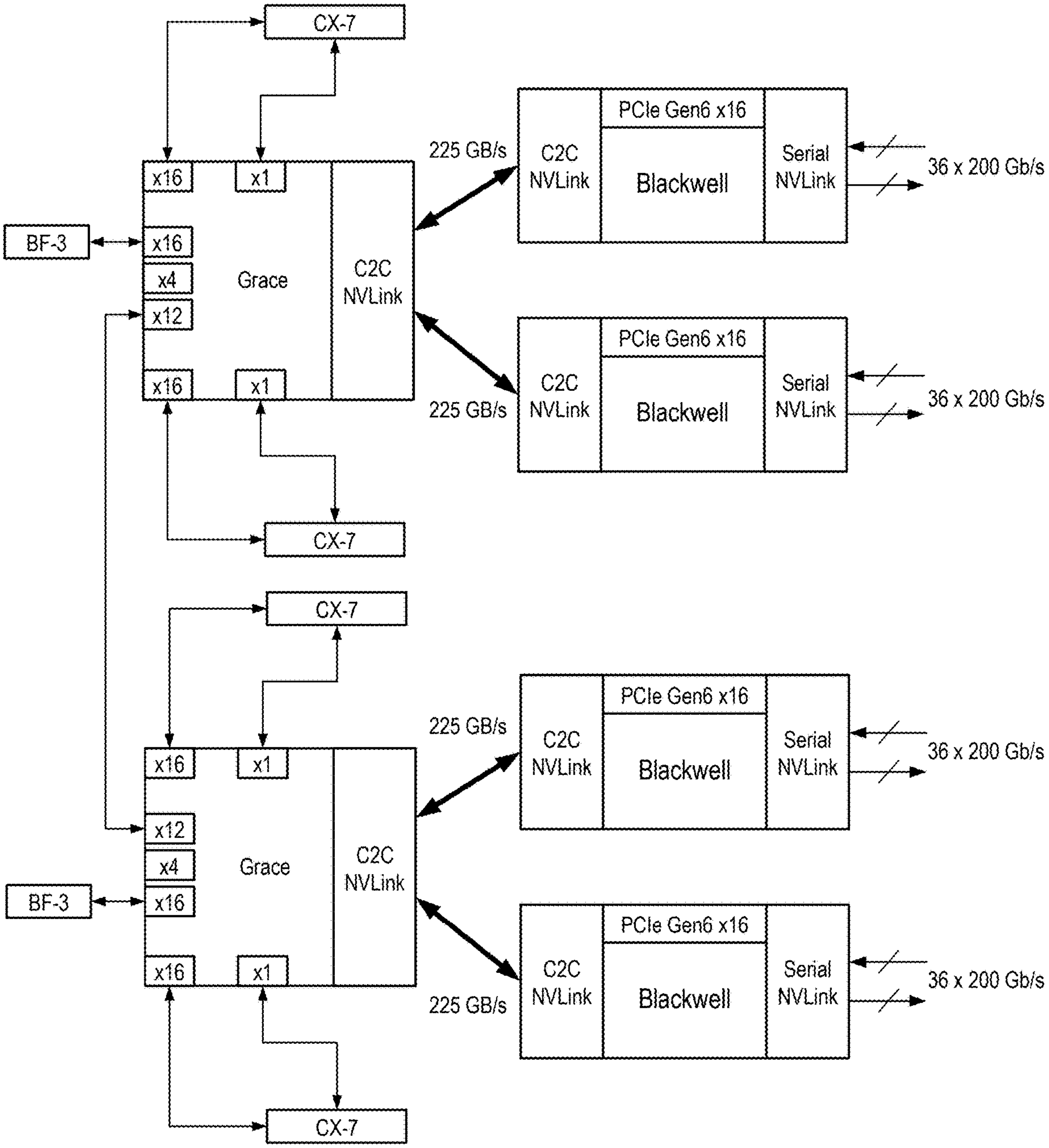
FIG. 3A depicts a compute sled containing four (4) Blackwell GPUs and two (2) Grace processors.
Figure 3B:
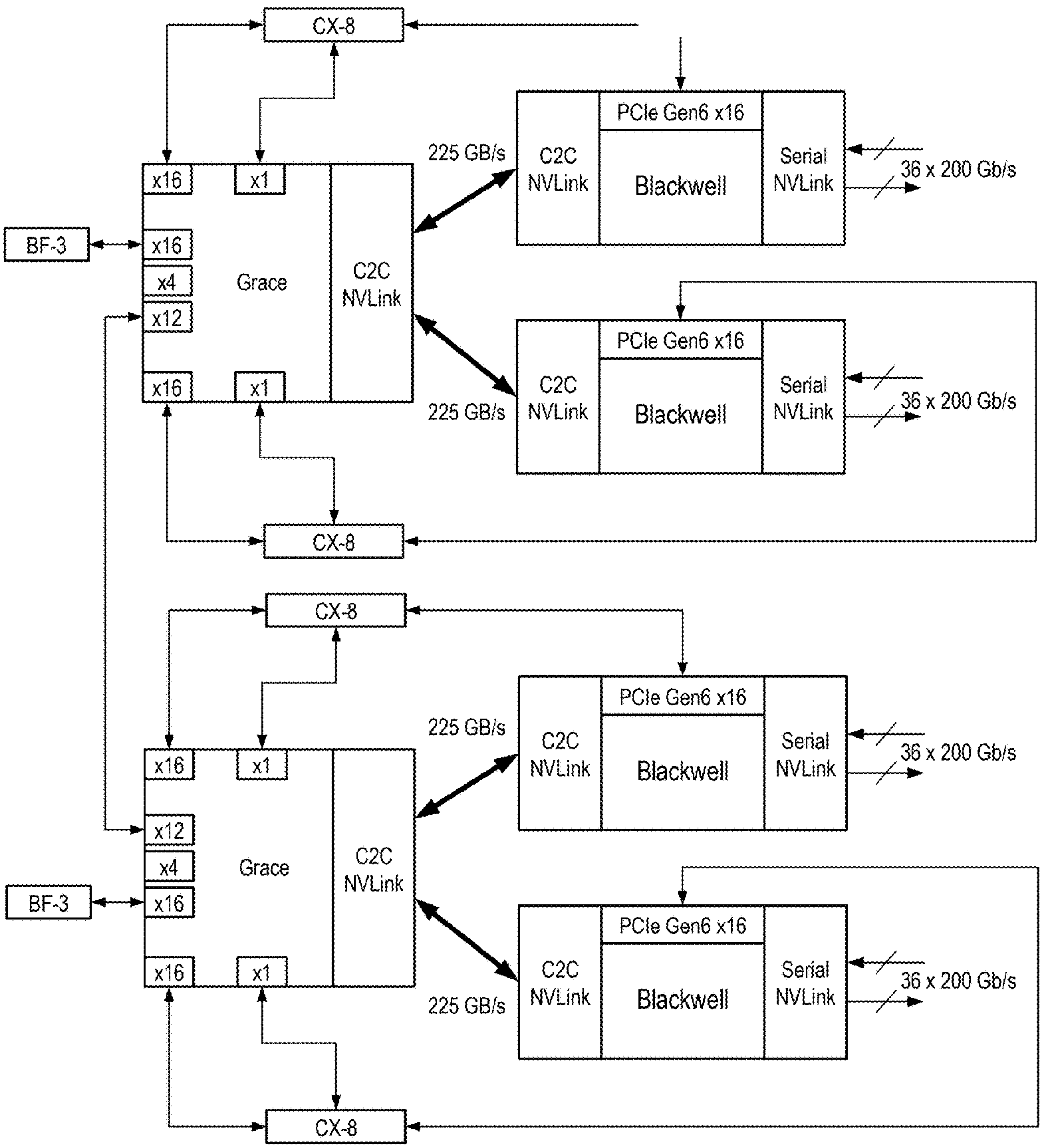
FIG. 3B depicts a different implementation of a compute sled containing four (4) Blackwell GPUs and two (2) Grace processors.

Each compute tray typically contains 4 Blackwell GPUs and two Grace processors, as shown in FIG. 3A and FIG. 3B. Each Grace processor typically supports a BlueField-3 (BF3) data processing unit (DPU) to connect to a front-end fabric and two network interface cards (NICs), each coupled with one GPU, to connect to a scale-out fabric. The NIC used currently is a 400 Gb/s CX-7 NIC, as shown in FIG. 3A; in the future, the CX-7 NICs will likely be replaced by 800 Gb/s CX-8 NICs that will be also directly connected to the Blackwell GPUs, as shown in FIG. 3B. Each Blackwell GPU is also directly connected to an NVLink-based scale-up fabric for high-bandwidth parameter exchanges among GPUs within the rack.

For the scale-out fabric topology, there are at least a few potential options.

Figure 4A:
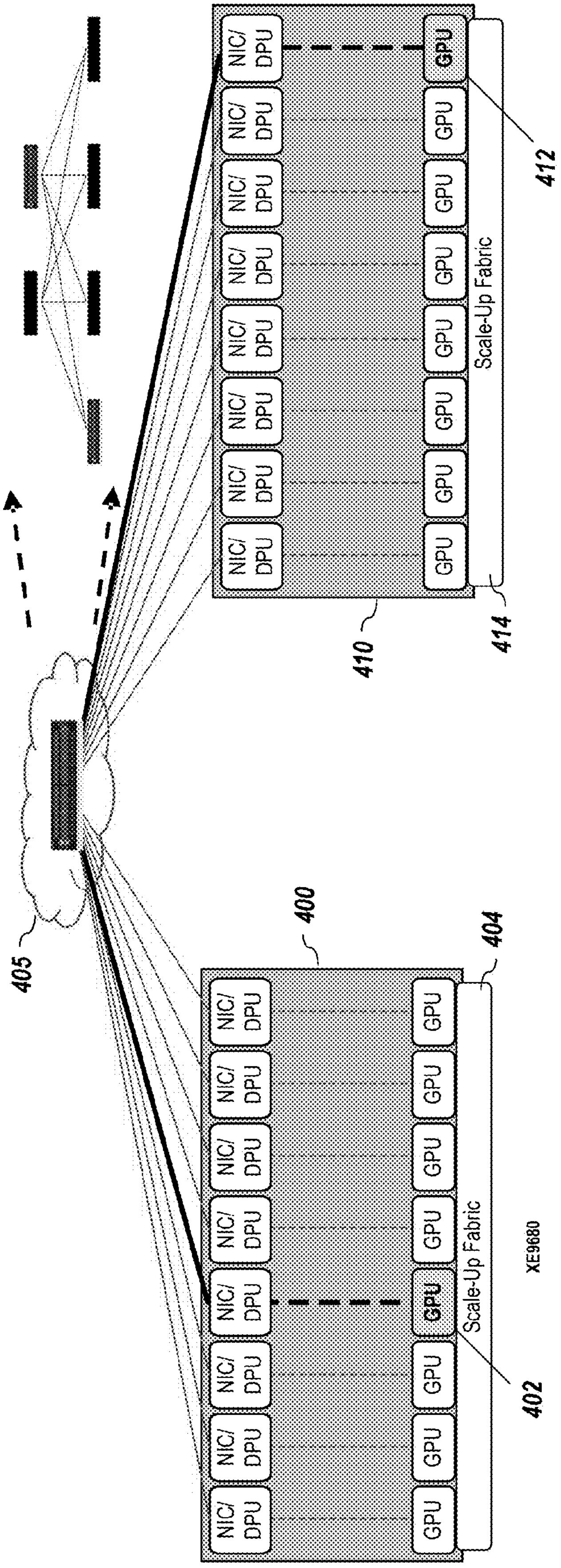
FIG. 4A depicts an example top-of-rack (TOR)-wired Clos topology.

FIG. 4A depicts a top-of-rack (TOR)-wired Clos topology. This topology allows direct scale-out fabric communication between any GPU pairs. For example, a GPU 402 in compute system 400 may communicate with a GPU 412 in another compute system 410 via the fabric 405. Note that the compute system's scale-up fabric 404/414 is not involved in the scale-out fabric communication.

Figure 4B:
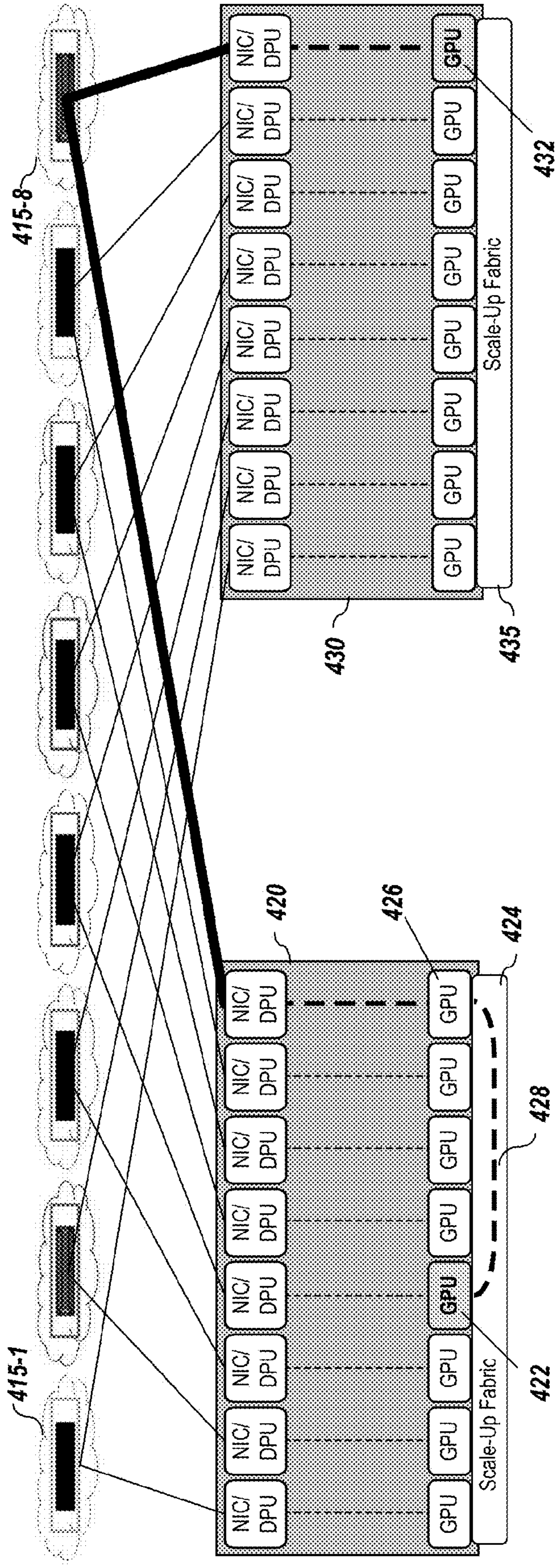
FIG. 4B depicts an example rail topology.

FIG. 4B depicts a rail topology. This topology comprises independent networks (or "rails")—in the depicted example, there are eight (8) rails 415-1 through 415-8. For a pure rail topology, direct scale-out fabric communication is between GPUs belonging to the same rail. For example, a GPU 426 in compute system 420 may communicate with a GPU 432 in another compute system 430 via the rail network 415-8. For a GPU of one compute system to communicate with a GPU of another compute system that are not members of the same rail network, the scale-up network is employed. For example, for GPU 422 in compute system 420 to communicate with GPU 432 in the compute system 430, GPU 422 communicates via the scale-up fabric 424 with its peer GPU 426, which in turn communicates with GPU 432 via the rail network 415-8.

Figure 4C:
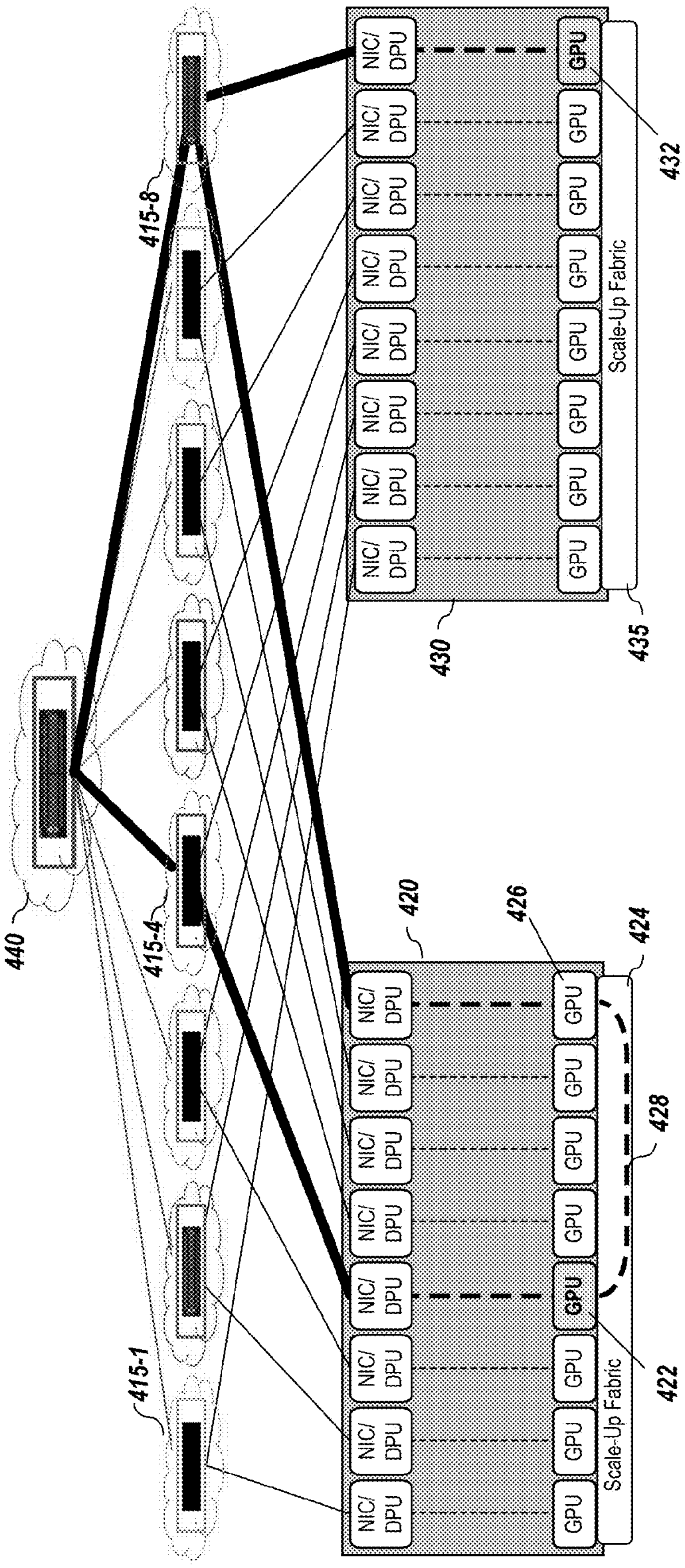
FIG. 4C depicts an example rail-optimized topology, according to embodiments of the present disclosure.

FIG. 4C depicts a rail-optimized topology, according to embodiments of the present disclosure. This topology comprises independent networks (or "rails"), similar to that of FIG. 4B, but the rails are interconnected by one or more upper tiers 440. This topology is similar to that of FIG. 4B, allowing the same data pathways as in FIG. 4B. However, in addition to the pathways of FIG. 4B, FIG. 4C also includes a direct scale-out fabric communication pathway between GPUs belonging to different rails when on different compute systems. For example, GPU 426 on compute system 420 has the same pathway via the scale-up fabric and scale-out fabric to communicate with GPU 432 on compute system 430 as depicted in FIG. 4B, but it also can communicate with GPU 432 via the scale-out fabric via rail 415-4, upper layer 440, and rail 415-8.

Figure 5:
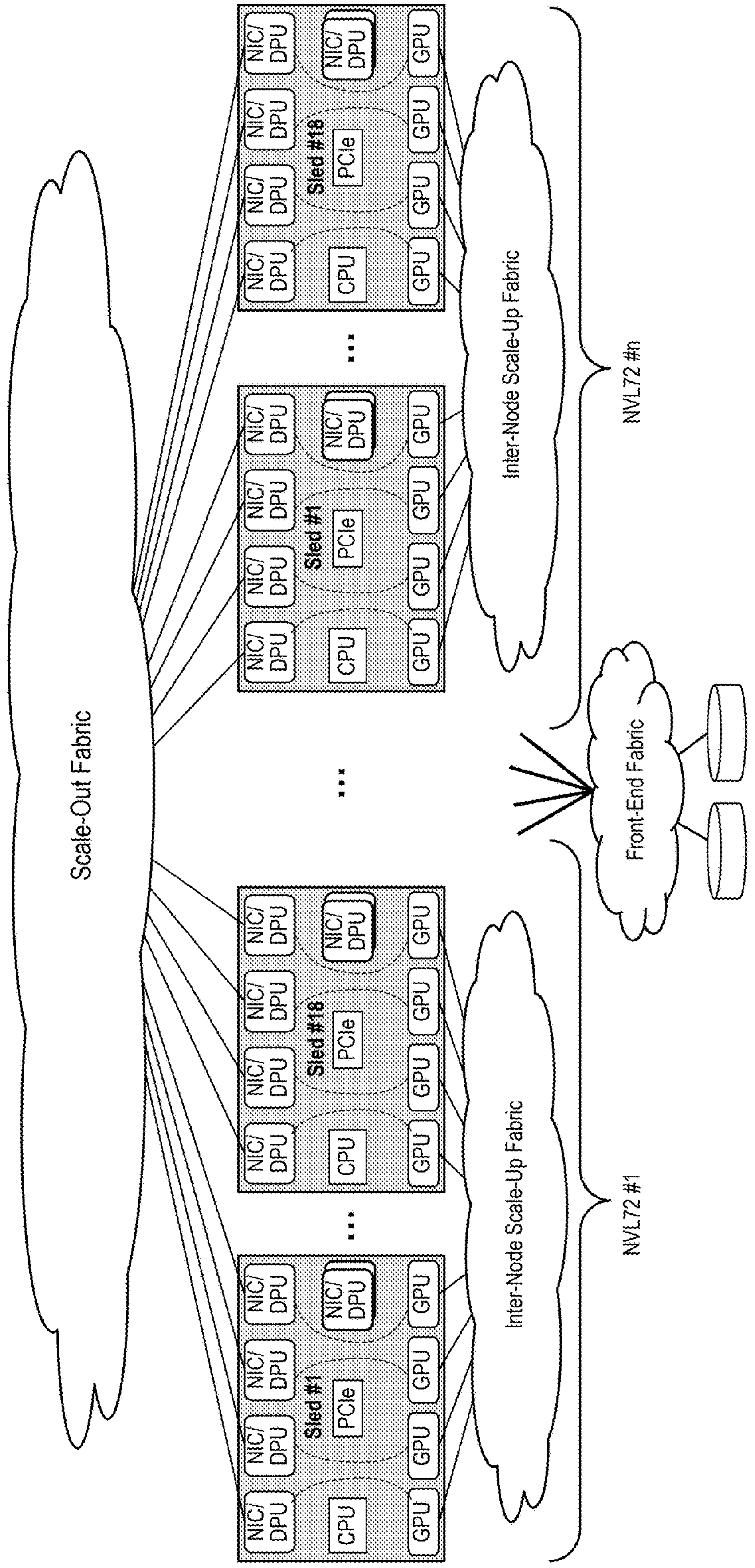
FIG. 5 depicts an NVL72 AI fabric model.

Typically, each Blackwell GPU is also directly connected to an NVLink-based scale-up fabric for high-bandwidth parameter exchanges among GPUs within the rack. A corresponding NVL72 AI fabric model 500 is shown in FIG. 5.

It should be noted that there is a benefit to communicating via the scale-up fabric. The GPU trays comprise PXN (PCI×NVLink), which is an NCCL feature that enables a GPU to communicate with a NIC on the node through NVLink and then PCI. NCCL, which stands for NVIDIA Collective Communications Library, is a high-performance library developed by NVIDIA that provides optimized implementations of collective communication operations for distributed deep learning, multi-GPU, and multi-node applications. It is designed to help developers and researchers efficiently scale their workloads across multiple GPUs, compute systems, or nodes in high-performance computing (HPC) and machine learning environments.

NCCL enables fast and efficient communication between GPUs, leveraging the high bandwidth and low latency of NVIDIA's interconnect technologies like NVLink and PCIe. It simplifies the process of parallelizing machine learning tasks by handling the complex communication patterns required for distributed training, such as data parallelism. NCCL also provides optimized implementations of common collective communication operations used in AI/ML applications, such as: (1) AllReduce: Combines data across all participating devices and shares the result (typically used for aggregating gradients in distributed deep learning); (2) AllGather: Gathers data from all devices and concatenates it across all participating devices; (3) Broadcast: Distributes data from one device to all other devices; (4) Reduce: Combines data from multiple devices into one (e.g., summing gradients across devices); and (5) ReduceScatter: Splits and reduces data across multiple devices.

NCCL can also efficiently manage communication between GPUs within a single node or across multiple nodes in a distributed system. It supports multi-GPU configurations on a single machine, as well as cross-node communication, which is helpful for scaling large deep learning models. NCCL is configured to take full advantage of NVIDIA's hardware features, including NVLink, NVSwitch, and InfiniBand for fast inter-GPU and inter-node communication. Additionally, the library supports efficient peer-to-peer communication between GPUs, which reduces the overhead of using the CPU or system memory as an intermediary. This is particularly beneficial for high-throughput operations like deep learning model training. Finally, NCCL includes features like dynamic load balancing, which helps ensure efficient communication.

Concerning use of the scale-up fabric, with PXN, instead of preparing a buffer on its local memory for the local NIC to send, the GPU prepares a buffer on an intermediate GPU, writing to it through NVLink. In one or more embodiments, PXN leverages NVIDIA NVSwitch connectivity between GPUs to first move data on a GPU on the same rail as the destination, then send it to the destination without crossing rails. With PXN, all GPUs on a given node may move their data onto a single GPU for a given destination. This allows aggregating messages, enabling the remote GPU to send all messages as one as soon as they are all ready.

Given the configuration of a typical NVIDIA system and the rail-optimized configuration of FIG. 4C, several benefits may be achieved. A GPU may leverage two different communication interfaces: a scale-up interface and a scale-out interface. The scale-up interface has a bandwidth approximately an order of magnitude higher than the scale-out interface. To set up a collective operation, in one or more embodiments, a GPU may determine which interface to use based on the following methodology:

```
If (a path through its Scale-up interface is available)
  then {use the Scale-up interface}
else if (a path through its Scale-out interface is available)
  then {use the Scale-out interface}
else {fail}.
```

Selecting a path through the scale-out interface is possible in a rail-optimized topology, because network rails are interconnected (e.g., see FIG. 4C). That is, the NCCL continues to operate in case of a link failure. In contrast, selecting a path through the scale-out interface is not possible in a pure rail topology (e.g., see FIG. 4B), because network rails are isolated. In such a case, the NCCL will hang or stall in case of a link failure.

Thus, in one or more embodiments, a scale-out fabric that is configured in a rail-optimized topology is best, because both scale-out and scale-up fabrics are used by GPUs to exchange parameters, and the high bandwidth scale-up fabric is the preferred way to cross rails within a rack.

The NIC (e.g., a CX-7 or CX-8 NIC) used for scale-out fabric connectivity may be available in two variants, InfiniBand and Ethernet. For InfiniBand connectivity, the currently available 400 Gb/s switch from NVIDIA is the QM9700, having radix 64 (i.e., a total of 64 ports). Connecting the 72 scale-out ports in the NVL72 domain to a 64-port switch is an issue with multiple solution approaches. NVIDIA proposed a rail solution based on four rails, supporting a cluster of up to 18K GPUs, as shown in Table 1.

TABLE 1

NVIDIA Scale-out fabric Solution

| Cluster Size | Max cluster size ≤ 576 GPUs | 1152 GPUs ≤ Max cluster size ≤ 18432 GPUs |
|---|---|---|
| Scaling | Scale by adding NVL72 racks | Scale by adding 1152 GPUs Pods |
| Fabric topology | 8 Leaves, 6 Spines per rail<br>No SuperSpines | 16 Leaves, 9 Spines per rail<br>9 SuperSpines group |

Figure 6:
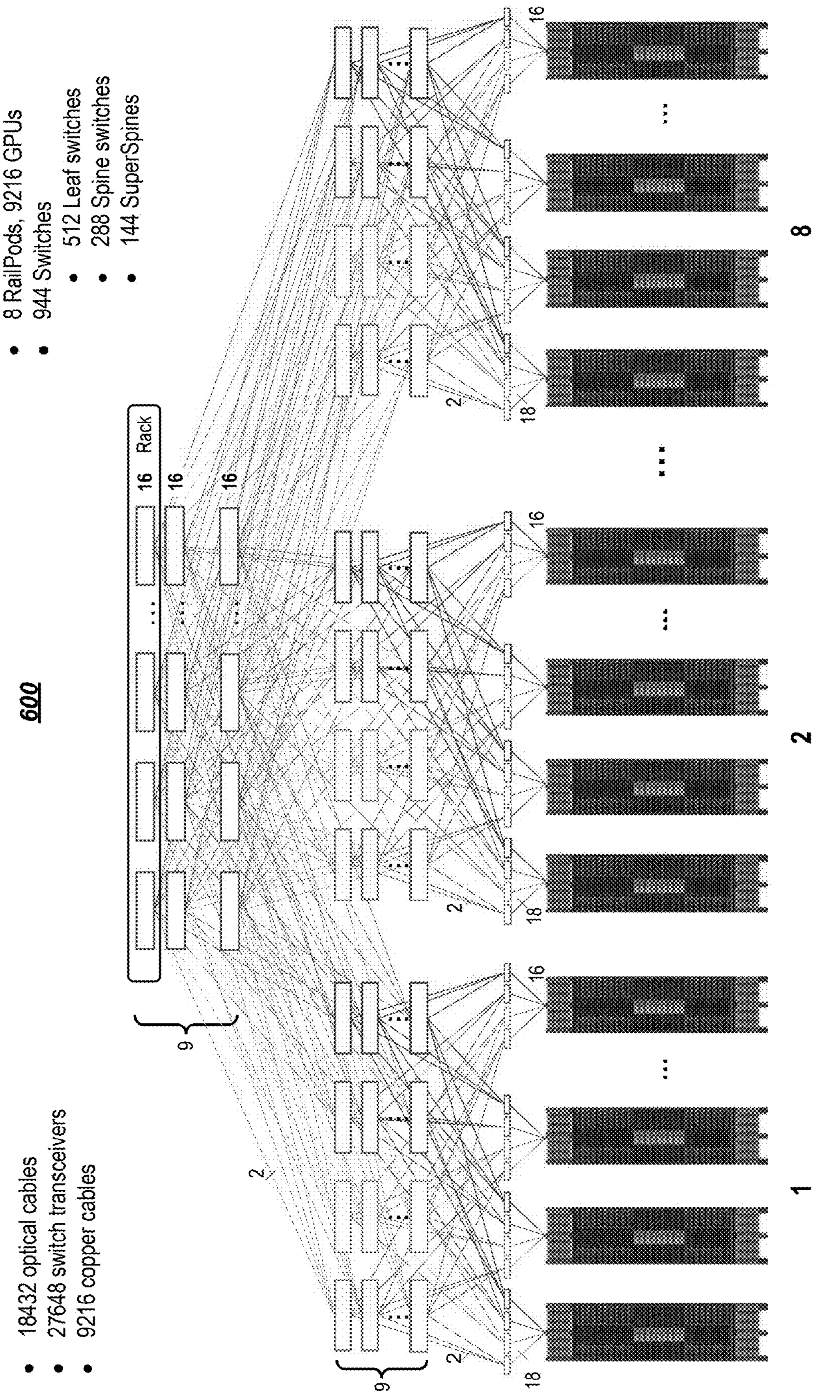
FIG. 6 shows an NVIDIA topology for a 9216 GPUs cluster, where there are four (4) rails.

As an example, FIG. 6 shows the NVIDIA topology for a 9216 GPUs cluster, where there are four rails (see the color version of FIG. 6, which indicates the separate rails). The NVL72 racks are organized in railpods, each composed of 16 racks. Each NVL72 rack is connected with 18 links to four leaf switches, one per each rail. Per each railpod, there are four groups of spine switches, each composed of nine switches. Within a rail, each leaf switch is connected to the nine spine switches with two links. The leaf switches are sparsely populated, with just 36 out of 64 ports used. Per each railpod, each of the nine rows of four spine switches is connected with a corresponding row of 16 superspine switches. Both spine and superspine switches are fully populated.

The topology shown in FIG. 6 requires 944 switches (e.g., QM9700 switches by NVIDIA) to be built. From a latency and traffic management point of view, it is not optimal, because all communications within a railpod require three hops (i.e., crossing a leaf, a spine, a leaf), and all communications within a rail require five hops (i.e., crossing a leaf, a spine, a superspine, a spine, a leaf).

Figure 7:
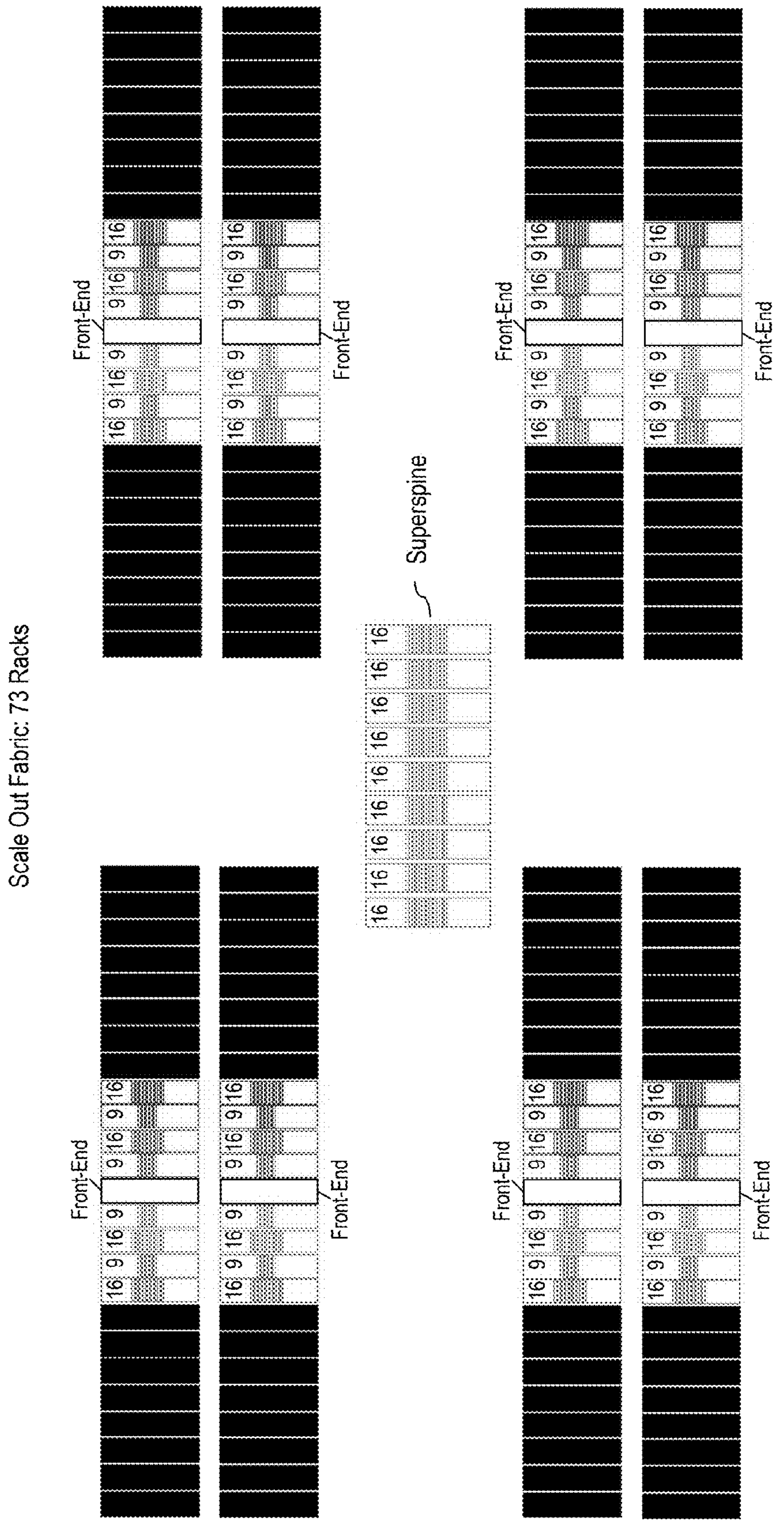
FIG. 7 shows a possible NVIDIA rack structure for 9216 GPUs, with eight (8) railpods supporting four (4) rails.

An advantage of this topology is that it allows for the co-location of spines and leaf switches of a rail in the same rack (or in two adjacent racks), enabling the use of cheaper copper-based DAC (direct attached copper) cables in place of more expensive optical cables and transceivers for the leaf to spine links, as shown in the possible rack design shown in FIG. 7. FIG. 7 shows a possible NVIDIA rack structure for 9216 GPUs, with eight (8) railpods supporting four (4) rails.

Using these configuration guidelines, the maximum scale fabric achievable with such a topology is a cluster of 18,432 GPUs. This cluster would be composed of 16 railpods (18432 GPUs) and 1888 switches (1024 leaf switches, 576 spine switches, and 288 superspine switches).

Figure 8A:
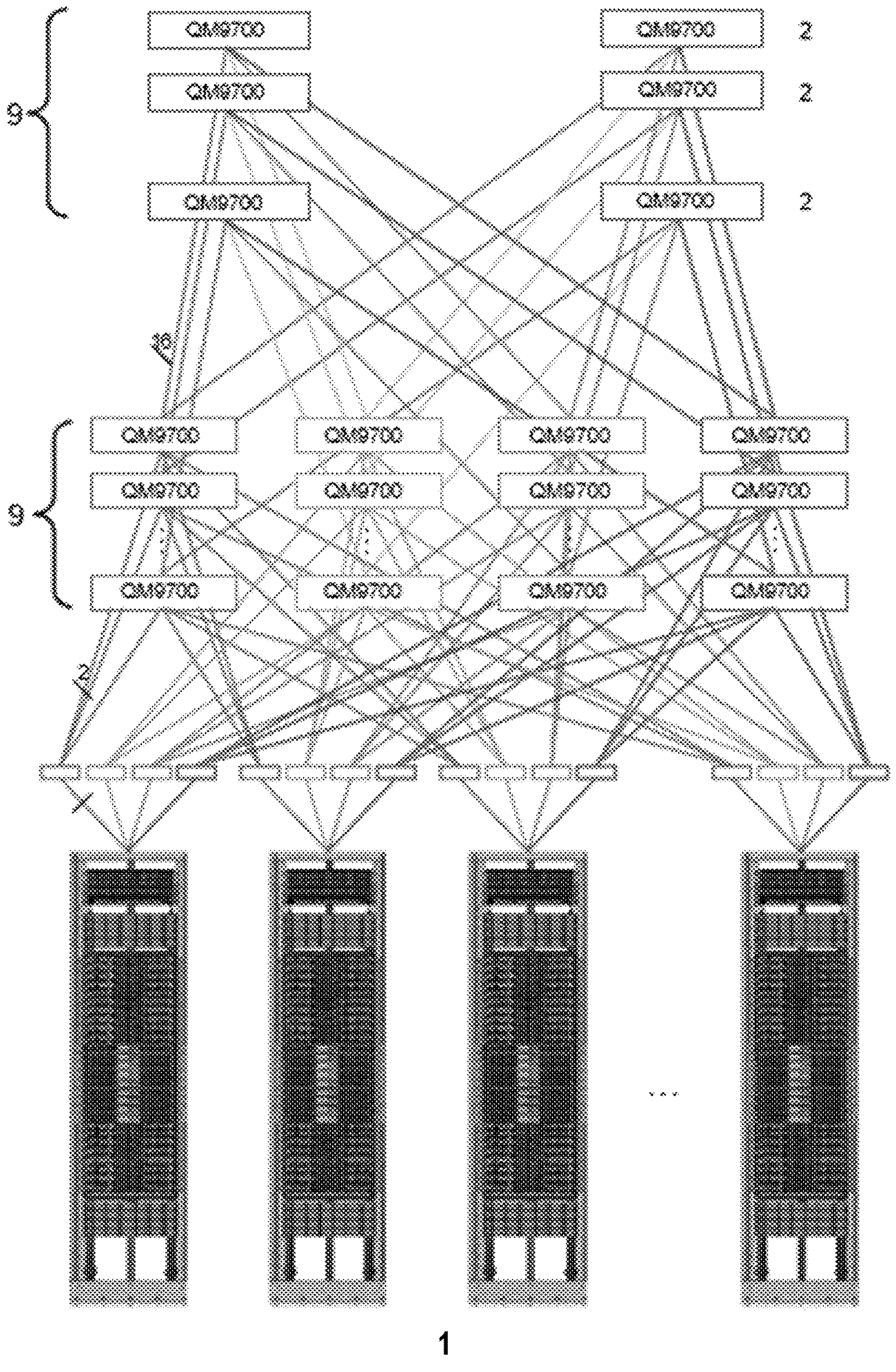
FIG. 8A shows the minimum scale fabric achievable topology of 1152 GPUs using the NVIDIA topology.
Figure 8B:
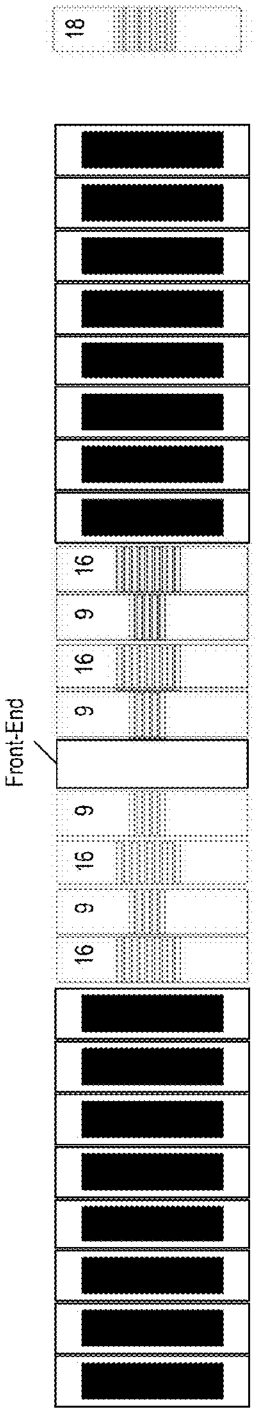
FIG. 8B depicts a possible racking solution for the topology of FIG. 8A.

Similarly, FIG. 8A shows the minimum scale fabric achievable with this topology-a cluster 800A of 1152 GPUs. FIG. 8B depicts a possible racking solution 800B for the topology of FIG. 8A. This cluster comprises one (1) railpod (1152 GPUs) and 118 switches (64 leaf switches, 36 spine switches, and 18 superspine switches).

Figure 9:
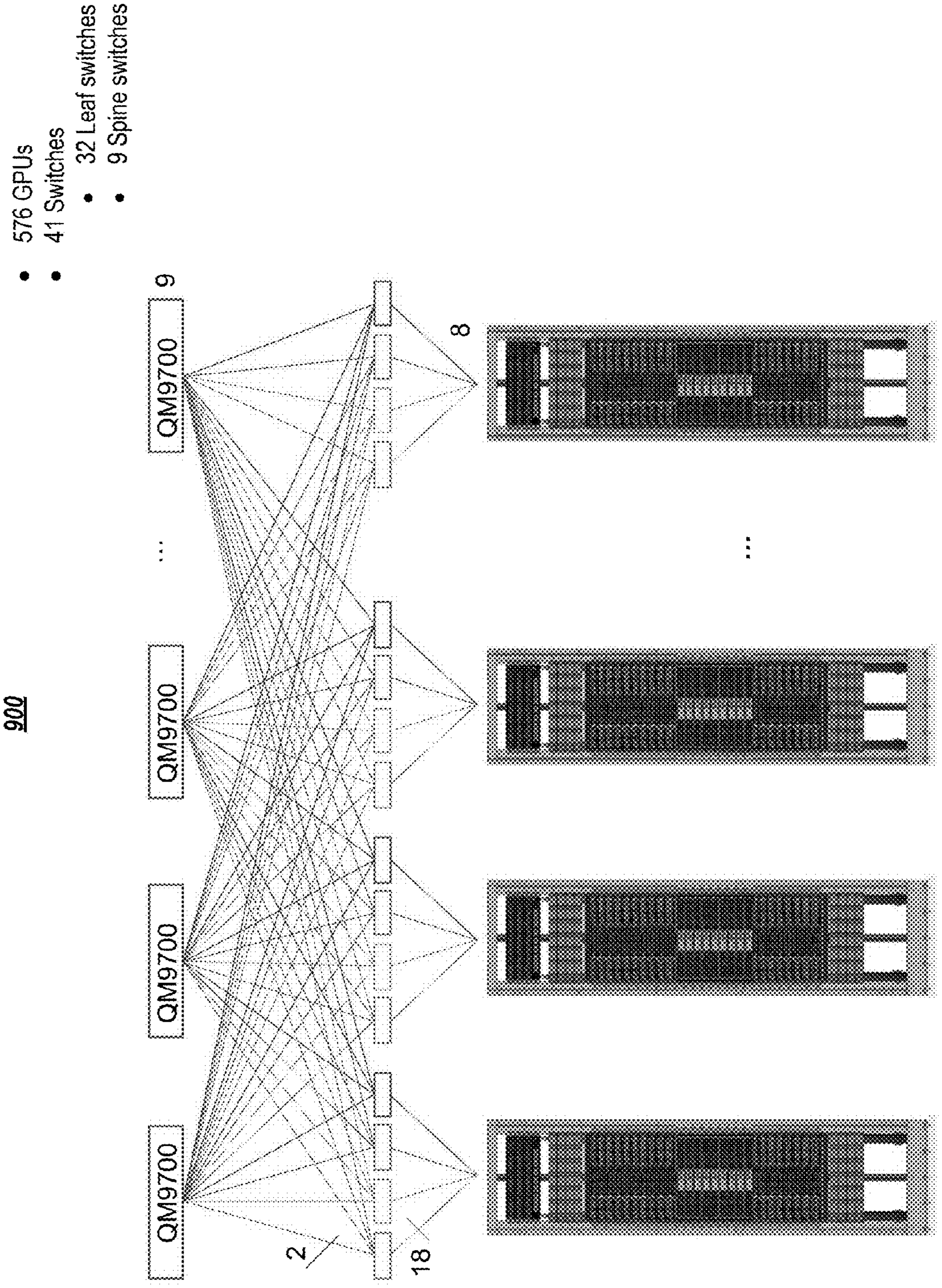
FIG. 9 depicts a two-tier version of a topology with a cluster of 576 GPUs.

FIG. 9 depicts a two-tier version 900 of this topology with a cluster of 576 GPUs. This cluster is composed of 576 GPUs and 56 switches (32 leaf switches, 24 spine switches, and no superspine switches).

As noted above, this type of topology is not optimal because all communications within a railpod require three hops (i.e., crossing a leaf, a spine, a leaf) and all communications within a rail require five hops (i.e., crossing a leaf, a spine, a superspine, a spine, a leaf). The following sections provide embodiments of better topologies.

B. Embodiments of Rail-Optimized Topologies

Embodiments of improved topologies for an NVL72 scale-out fabric may be achieved by having as many rails as allowed by the radix of the switch, in which radix refers to the number of ports or connections a router or switch can handle. For example, a scale-out fabric topology may comprise 36 rails for 64-port switches and 72 rails for 128-port switches. In one or more embodiments, the rails span the minimum number of tiers possible (i.e., restrict them to the first or second tier) and use the additional tier for the rail crossing function. If the last tier is used for the rail crossing function, it may be oversubscribed, because the preferred fabric to perform the rail crossing function is the scale-up fabric.

1. Improved Topology Embodiments Using Radix 64 Switches

Figure 10:
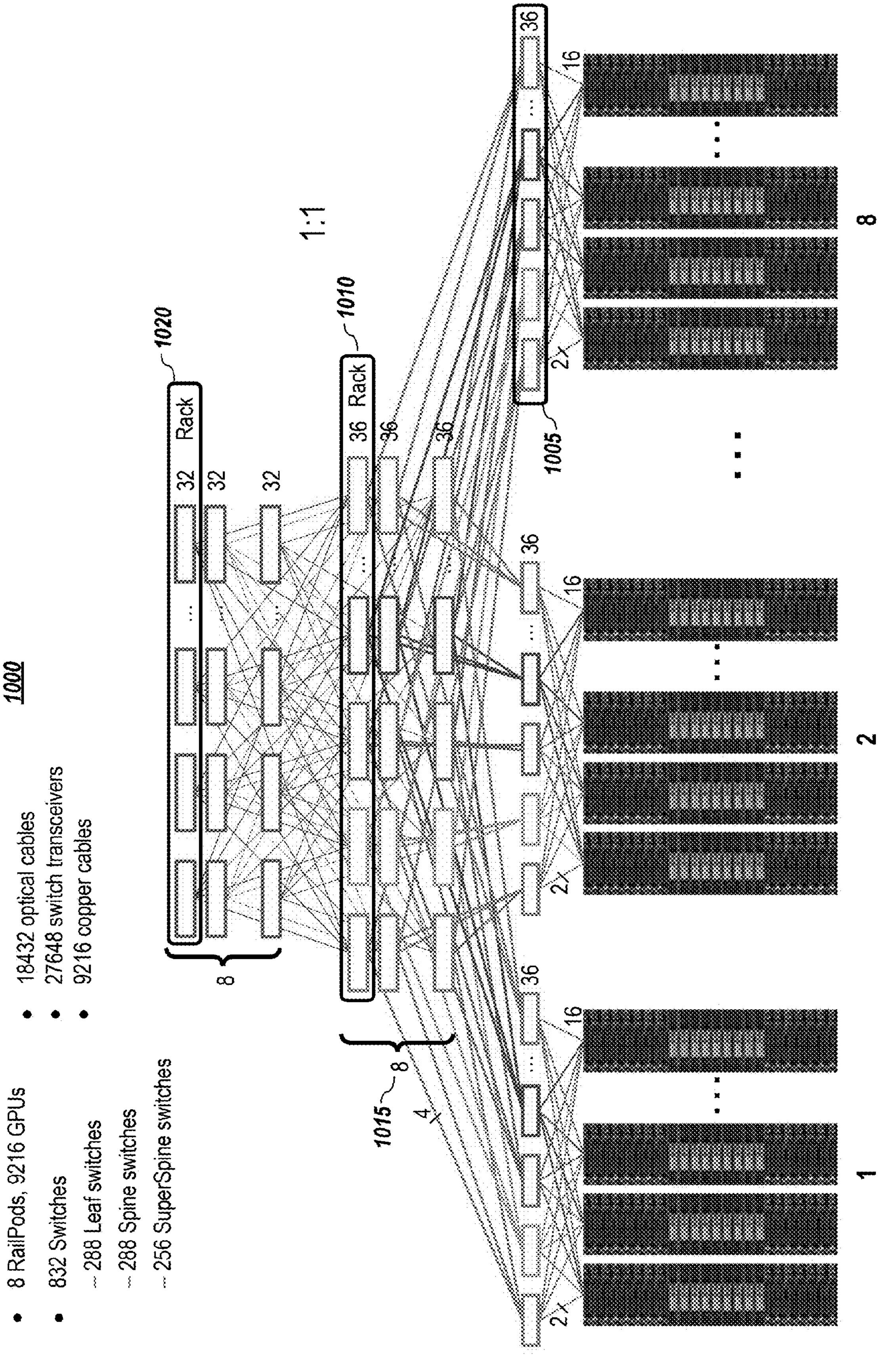
FIG. 10 depicts an example of a 9216 GPUs cluster, according to embodiments of the present disclosure.

FIG. 10 depicts an example of a 9216 GPUs cluster, according to embodiments of the present disclosure. In one or more embodiments, the racks (which may be NVL72 racks) are organized in railpods, each comprising 16 racks—although different configurations and numbers may be used. The topology 1000 was designed according to these principles. In the color version of the figures, the different colors indicate the 36 rails (e.g., a QM9700 switch is a 64-port switch and may be used for each of the switches in the scale-out fabric, although other switches may be used). Each NVL72 rack is connected with two links to 36 leaf switches (e.g., set of 36 leaf switches 1005), one per each rail. That is, each switch of a set of 36 leaf switches (e.g., set of 36 leaf switches 1005) for a railpod (e.g., railpod 8) is a rail and connects to a corresponding rail in the spine layers, which also have 36 switches per row—one for each rail (see, e.g., set of spine switches 1010). In the depicted example, there are 8 sets of 36 spine switches, which may be housed within a rack (e.g., set 1010). However, stated differently when viewed per rail, the topology 1000 includes 36 groups of spine switches, each comprising eight switches 1015. Within a rail, each leaf switch may be connected to the eight spine switches with four links. In one or more embodiments, the leaf switches are fully populated, with all 64 ports used.

Also depicted in FIG. 10 are 8 rows of 32 superspine switches. In one or more embodiments, a set of 32 superspine switches (e.g., set 1015) may be housed within a rack. Each of the eight rows of spine switches may be connected to a corresponding row of 32 superspine switches. In one or more embodiments, the spine switches are fully populated, with all 64 ports used, while the superspine switches are sparsely populated, with just 36 out of 64 ports used.

The topology shown in FIG. 10 uses 832 switches (e.g., 832 QM9700 switches). From a latency and traffic management point of view, it is a better topology than the prior approaches because communications within a railpod involve one hop (i.e., crossing a leaf) and communications within a rail involve three hops (i.e., crossing a leaf, a spine, a leaf). Also note that the third tier is used for the rail crossing function (i.e., communicating across rails), and therefore it may be oversubscribed. Furthermore, this topology may scale larger (e.g., scaled to support 36864 GPUs).

Figure 11:
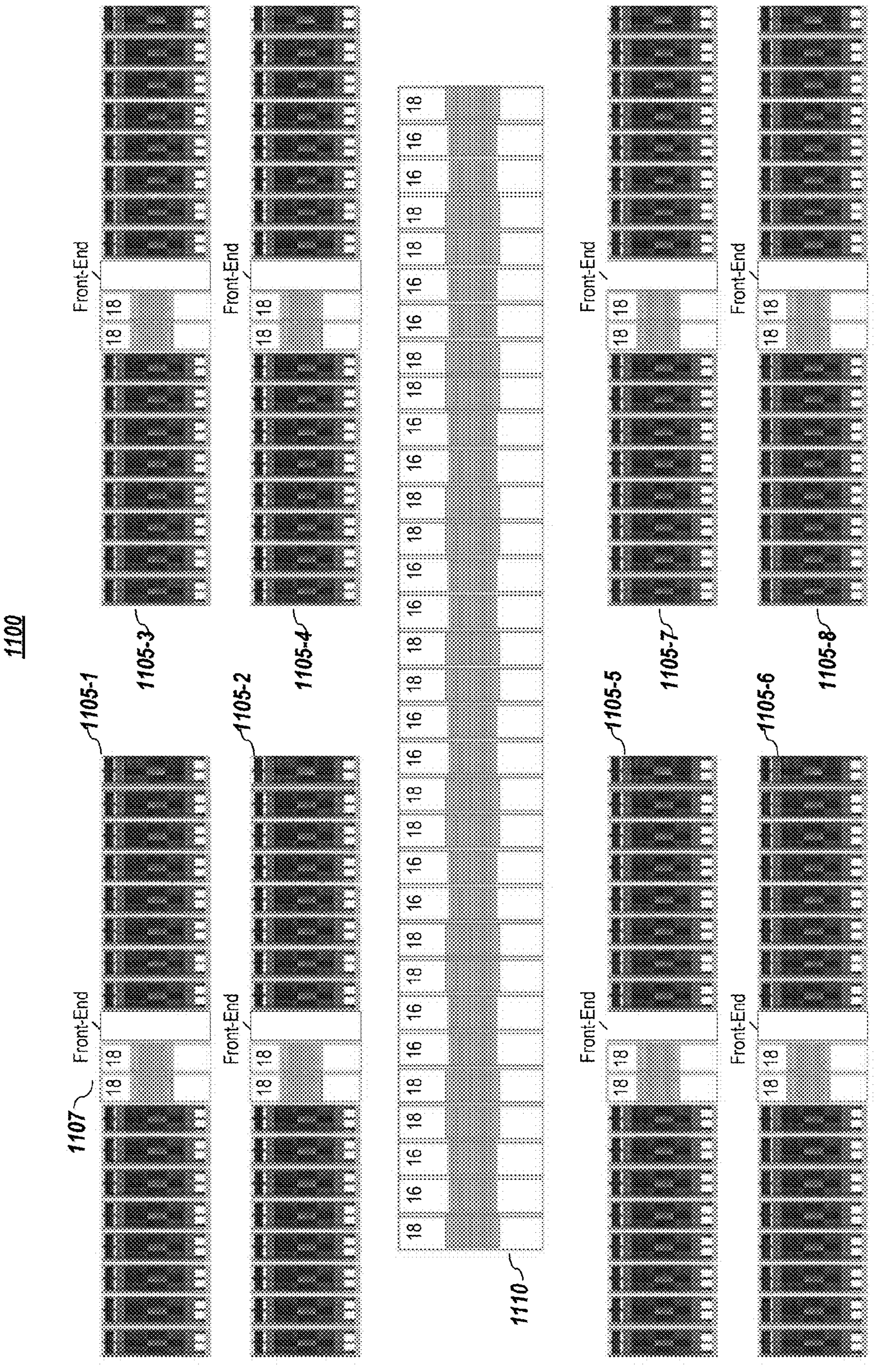
FIG. 11 depicts an example implementation of a rack design for the topology depicted in FIG. 10, according to embodiments of the present disclosure.

FIG. 11 depicts an example implementation of a rack design for the topology depicted in FIG. 10, according to embodiments of the present disclosure. The rack design comprises 8 railpods 1105. Each railpod 1105 comprises sixteen (16) NVL72 units and two racks that each house 18 leaf switches. The spines and superspines are represented by the central core 1110. In one or more embodiments, as discussed in more detail below, the close proximity of spines and superspines may allow for the use of copper cabling, which is less expensive than optical cabling. For at least some of the connections between the NVL72 units and their leaf switches, optical cabling may be used. Similarly, optical cabling may be used between at least some of the leaf switches and for connections between the leaf switches and the spine switches.

In one or more embodiments, a front-end fabric is a fabric that connects to the remaining part of the data center and allows access to storage and to the GPU cluster itself. An example depiction of a front-end fabric is depicted in FIG. 5.

Figure 12:
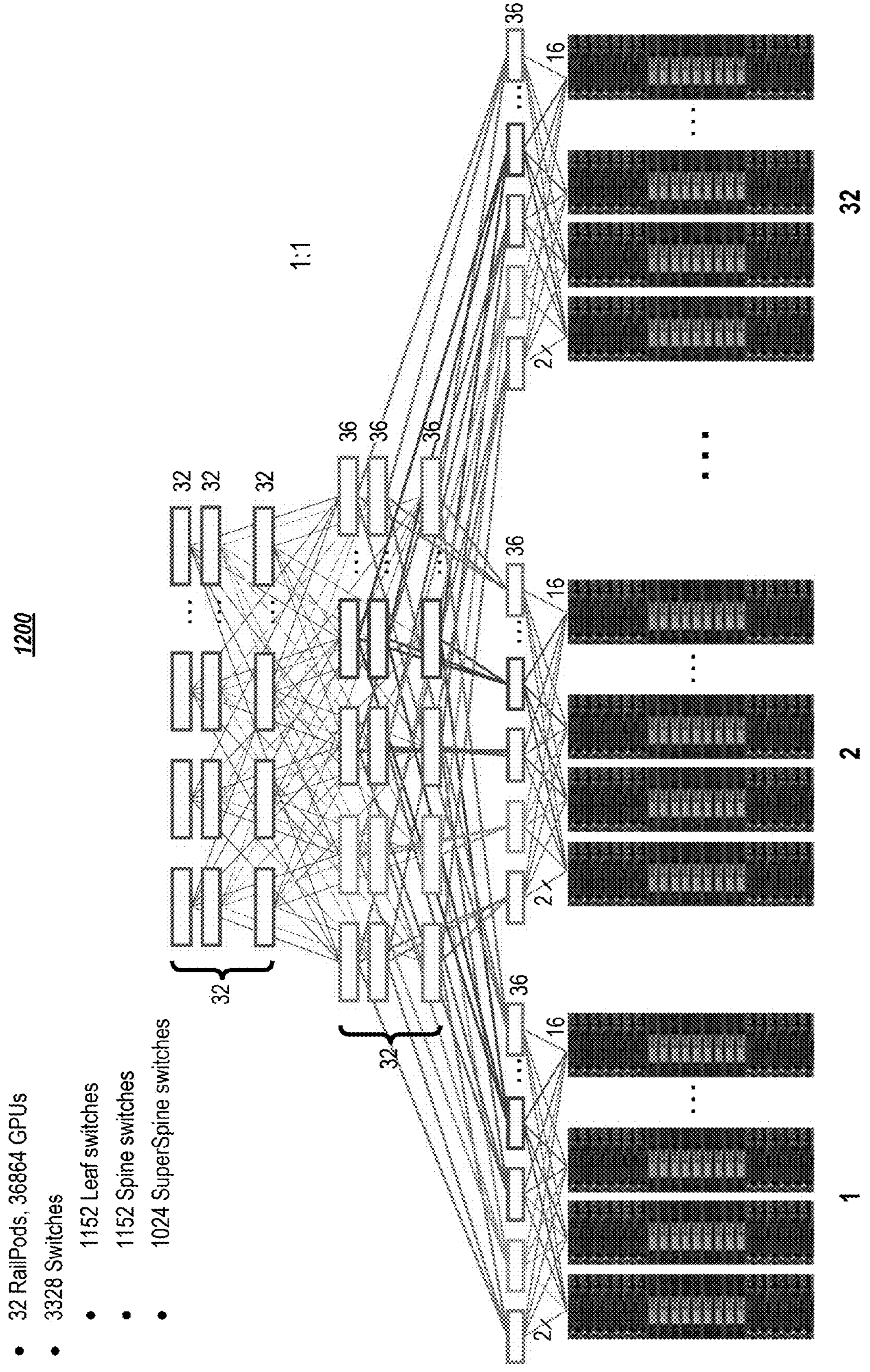
FIG. 12 shows a large-scale fabric topology, according to embodiments of the present disclosure.

FIG. 12 shows a large-scale fabric topology, according to embodiments of the present disclosure. The depicted topology 1200 comprises 32 railpods housing 36,864 GPUs. The depicted topology comprises 1152 leaf switches, 1152 spine switches, and 1024 superspine switches. Once again, this topology is better than prior approaches because communications within a railpod involve one hop (i.e., crossing a leaf) and communications within a rail involve three hops (i.e., crossing a leaf, a spine, a leaf).

Figure 13A:
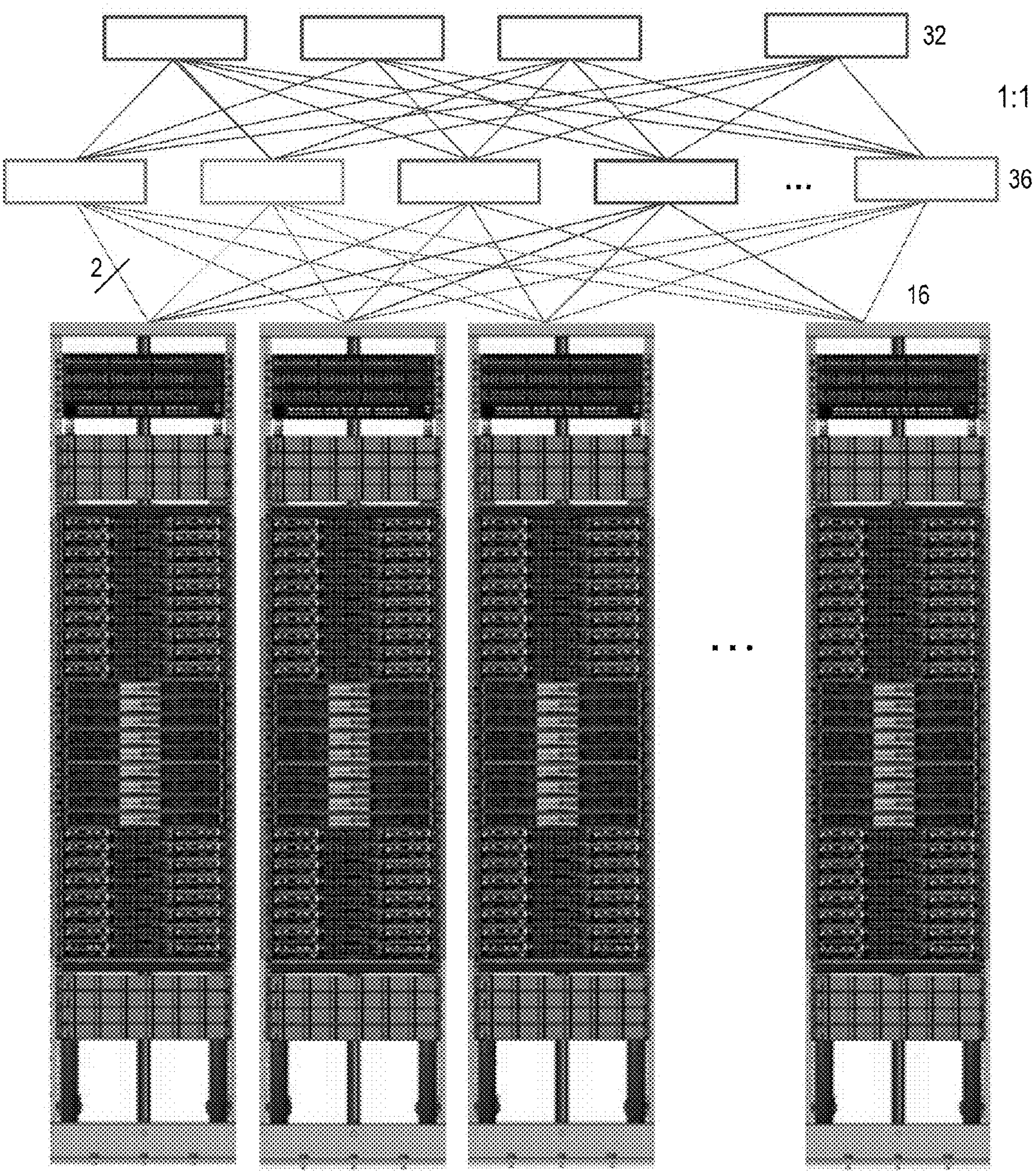
FIG. 13A depicts a two-tier topology for a cluster of 1152 GPUs, according to embodiments of the present disclosure.
Figure 13B:
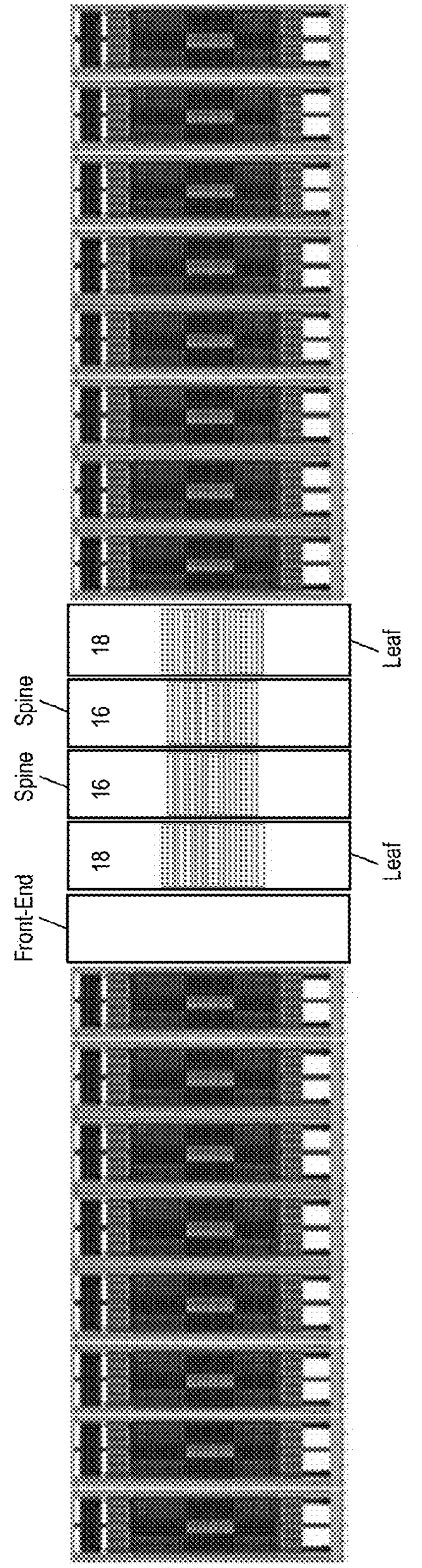
FIG. 13B depicts an implementation of a racking solution for FIG. 13A, according to embodiments of the present disclosure.

FIG. 13A depicts a two-tier topology for a cluster of 1152 GPUs, according to embodiments of the present disclosure. The depicted topology 1300A comprises 16 units (e.g., 16 NVL72 units) housing a total of 1152 GPUs. The depicted topology 1300A comprises 36 leaf switches, 32 spine switches, and uses no superspine switches. The switches may be QM9700 switches with 64 ports, but other switches may be used. FIG. 13B depicts an implementation of a racking solution, according to embodiments of the present disclosure.

Figure 14:
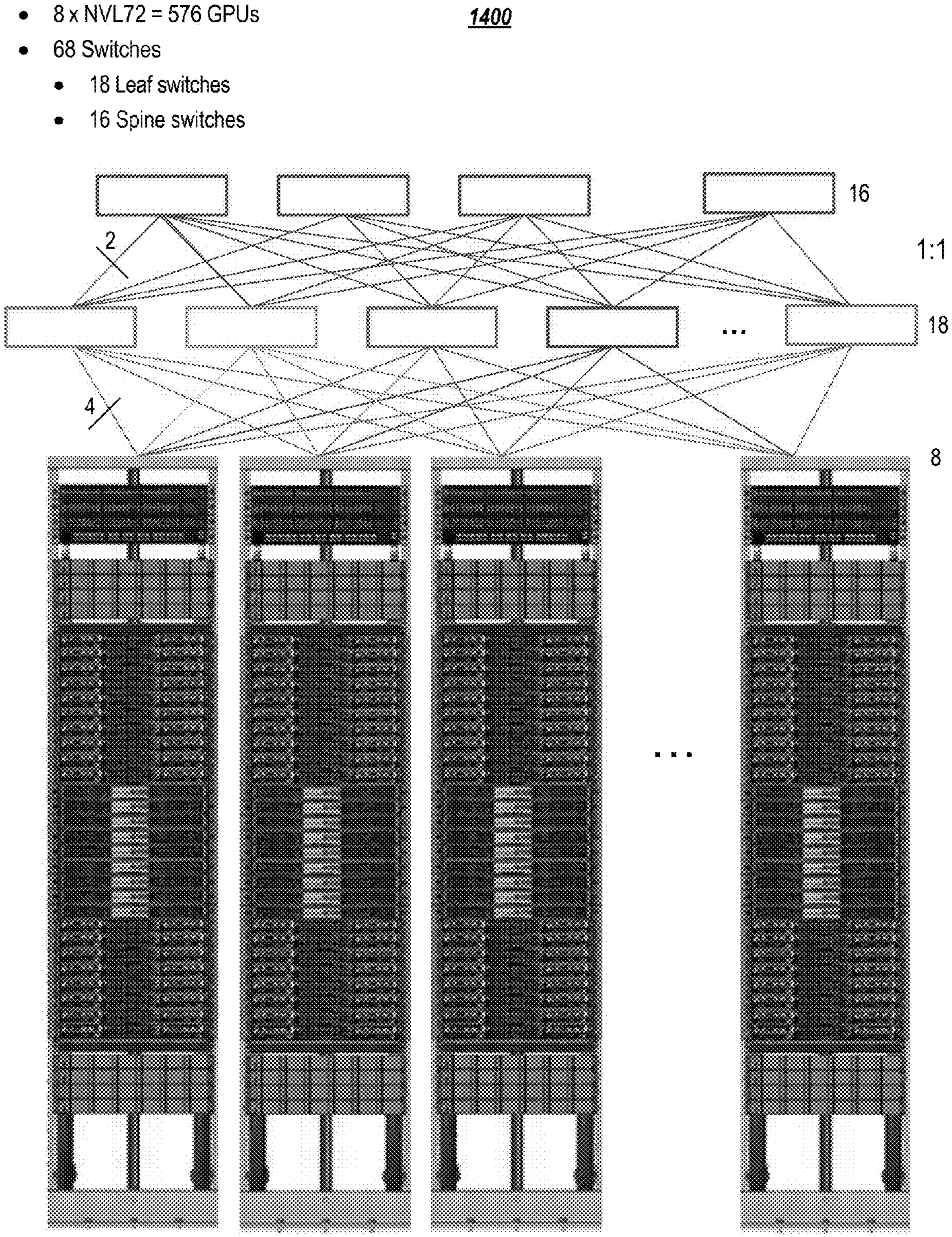
FIG. 14 depicts a two-tier topology for a cluster of 576 GPUs, according to embodiments of the present disclosure.

FIG. 14 depicts a two-tier topology for a cluster of 576 GPUs, according to embodiments of the present disclosure. The depicted topology 1400 comprises 8 units (e.g., 8 NVL72 units) housing a total of 576 GPUs. The depicted topology 1400 comprises 18 leaf switches, 16 spine switches, and uses no superspine switches. The switches may be QM9700 switches with 64 ports, but other switches may be used.

2. Improved Topology Embodiments Using Radix 128 Switches

Figure 15:
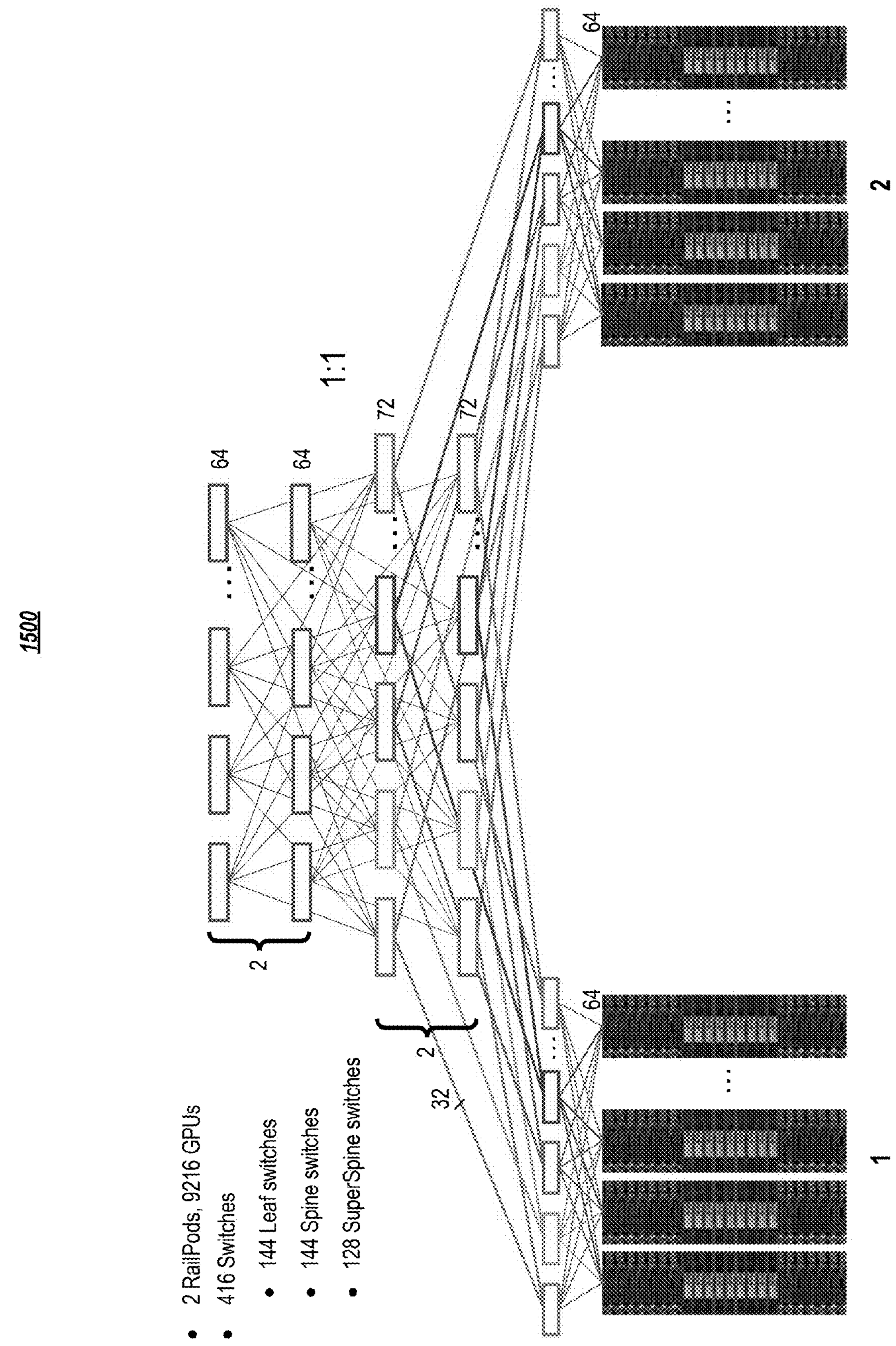
FIG. 15 depicts a topology that supports 9216 GPUs, according to embodiments of the present disclosure.
Figure 16:
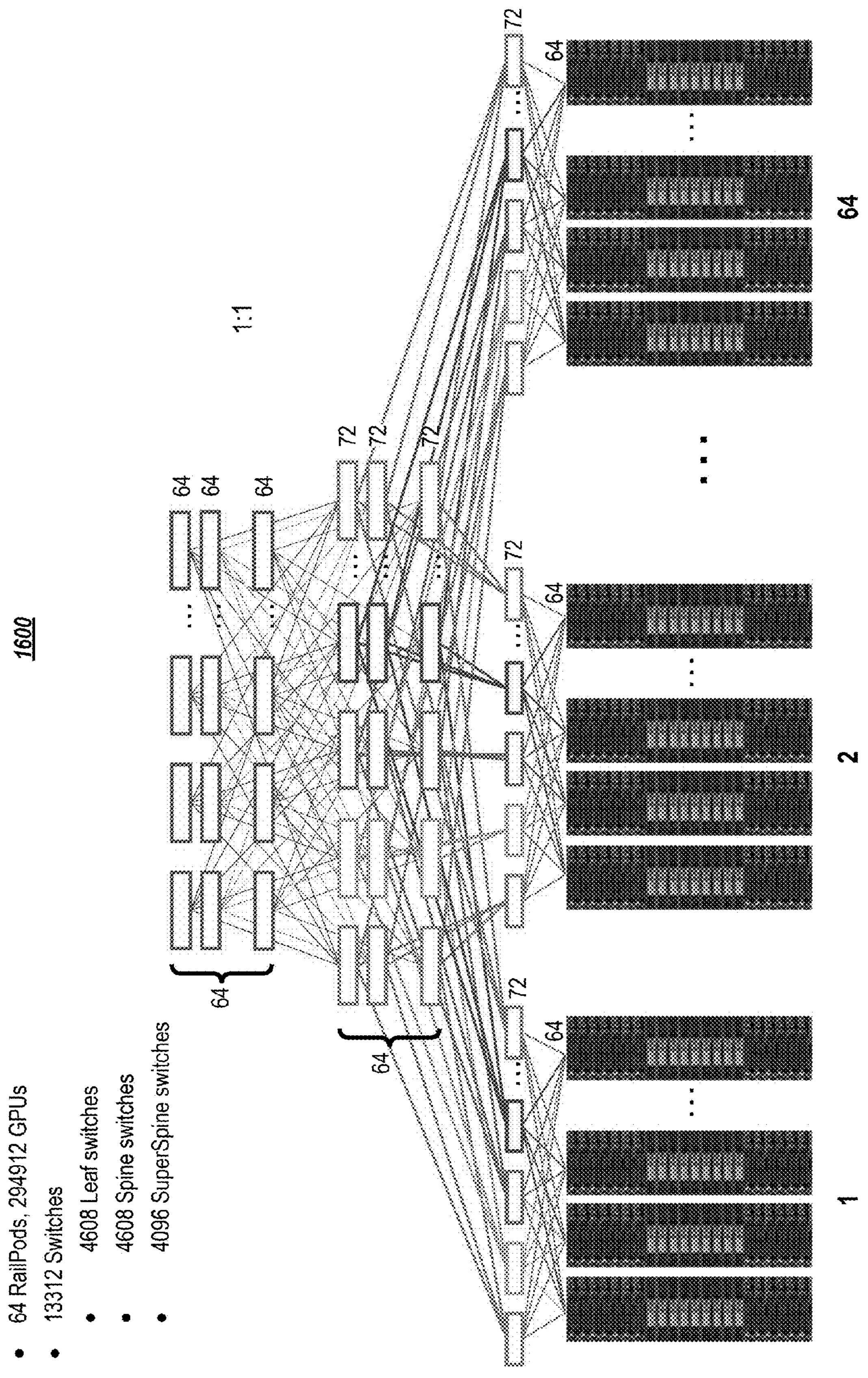
FIG. 16 depicts another embodiment topology, according to embodiments of the present disclosure.

Note that the prior example embodiments involved using switches with 64 ports (i.e., radix of 64). FIG. 15 and FIG. 16 show improved topologies for switches with radix 128. In one or more embodiments, the switches may be Z9864 by Dell of Round Rock, Texas—although other radix 128 switches may be used.

FIG. 15 depicts a topology that supports 9216 GPUs, according to embodiments of the present disclosure. The depicted topology 1500 comprises 2 railpods, in which a railpod comprises 64 rack units and each rack unit supports 72 GPUs. The depicted topology comprises 144 leaf switches, 144 spine switches, and 128 superspine switches.

FIG. 16 depicts a much larger topology, according to embodiments of the present disclosure. The depicted topology 1600 comprises 64 railpods, with each railpod comprising 64 units (e.g., 64 NVL72 units). Thus, the topology supports a total of 294,912 GPUs. The depicted topology comprises a total of 13,312 switches—4608 leaf switches, 4608 spine switches, and 4096 superspine switches.

As noted above, an NVL72 rack (or other GPU rack system) may be organized in railpods. In the embodiments depicted in FIG. 15 and FIG. 16, each railpod comprises 64 racks. Each NVL72 rack is connected with one link to 72 leaf switches, one per each rail. In one or more embodiments, the topology also includes 72 groups of spine switches, each comprising two (2) to 64 switches, depending on the size of the cluster, groups represented as columns in FIG. 15 and FIG. 16. Within a rail, each leaf switch may be connected to the spine switches with a number of links dependent on the GPU cluster scale, from 32 (small scale) to 1 (largest scale). In the depicted embodiments, the leaf switches are fully populated, with all 128 ports used. Each of the rows of spine switches may be connected to a corresponding row of 64 superspine switches. In one or more embodiments, the spine switches are fully populated, with all 128 ports used, while the superspine switches may be sparsely populated, with just 72 out of 128 ports used.

Table 2 compares two topologies (the NVIDIA topology and an embodiment of the current patent disclosure) for a cluster of 9216 GPUs with radix 64 switches. The embodiment topology is better for all the considered parameters.

TABLE 2

Topologies Comparison

| | NVIDIA Topology | Improved Topology Embodiment |
|---|---|---|
| Latency/Traffic Management | 3 hops for Intra-Pod communications<br>5 hops for Inter-Pod communications | 1 hop for Intra-Pod communications<br>3 hops for Inter-Pod communications |
| Number of Switches | 944 | 832 |
| Scale Out Fabric Racks | 73 | 48 |
| Scalability | Up to 18,432 GPUs | Up to 36,864 GPUs |
| 3rd tier may be oversubscribed | No | Yes |

Note that the NVIDIA topology underutilizes the leaf switches (i.e., 36 ports out of 64 ports are used), while the improved topology embodiment fully utilizes the leaf switches and preferentially shifts the underutilization to the lesser used superspine tier. Note also that there are more leaf switches than superspine switches. Therefore, it is much more efficient to have better utilization of the larger resource.

Table 3 compares the scalability properties of two topologies with radix 64 switches. Note that the improved topology scales better and requires fewer switches.

TABLE 3

Topologies Scalability

| | NVIDIA | | Improved Topology Embodiments | |
|---|---|---|---|---|
| Scale | # of Switches | # of Tiers | # of Switches | # of Tiers |
| 36,864 GPUS | — | | 3328 | 3 |
| 18,432 GPUs | 1888 | 3 | 1664 | 3 |
| 9216 GPUs | 944 | 3 | 832 | 3 |
| 4608 GPUS | 472 | 3 | 416 | 3 |
| 2304 GPUS | 236 | 3 | 208 | 3 |
| 1152 GPUS | 118 | 3 | 68 | 2 |
| 576 GPUs | 56 | 2 | 34 | 2 |
| 288 GPUs | 28 | 2 | 17 | 2 |

3. Cabling Embodiments

Figure 17:
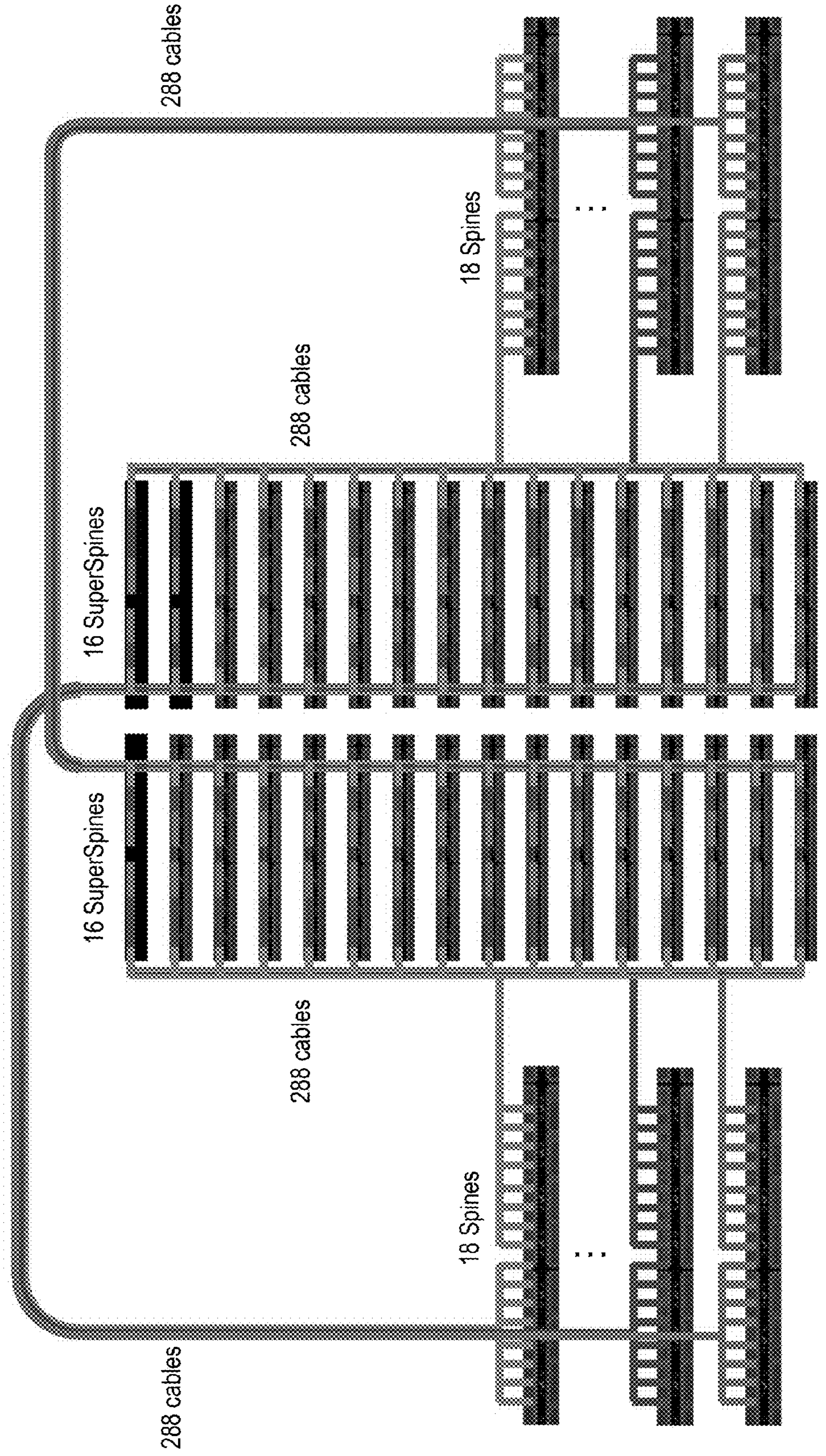
FIG. 17 depicts the use of copper cables between spines and superspines, according to embodiments of the present disclosure.

In addition to the improved topologies, one may consider how these improved topologies may be cabled relative to the use of copper and/or optical cables. Considering radix 64 switches, if the switches have cages hosting individual ports (e.g., they use QSFP (Quad Small Form-factor Pluggable) connectors, which are compact, hot-pluggable transceivers), copper cables may be used between the spines and superspine racks as shown in FIG. 17.

With this copper cabling scheme, an improved topology embodiment may achieve the same cabling economy as the current state of the art. However, for the specific case of the QM9700 InfiniBand switch (or a similar style switch), this copper scheme may be limited because the switch uses OSFP cages, each hosting two ports (i.e., double ports), and the improved topology embodiment connects individual ports between spines and superspines.

In one or more embodiments, this issue may be addressed to allow the use of copper cables with QM9700-like switches by having two parallel connections between each port of the spine and superspine switches. Such embodiments reduce the scaling of the improved topology implementations to be the same as the NVIDIA proposed topology (i.e., the maximum scale is 18K GPUs with radix 64 switches).

Figure 18:
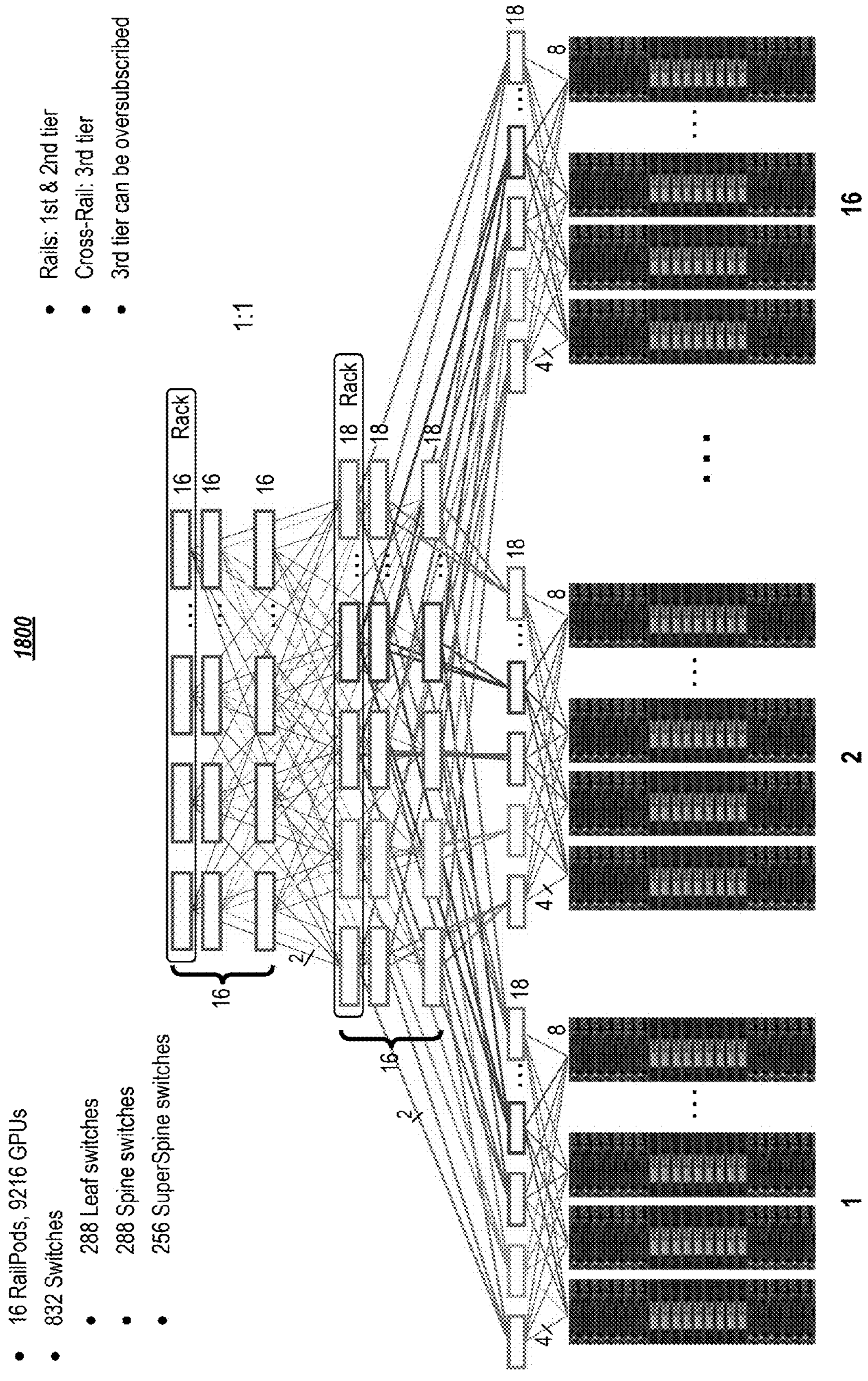
FIG. 18 depicts an updated topology, according to embodiments of the present disclosure.

FIG. 18 depicts an updated topology, according to embodiments of the present disclosure. Specifically, FIG. 18 shows an improved topology for 9216 GPUs allowing copper cabling, according to embodiments of the present disclosure. The NVL72 rack may be organized in smaller railpods, each comprising 8 racks. Each NVL72 rack may be connected with 4 links to 18 leaf switches, one per each rail. The topology 1800 may also comprise 18 groups/rails of spine switches, each comprising 16 switches-groups represented as columns in FIG. 18.

Within a rail, each leaf switch may be connected to the 16 spine switches with two links. The leaf switches may be fully populated, with all 64 ports used. Each of the 16 rows of spine switches may be connected to a corresponding row of 16 superspine switches. In one or more embodiments, the spine switches are fully populated, with all 64 ports used—while the superspine switches may be sparsely populated, with just 36 out of 64 ports used.

Figure 19:
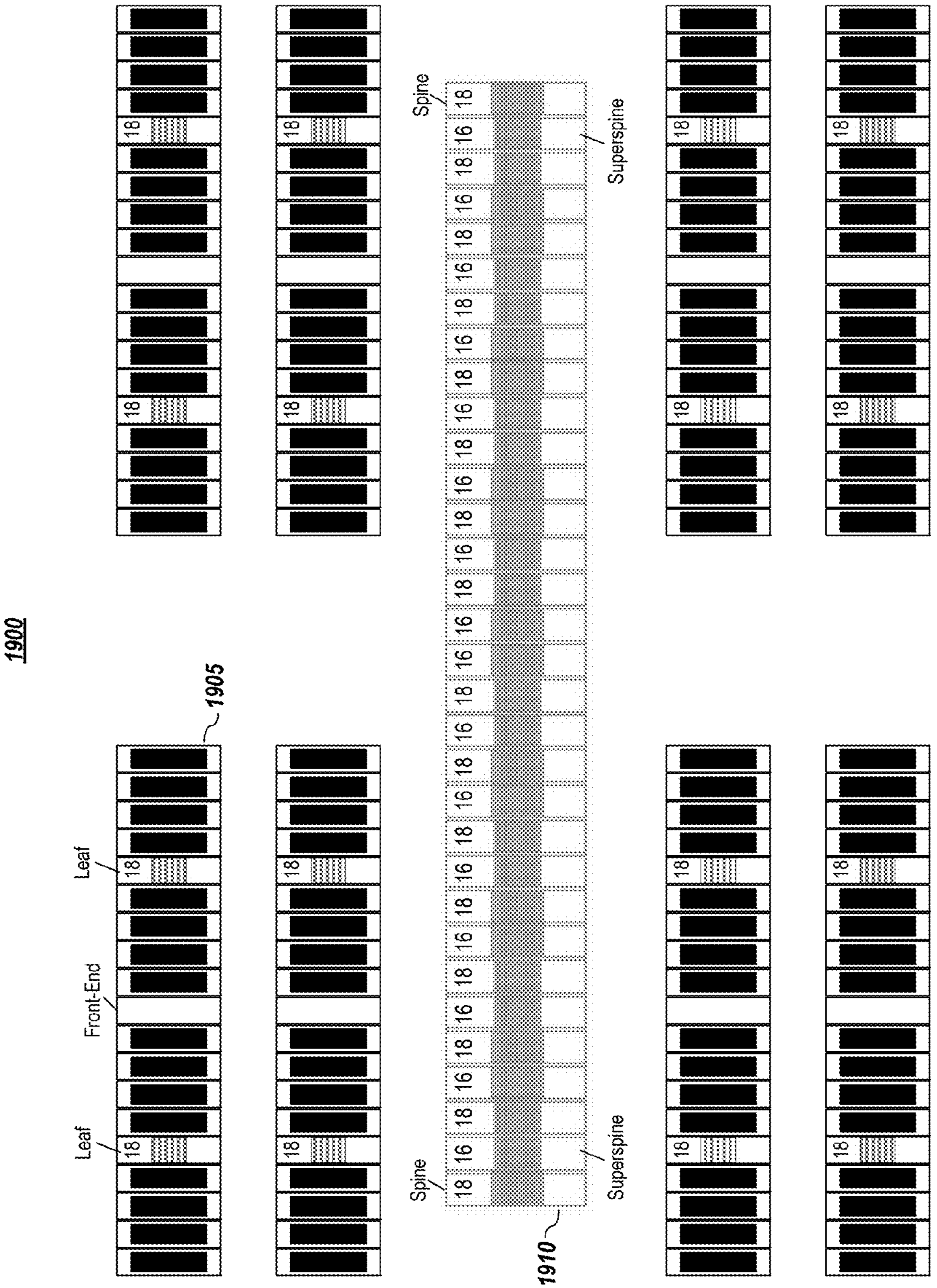
FIG. 19 depicts an example rack design for a topology depicted in FIG. 18, according to embodiments of the present disclosure.

FIG. 19 depicts an example rack design for a topology depicted in FIG. 18, according to embodiments of the present disclosure. Note that the leaf switches may be closely housed with the GPU racks in a railpod 1905. The core 1910 may comprise alternating sets of spine switches and superspine switches, although other configurations may be used.

Figure 20:
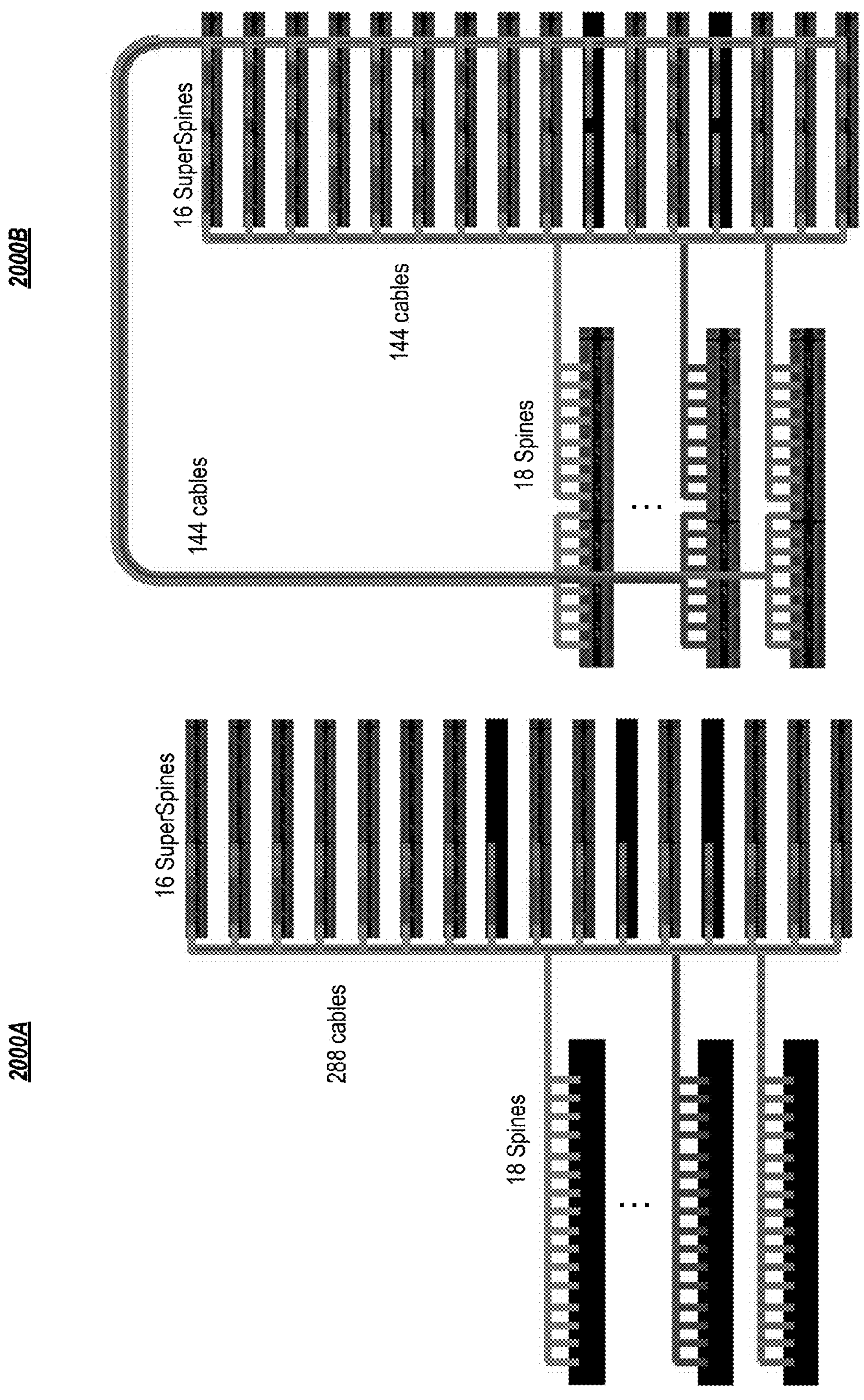
FIG. 20 depicts two ways (2000A and 2000B) to use double density copper cables between spines and superspine switches to support a topology depicted in FIG. 18, according to embodiments of the present disclosure.

FIG. 20 depicts two ways (2000A and 2000B) to use double density copper cables between spines and superspine switches to support a topology depicted in FIG. 18, according to embodiments of the present disclosure. The depicted embodiments are using double density cables, which support 800 Gb/s.

Figure 21:
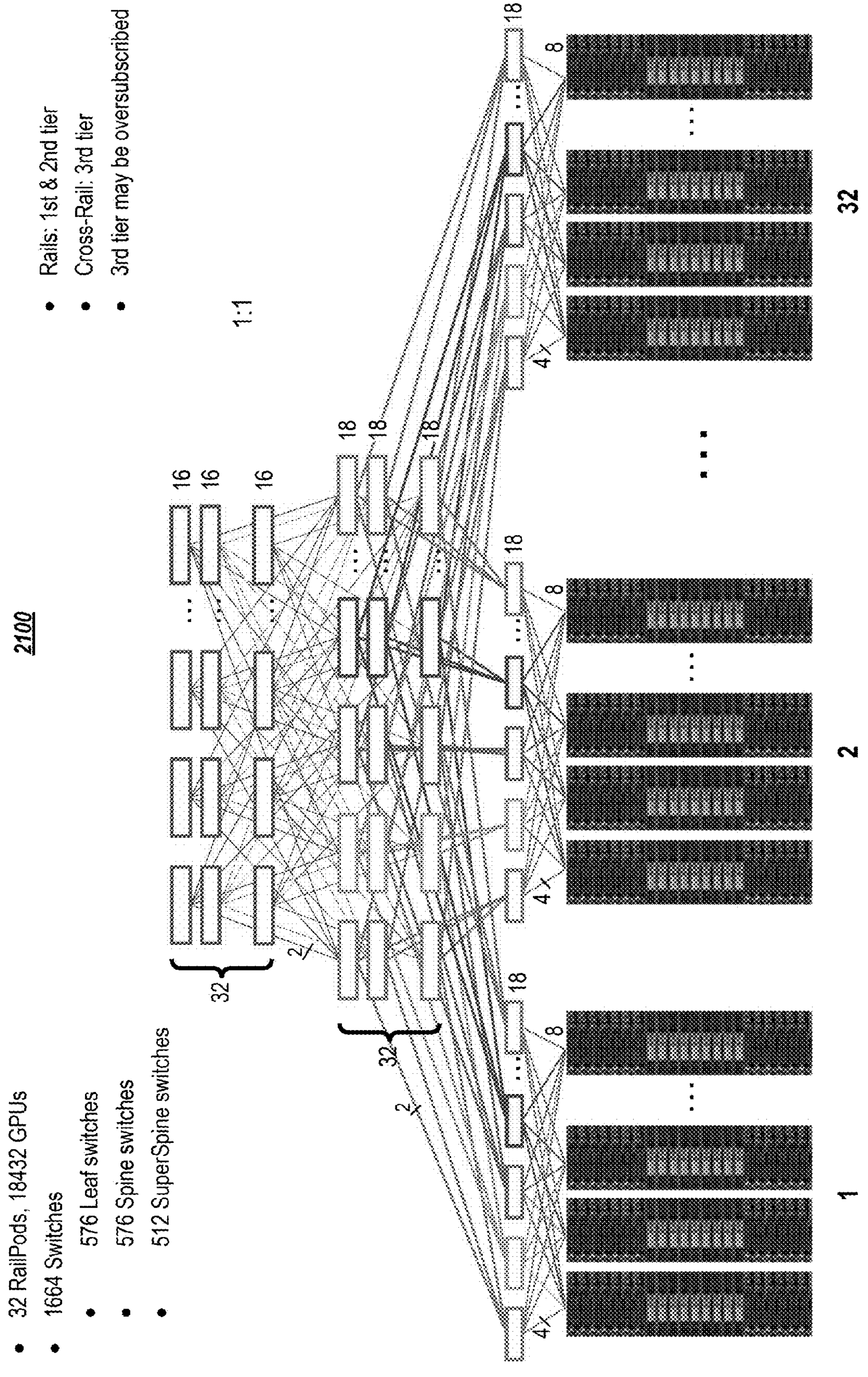
FIG. 21 shows a scale-out fabric that supports a cluster of 18,432 GPUs, according to embodiments of the present disclosure.

FIG. 21 shows a scale-out fabric that supports a large cluster of GPUs, according to embodiments of the present disclosure. In the depicted example, the switches may be QM9700 or QM9700-like switches. In the depicted embodiments, the topology 2100 comprises 32 railpods—each railpod comprises 8 racks. Thus, the topology supports a cluster of 18,432 GPUs. The topology also comprises a total of 1664 switches: 576 leaf switches, 576 spine switches, and 512 superspine switches.

Figure 22:
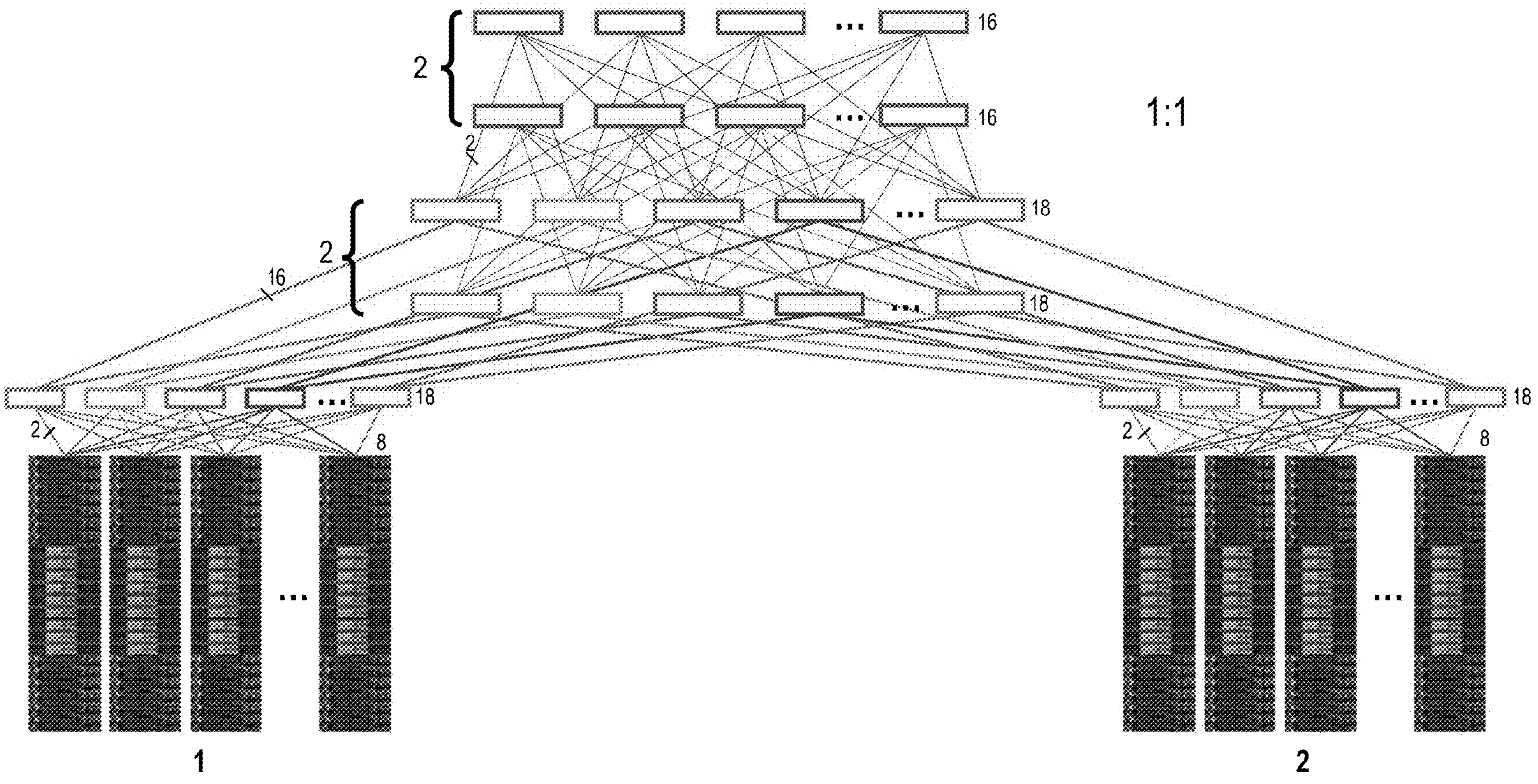
FIG. 22 depicts a topology for a smaller cluster of GPUs, according to embodiments of the present disclosure.

FIG. 22 depicts a topology for a smaller cluster of GPUs, according to embodiments of the present disclosure. In the depicted example, the switches may be QM9700 or QM9700-like switches. In the depicted embodiments, the topology 2200 comprises 2 railpods—each railpod comprises 8 racks. Thus, the topology supports a cluster of 1152 GPUs. The topology also comprises a total of 104 switches: 36 leaf switches, 36 spine switches, and 32 superspine switches.

Figure 23:
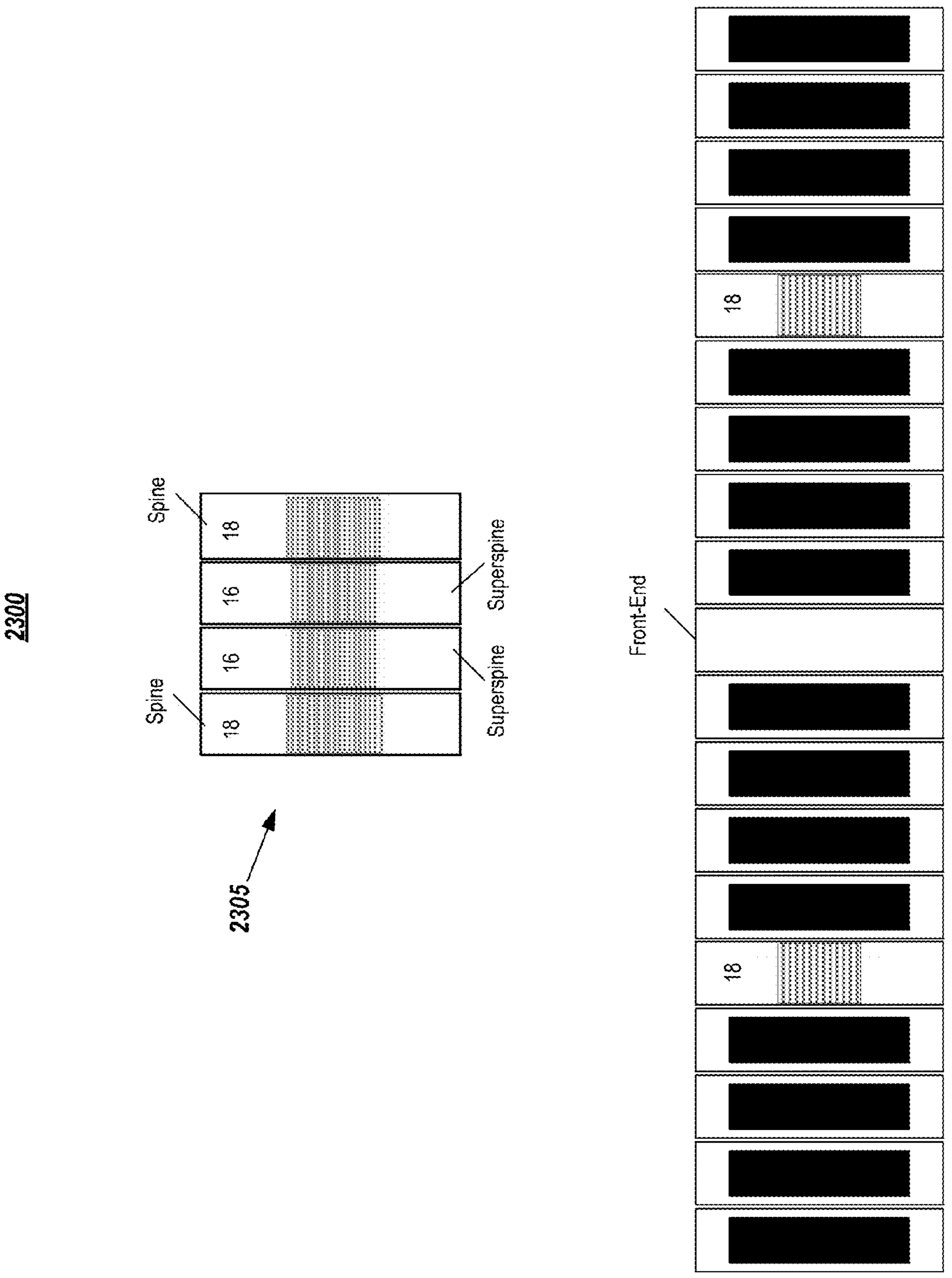
FIG. 23 depicts a racking solution for the topology in FIG. 22, according to embodiments of the present disclosure.
Figure 25:
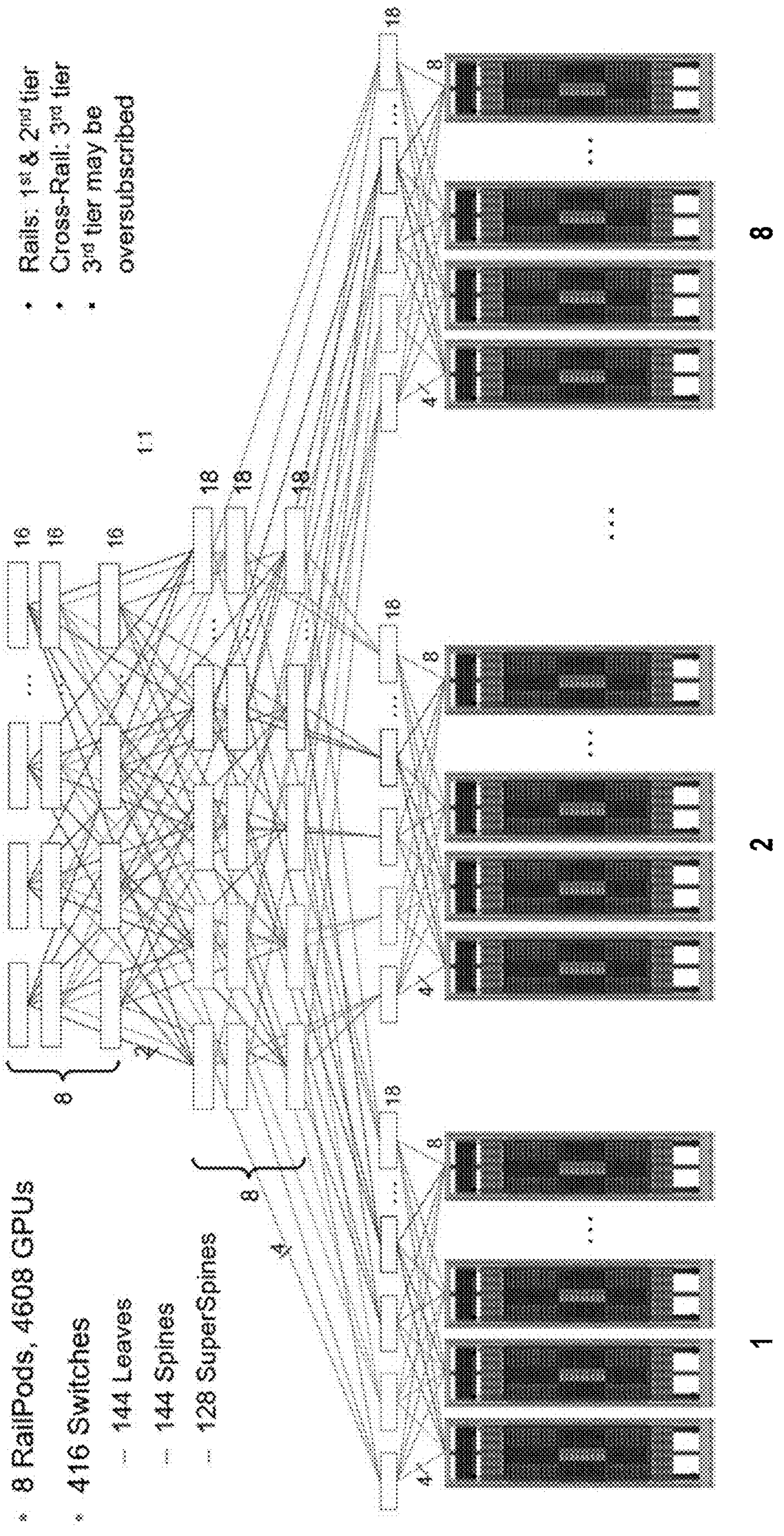
Figure 26:
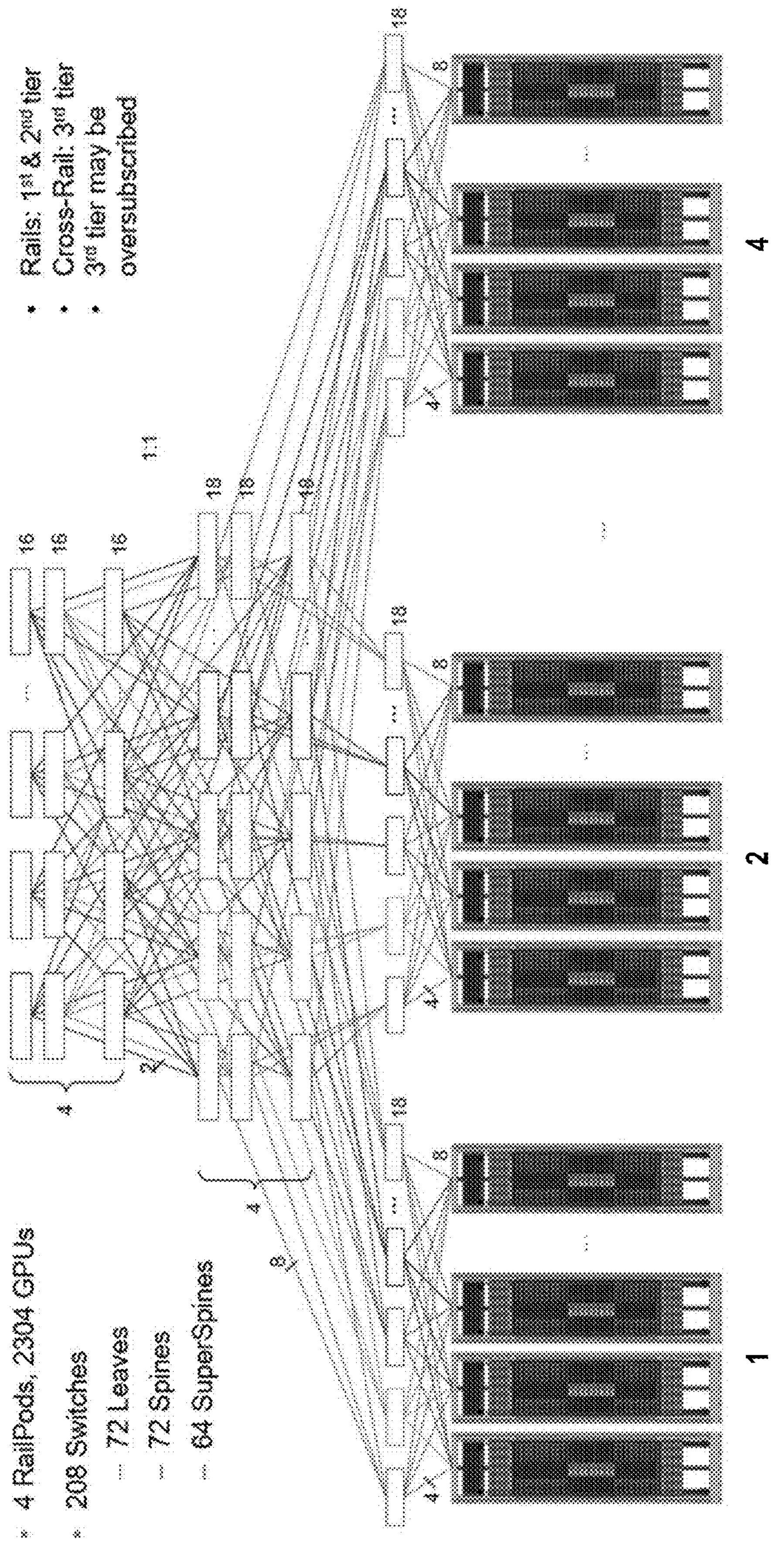
Figure 27:
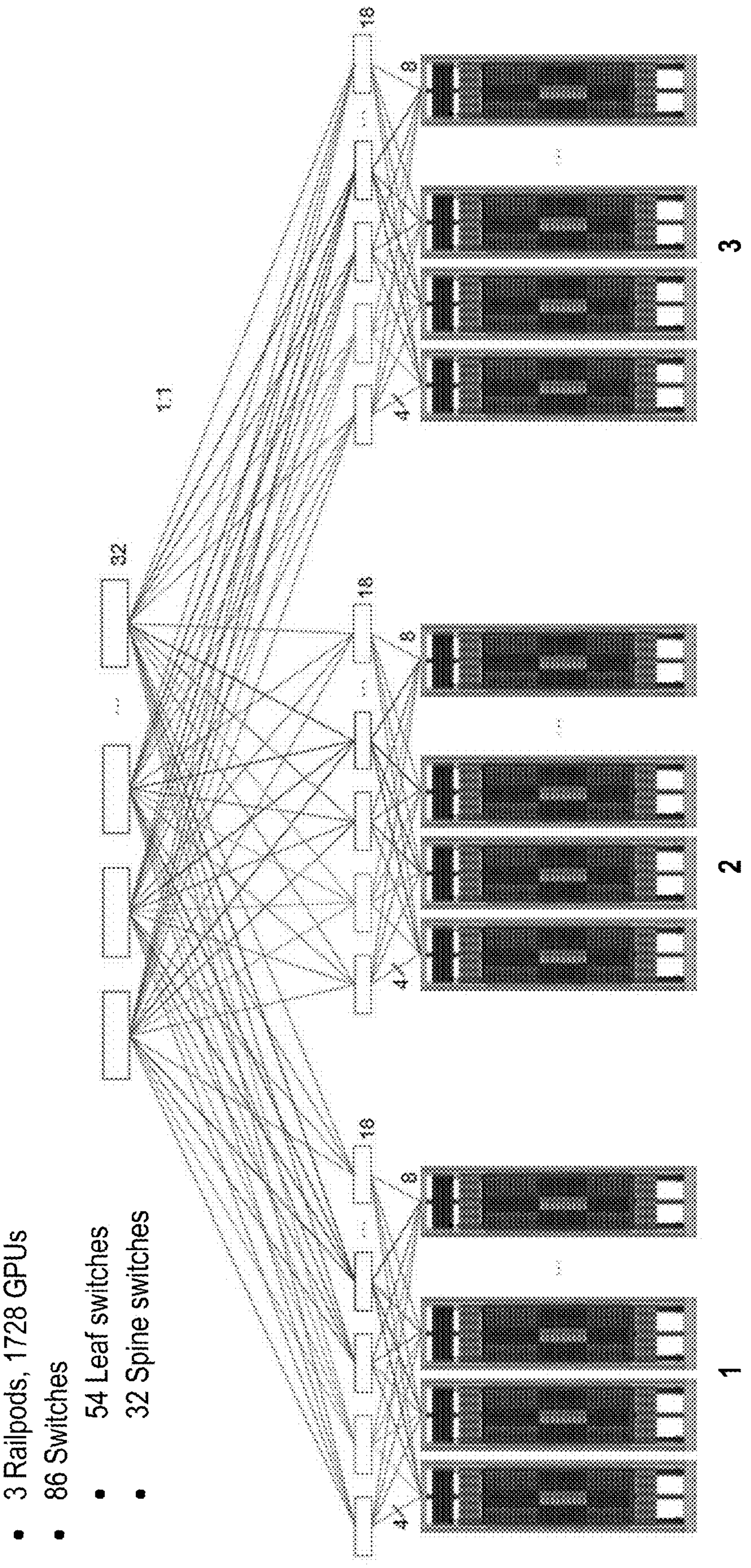

FIG. 23 depicts a racking solution for the topology in FIG. 22, according to embodiments of the present disclosure.

The topology for a cluster of 576 GPUs is shown in FIG. 14.

Table 4 compares the two topologies for a cluster of 9216 GPUs with radix 64 switches. The optimized topology appears to be better for all the considered parameters.

TABLE 4

Topologies Comparison

| | NVIDIA Topology | Improved Topology Embodiments |
|---|---|---|
| Latency/Traffic Management | 3 hops for Intra-Pod communications<br>5 hops for Inter-Pod communications | 1 hop for Intra-Pod communications<br>3 hops for Inter-Pod communications |
| Number of Switches | 944 | 832 |
| Scale-out Fabric Racks | 73 | 48 |
| Scalability | Up to 18432 GPUs | Up to 18432 GPUs |
| Optical cables/ Transceivers/Copper cables | 18,432/13,824/4108 | 18,432/13,824/4108 |
| $3^{rd}$ tier may be oversubscribed | No | Yes |

Table 5 compares the scalability properties of the two topologies with radix 64 switches.

TABLE 5

Topologies Scalability

| | NVIDIA | | Improved Topology Embodiment | |
|---|---|---|---|---|
| Scale | # of Switches | # of Tiers | # of Switches | # of Tiers |
| 18432 GPUs | 1888 | 3 | 1664 | 3 |
| 9216 GPUs | 944 | 3 | 832 | 3 |
| 4608 GPUs | 472 | 3 | 416 | 3 |
| 2304 GPUs | 236 | 3 | 208 | 3 |
| 1152 GPUs | 118 | 3 | 104 | 3 |
| 576 GPUs | 56 | 2 | 34 | 2 |
| 288 GPUs | 28 | 2 | 17 | 2 |

As the two tables above show, embodiments of the updated topology improve several factors, including but not limited to networking efficiency, number of devices needed, performance, costs (e.g., number of devices, cabling, infrastructure costs, heating/cooling, etc.), among other factors.

Figure 28:
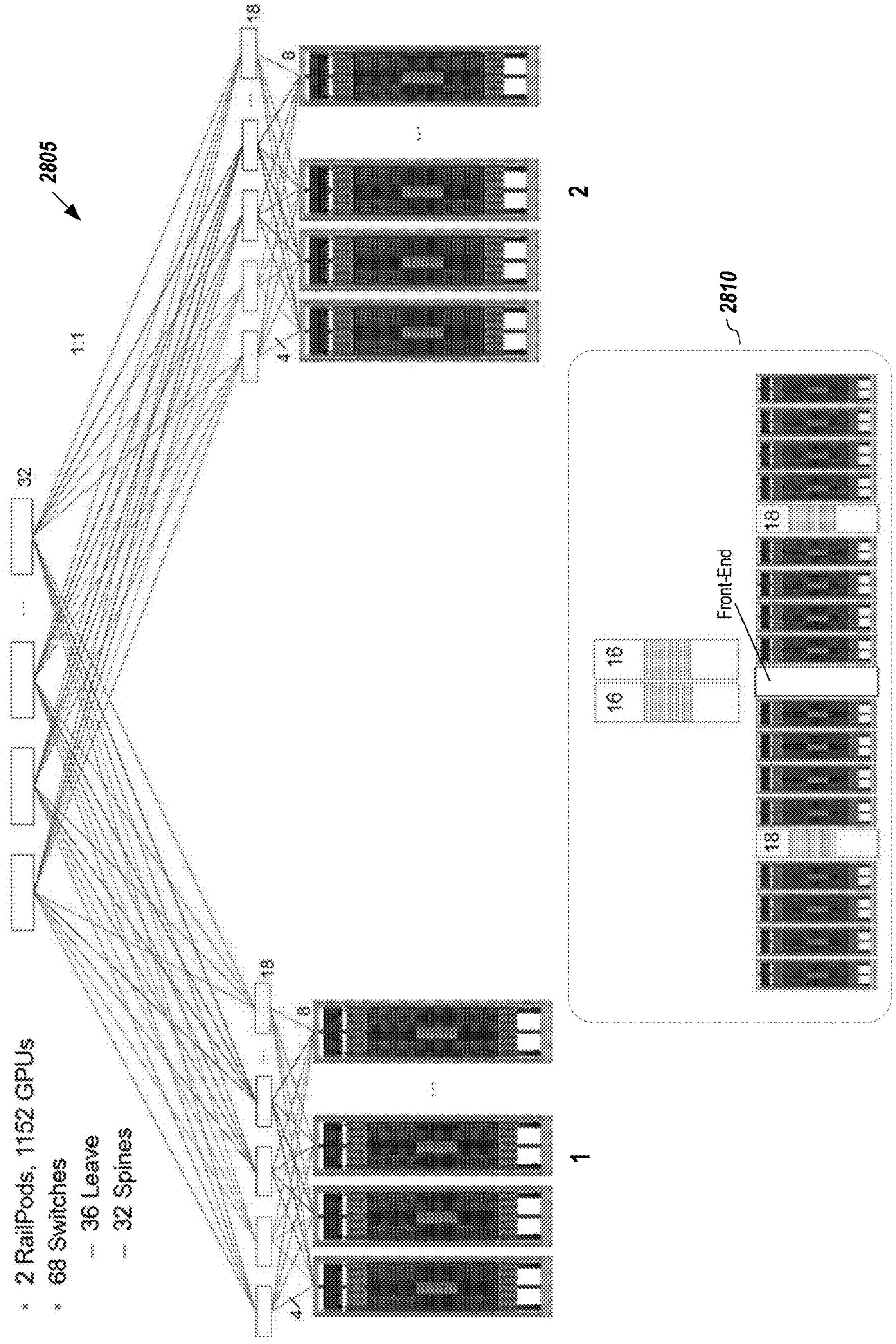
Figure 29:
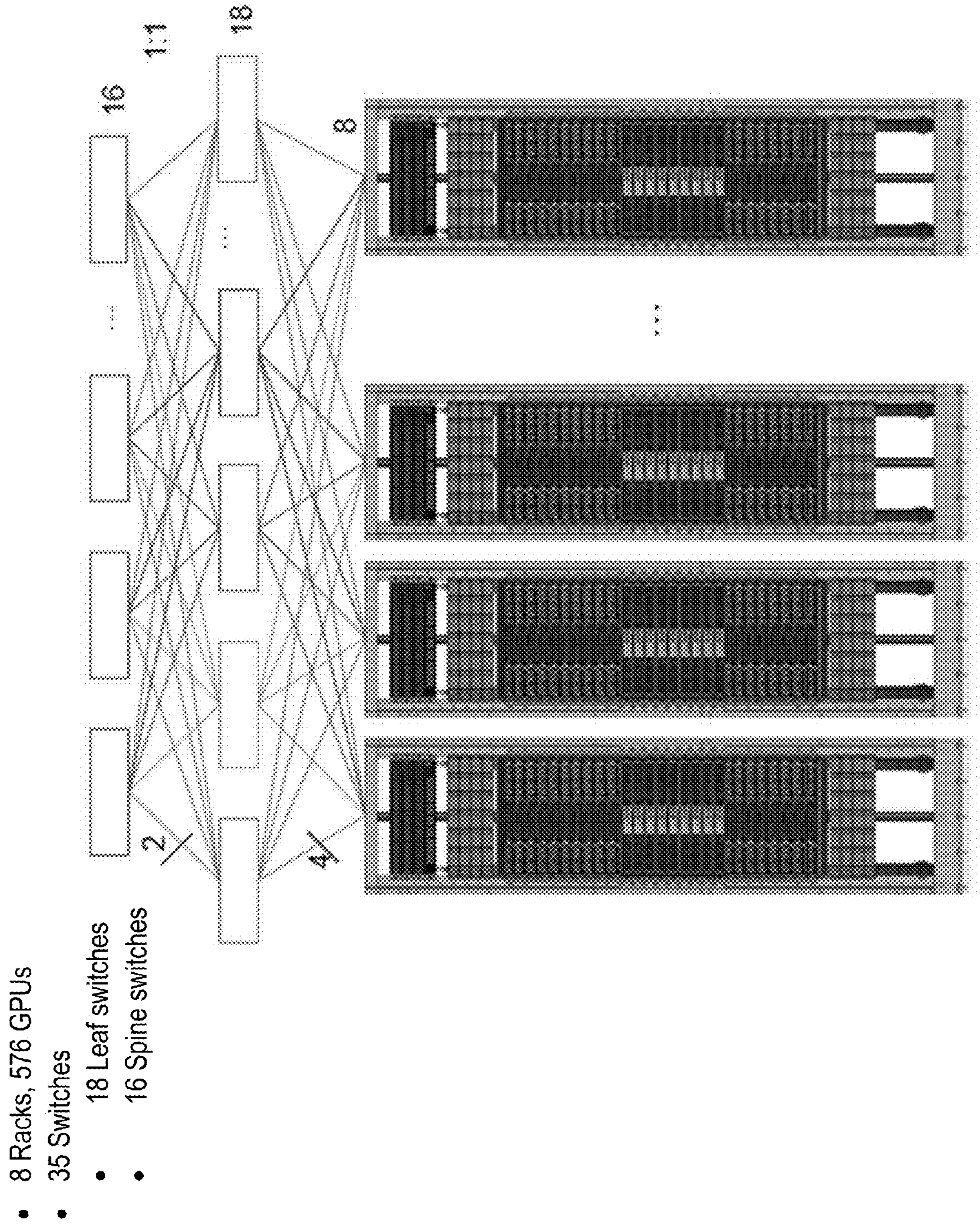
Figure 30:
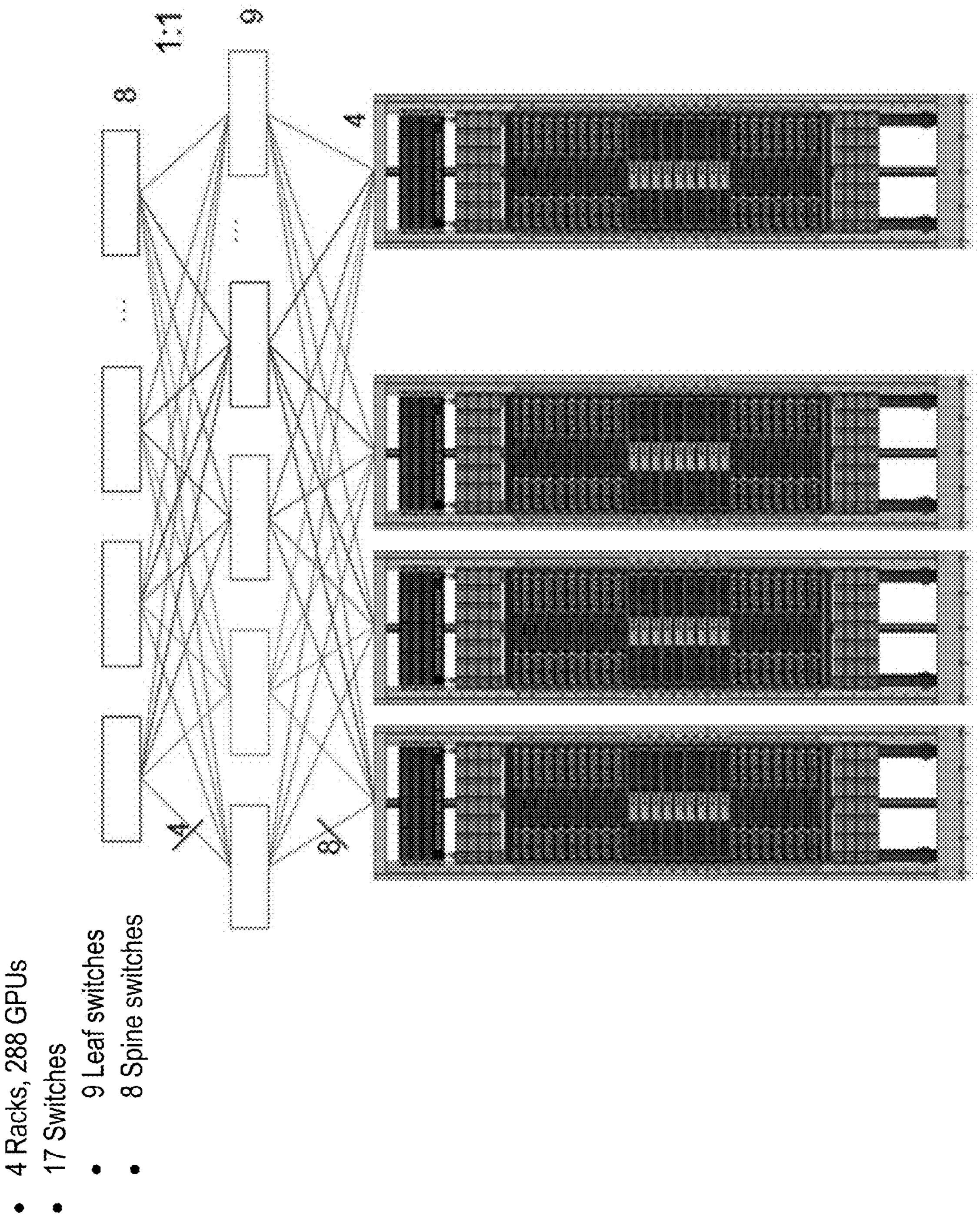
Figure 31:
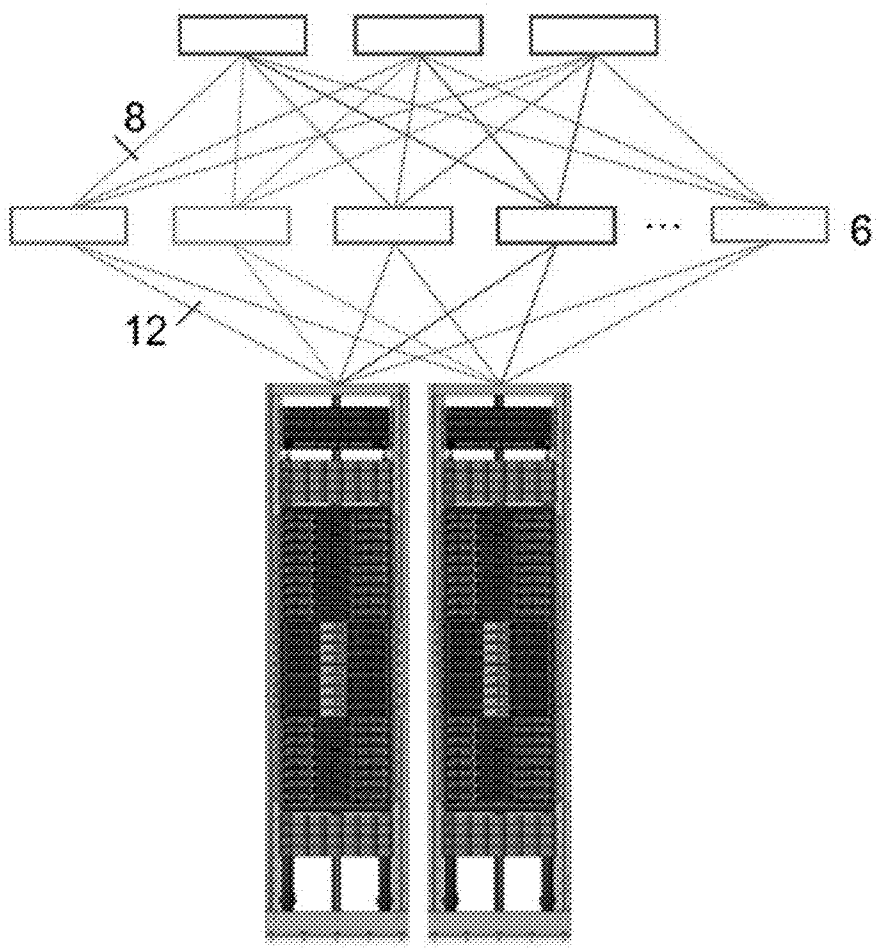
Figure 33:
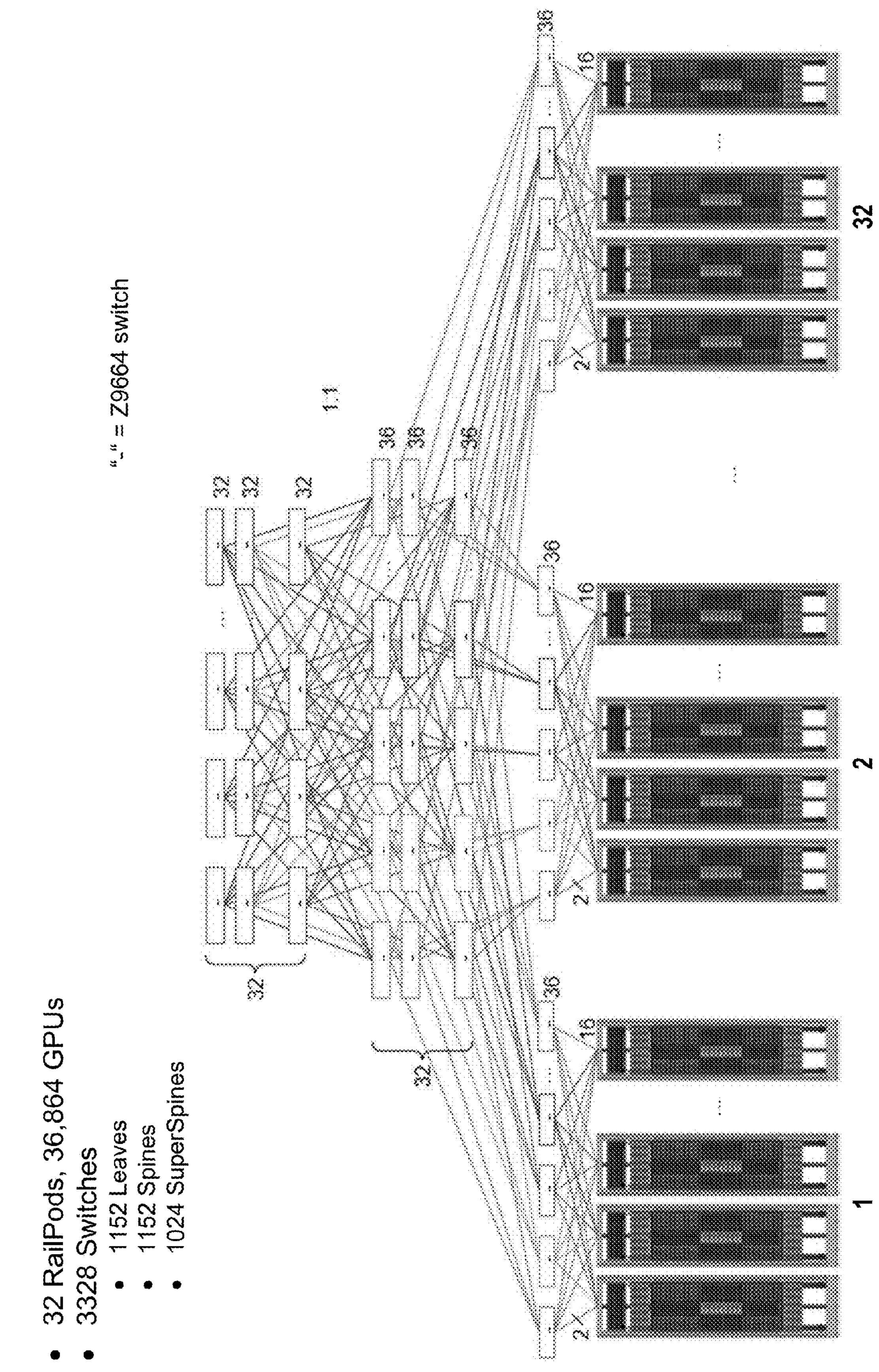
Figure 34:
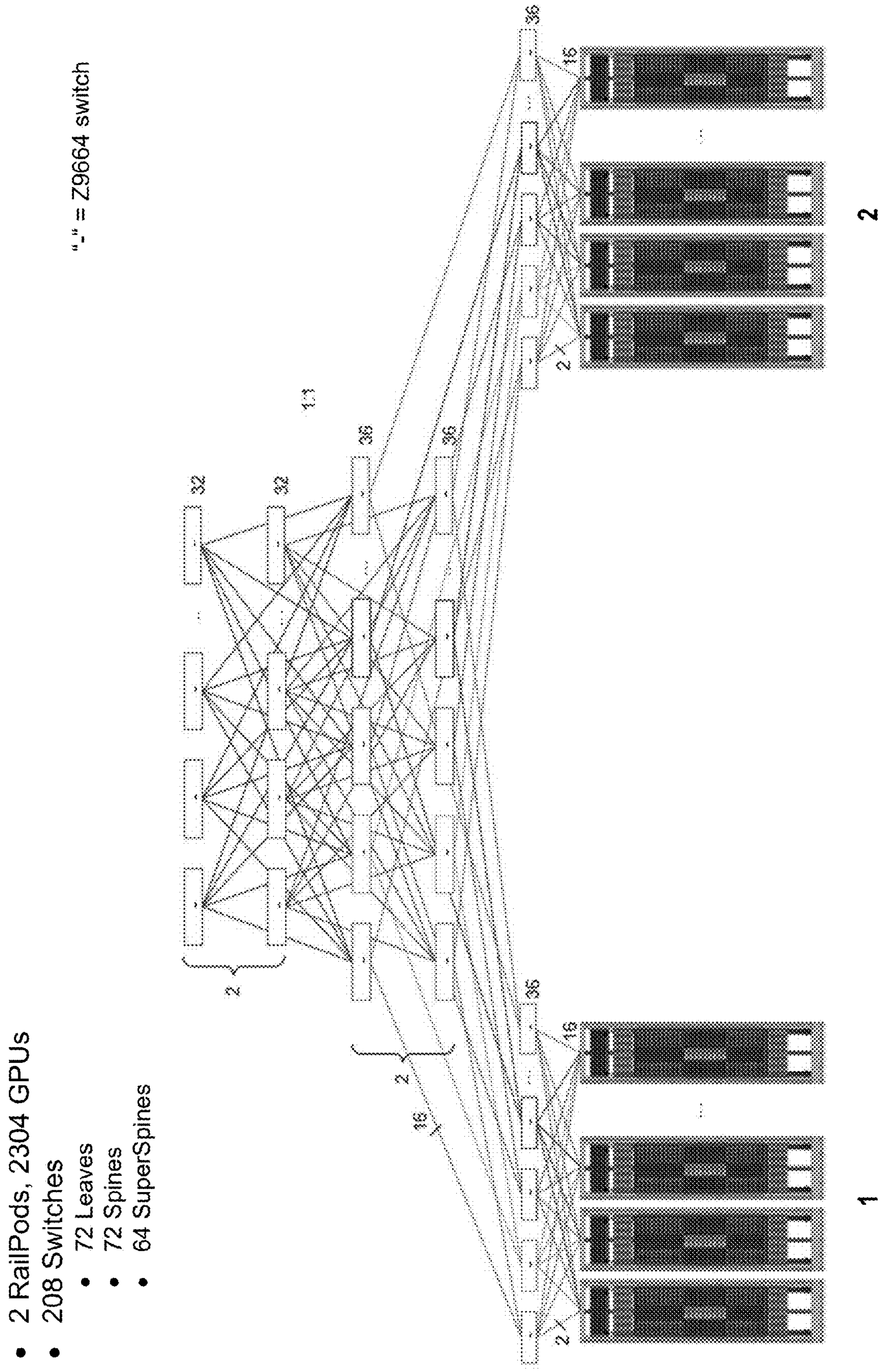

FIG. 24 comprises a table showing a comparison of different embodiments at different scales relative to the typical NVIDIA topology using the same switch (e.g., a QM9700 switch), according to embodiments of the present disclosure. FIGS. 25-31 depict different topologies, according to embodiments of the present disclosure. In FIG. 28, the topology 2805 is depicted along with an embodiment of a racking solution 2810.

Figure 35:
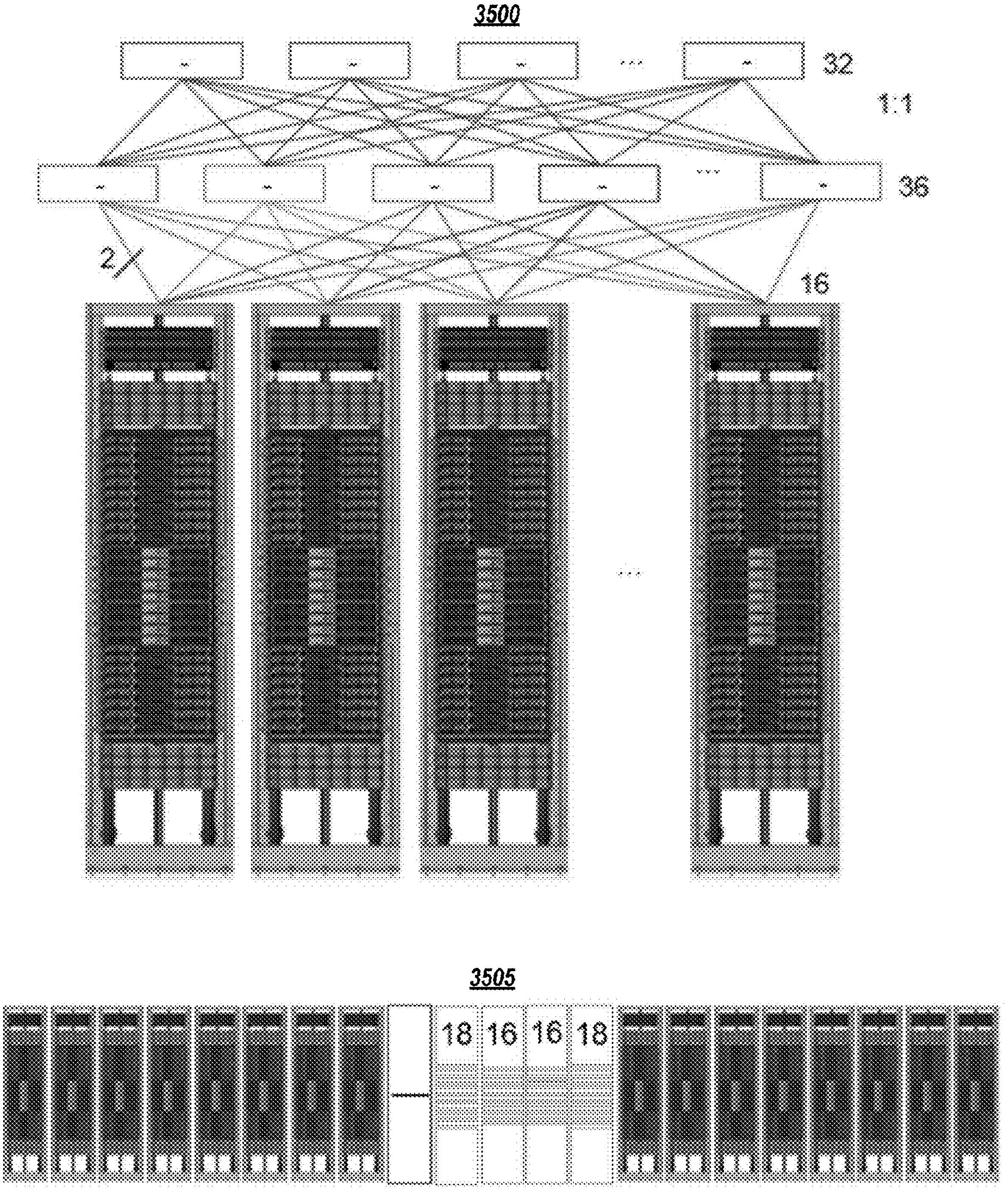
Figure 36:
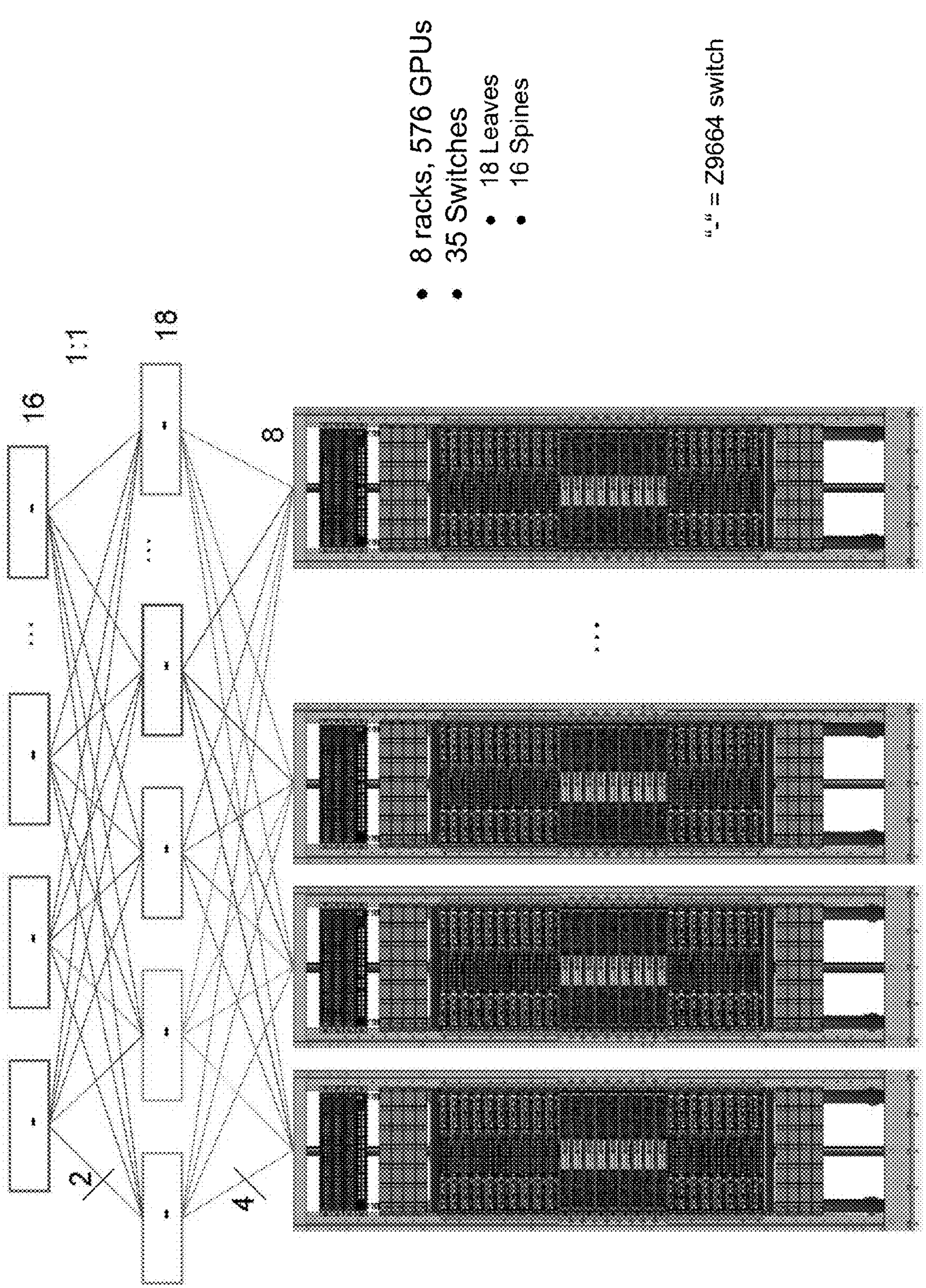
Figure 37:
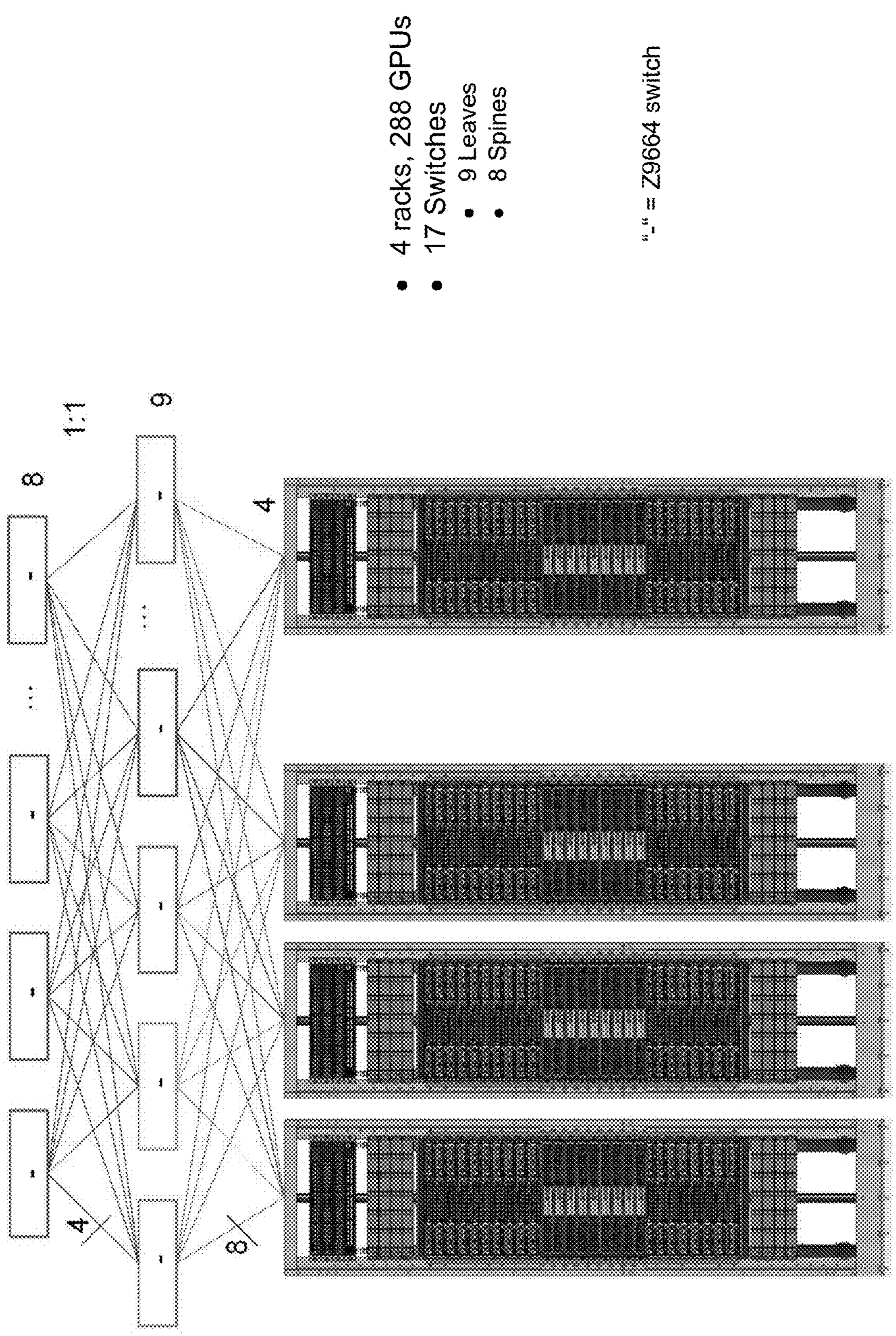

FIG. 32 comprises a table showing a comparison of different embodiments at different scales relative to the typical NVIDIA topology using a different switch (e.g., a Dell Z9664 switch), according to embodiments of the present disclosure. FIGS. 33-37 depict different topologies, according to embodiments of the present disclosure. In FIG. 35, the topology 3500 is depicted along with an embodiment of a racking solution 3505.

As previously noted, embodiments may utilize oversubscription. FIG. 38 depicts an example topology with oversubscription, according to embodiments of the present disclosure. The topology supports a cluster of 8064 GPUs and uses a 7 to 1 (7:1) oversubscription at the superspine switch tier. It shall be noted that different oversubscription ratios may be used, particularly depending upon the scale of the cluster being supported. For example, supporting a cluster of 288 GPUs may use two tiers and have a 4:1 oversubscription at the top tier, while supporting a cluster of 1152 GPUs may use two tiers and have a 5.3:1 oversubscription at the top tier.

FIG. 39 depicts a possible racking solution for the spine and superspine switches, according to embodiments of the present disclosure. As depicted, a single rack may house 18 spine switches and 4 superspine switches. Since these switches are housed within a rack, direct attach copper (DAC) cables may be used given the short travel lengths.

FIG. 40 depicts an example rack implementation for this topology, according to embodiments of the present disclosure. Note that a total of 22 racks are needed to house the equipment for the scale-out fabric of FIG. 38. By way of comparison, a cluster comprising the same number of GPUs using NVIDIA's topology requires 65 racks for its scale-out fabric, which is depicted in FIG. 41. The table in FIG. 42 compares the two topologies. Note that the embodiment topology of FIG. 38 uses far fewer switches and cables than the NVIDIA topology that supports the same number of GPUs.

FIG. 43 compares a number of different scale embodiments, according to embodiments of the present disclosure. Not only do the embodiments of the present disclosure operate more effectively by requiring fewer hops, but they also use fewer switches. Using fewer switches saves numerous resources—physical space, number of racks, less power to run because there are fewer devices, less power needed for infrastructure (e.g., cooling), fewer cables, etc.

C. Topology Design/Implementation Method Embodiments

One skilled in the art shall recognize a number of innovative aspects of embodiments of the present disclosure. One innovative aspect of one or more embodiments is the handling of network topologies given unique situations. For example, for AI/ML systems that are extremely computationally intensive and that require sharing or passing of data for model training and model deployment, speed and efficiency in data handling is not only critical but it dramatically impacts overall timing and costs.

It should also be noted that additional factors complicate the topology design. For example, a computational-intensive center, such as the ones used for AI/ML systems, may comprise different networks—a first network, which may be an inter-node fabric (e.g., a scale-up network), that connects all compute nodes of a group (e.g., all compute nodes of a rack or a set of racks) and a second network (e.g., a scale-out fabric), which connects the groups (e.g., railpods) of compute nodes. As noted above, a GPU on a compute node like those discussed herein (e.g., FIGS. 2-5) leverages two different communication interfaces: a scale-up interface and a scale-out interface.

Another complication or factor may be differences between these networks. For example, data may be preferably communicated by one network (e.g., the scale-up fabric) over the other network (e.g., the scale-out fabric). The scale-up interface may have a bandwidth approximately an order of magnitude higher than the scale-out interface.

Accordingly, strategic decisions implemented herein take into account these various factors to achieve improved topologies that exhibit at least the benefits discussed above.

Also, differences in the number of ports between a rack of compute nodes or a set of racks (i.e., a railpod) on one hand and network information handling systems (e.g., switches) on the other hand complicate the topology design. When the difference in port numbers between a group of end devices and switches is not a readily divisible/multiple integer, it complicates topologies when trying to be efficient and cost effective. Consider the following illustration.

FIG. 44 depicts a cluster 4400 of GPUs that utilizes network rails, according to embodiments of the present disclosure. A group of GPUs may be interconnected through their scale-up interfaces and may form a high-bandwidth domain (e.g., high-bandwidth domain 1 4405). In the depicted example, the GPUs within a high-bandwidth domain may be indexed from 1 to K. Note also that there may be M number of domains.

As noted above, the number of ports of a set of GPUs may have a mismatch between the number of ports of switches, which is illustrated in FIG. 45. By way of illustration of the port number mismatch, consider an NVL72 rack 4500 that is graphically depicted in FIG. 45. It contains 72 ports, which may be represented in prime factorization as 23×32. In contrast, the radix of most switches is base 2 (e.g., 32 ports, 64 ports, 128 ports, etc.), which creates a mismatch. The chart 4505 depicts the various prime factorization of the number of GPU rails mapped to the number of network rails. A GPU rail may be defined as a set of GPUs with the same index on different high bandwidth domains, and a network rail (or rail) may be defined as a set of switches in the scale-out fabric through which one or more GPU rails are connected. Different options may be selected. Prior approaches use a limited number of network rails. For example, as noted above, NVIDIA suggests using 4 network rails mapped to 18 GPU rails (row 4510). However, in one or more embodiments, each network rail should minimize the number of GPU rails mapped over it; at large scales, each network rail may preferably carry one GPU rail. Therefore, an example of an improved topology may utilize many more rails (e.g., row 4515 in which 18 network rails are used).

Another factor to consider is the interplay between using rails and that there are two distinct networks employed. Embodiments appreciate that the scale-up fabric—not the scale-out fabric—should be the default pathway to cross rails. In one or more embodiments, rails may not be oversubscribed and may be extended from the first tier to one or more additional tiers (e.g., to the third tier, depending upon embodiment). In one or more embodiments, crossing rails in the scale-out fabric (if it happens) occurs at the second or third tier, depending on embodiment and data traffic. Also, in one or more embodiments, if rails do not extend to the tier where scale-out cross rail happens, that tier may be oversubscribed because, at least in part, that tier is used when other links/pathways have failed.

Other factors to consider are the physical configuration/layout of the compute node/GPUs, leaf switches, spine switches, and if needed, superspine switches. The number and arrangement (e.g., same rack, adjacent rack, or distance rack) of the devices, which may be the same and/or different devices, including same devices functioning in different capacities can dramatically affect cost and performance. For example, the distance between devices may affect whether copper cables can be used, which are less expensive than optical cables but support a much shorter reach (e.g., around 2 meters for passive copper cables and 3-5 meters for active copper cables). Consider the layout depicted in FIG. 6. The fewer number of leaf switches allows them to be placed closer to the end devices, which allows for copper cabling. However, optical cabling (and switch transceivers) must be used for the other switches. In contrast, in one or more embodiments, copper cabling may be used between spine and superspine switches. Consider the spine-superspine switch core 2305 depicted in FIG. 23. The close proximity of these switches allows for the use of copper cables. FIG. 20 also depicts and discusses the use of copper cabling, according to embodiments of the present disclosure. It shall be noted that, depending upon the size of the cluster and the embodiment, copper cables may be used in other places, such as between leaf switches and spine switches.

Topology embodiments herein contemplate and consider these factors for the improved topologies.

FIG. 46 depicts a methodology for configuring a topology, according to embodiments of the present disclosure. In one or more embodiments, strategic implementations may comprise having (4605) as many rails as allowed by the radix of the switches used in the scale-out fabric (e.g., 36 rails for 64-port switches, 72 rails for 128-port switches, etc.). In one or more embodiments, strategic implementations may also comprise having the rails span (4610) a minimum number of tiers possible (e.g., restricting them to the first tier or to the first and second tiers) and use any additional tier or tiers for the rail crossing function.

In one or more embodiments, given a set of one or more railpods, in which each railpod comprises a plurality of racks and each rack comprises a set of compute nodes, n number of ports, and a first network that interconnects processors of the compute nodes, a method for configuring a network topology may comprise the following steps. The processor (e.g., GPUs) of each rack may be connected via a number of connections (c) to a set of leaf switches (l) in which: c×l equals an integer divisor of the number of ports (n) of a rack; each leaf switch forms a rail; and the number of ports of a leaf switch of the set of leaf switches is not an integer multiple of number of ports (n) of a rack. Responsive to extending the rails to a second tier comprising spine switches (e.g., depending upon the size of the cluster), the leaf switches may be connected to sets of two or more spine switches, in which: the number of sets of two or more spine switches is an equal number as leaf switches; each set of two or more spine switches corresponds to a rail; and within a rail, each leaf switch is connected to the spine switches with a number of connections dependent upon a cluster scale. In one or more embodiments, each of the sets of spine switches may be connected to a corresponding row of superspine switches to facilitate data crossing rails.

1. Radix 64 Switches Embodiments

For topologies that are utilizing radix 64 switches and a rack comprising compute nodes having a total of 72 ports, the following example methodology may be employed.

- The racks (e.g., NVL72 racks) may be organized into railpods, in which each railpod comprises 16 racks.
- Each rack may be connected with two links to a set of 36 leaf switches, in which each leaf switch represents one network rail.
- The leaf switches may be connected to 36 groups of spine switches, one per each network rail, and each group of spine switches comprise two to 32 switches, depending on the size of the cluster (in which a cluster represents the total number of GPUs in the network).
- Within a rail, each leaf switch is connected to the spine switches with a number of links dependent on the GPU cluster scale—from 16 (small scale) to 1 (largest scale).
- Note that the leaf switches are fully populated, in which all 64 ports of each leaf switch are used.
- Each of the 36-switch rows of spine switches is connected to a corresponding row of 32 superspine switches for the rail crossing function;
- Note that, in one or more embodiments, the spine switches may be fully populated, with all 64 ports used, while the superspine switches may be sparsely populated (e.g., 36 out of 64 ports used).
- In one or more embodiments, the superspine tier may be oversubscribed for rail crossing without affecting performance.

2. Radix 128 Switches Embodiments

For topologies that are utilizing radix 128 switches and a rack comprising compute nodes having a total of 72 ports, the following example methodology may be employed.

- The racks (e.g., NVL72 racks) may be organized into railpods, in which each railpod comprises 64 racks.
- Each rack may be connected with two links to a set of 72 leaf switches, in which each leaf switch represents one network rail.
- The leaf switches may be connected to 72 groups of spine switches, one per each network rail, and each group of spine switches comprises two to 64 switches, depending on the size of the cluster.
- Within a rail, each leaf switch may be connected to the spine switches with a number of links dependent on the GPU cluster scale—from 32 (small scale) to 1 (largest scale).
- Note that the leaf switches are fully populated, with all 128 ports used.
- Each of the 72-switch rows of spine switches may be connected to a corresponding row of 64 superspine switches for the rail crossing function. In one or more embodiments, the spine switches may be fully populated, with all 128 ports used, while the superspine switches are sparsely populated (e.g., 72 out of 128 ports used).

In one or more embodiments, the superspine tier may be oversubscribed for rail crossing without affecting performance.

3. Embodiments when Small Form Factor Pluggable Modules are Used

Note that alternative embodiments of topologies exist for switches using small form factor pluggable modules, such as OSFPs (Octal Small Form Factor Pluggable).

a) Radix 64 Switches Embodiments with OSFPs

For topologies that are utilizing radix 64 switches with OSFPs and a rack comprising compute nodes having a total of 72 ports, the following example methodology may be employed.

- The racks (e.g., NVL72 racks) may be organized into railpods, in which each railpod comprises 8 racks.
- Each NVL72 rack may be connected with four links to 18 leaf switches, one per each rail.
- The leaf switches may be connected to 18 groups of spine switches, one per each rail, and each group of spine switches comprise two to 32 switches, depending on the size of the cluster.
- Within a rail, each leaf switch may be connected to the spine switches with a number of links dependent on the GPU cluster scale—from 16 (small scale) to 1 (largest scale).
- Note that, in one or more embodiments, the leaf switches are fully populated, with all 64 ports used.
- Each of the 18-switch rows of spine switches may be connected to a corresponding row of 16 superspine switches for the rail crossing function.
- In one or more embodiments, the spine switches are fully populated, with all 64 ports used, while the superspine switches may be sparsely populated (e.g., 36 out of 64 ports used).
- The superspine tier may be oversubscribed for rail crossing without affecting performance.

b) Radix 128 Switches Embodiments with OSFPs

For topologies that are utilizing radix 128 switches with OSFPs and a rack comprising compute nodes having a total of 72 ports, the following example methodology may be employed.

- The racks (e.g., NVL72 racks) may be organized into railpods, in which each railpod comprises 32 racks.
- Each rack may be connected with one link to 36 leaf switches, one per each rail.
- The leaf switches may be connected to 36 groups of spine switches, one per each rail, and each group of spine switches comprise two to 32 switches, depending on the size of the cluster.
- Within a rail, each leaf switch may be connected to the spine switches with a number of links dependent on the GPU cluster scale—from 32 (small scale) to 1 (largest scale).

In one or more embodiments, the leaf switches are fully populated, with all 128 ports used.

Each of the 36-switch rows of spine switches may be connected to a corresponding row of 32 superspine switches for the rail crossing function.

In one or more embodiments, the spine switches are fully populated, with all 128 ports used, while the superspine switches may be sparsely populated (e.g., 72 out of 128 ports used).

The superspine tier may be oversubscribed for rail crossing without affecting performance.

D. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

FIG. 47 depicts a simplified block diagram of an information handling system (or computing system), according to embodiments of the present disclosure. It will be understood that the functionalities shown for system 4700 may operate to support various embodiments of a computing system—although it shall be understood that a computing system may be differently configured and include different components, including having fewer or more components as depicted in FIG. 47.

As illustrated in FIG. 47, the computing system 4700 includes one or more CPUs 4701 that provides computing resources and controls the computer. CPU 4701 may be implemented with a microprocessor or the like and may also include one or more graphics processing units (GPU) 4702 and/or a floating-point coprocessor for mathematical computations. In one or more embodiments, one or more GPUs 4702 may be incorporated within the display controller 4709, such as part of a graphics card or cards. In one or more embodiments, the system may alternatively or additionally include one or more data processing units (DPUs) (not shown). In the realm of data centers and cloud computing, a DPU refers to a specialized processing unit designed to accelerate data processing tasks. DPUs are typically optimized for handling data-centric workloads such as networking, storage, security, and other tasks related to data processing and manipulation. DPUs often offload specific tasks from a main CPU, allowing for improved performance, efficiency, and scalability in data-intensive applications. They may include specialized hardware components and dedicated software to efficiently process and manage data flows within a system. The system 4700 may also include a system memory 4719, which may comprise RAM, ROM, or both.

A number of controllers and peripheral devices may also be provided, as shown in FIG. 47. An input controller 4703 represents an interface to various input device(s) 4704, such as a keyboard, mouse, touchscreen, stylus, microphone, camera, trackpad, display, etc. The computing system 4700 may also include a storage controller 4707 for interfacing with one or more storage devices 4708 each of which includes a storage medium such as magnetic tape or disk, or an optical medium that might be used to record programs of instructions for operating systems, utilities, and applications, which may include embodiments of programs that implement various aspects of the present disclosure. Storage device(s) 4708 may also be used to store processed data or data to be processed in accordance with the disclosure. The system 4700 may also include a display controller 4709 for providing an interface to a display device 4711, which may be a cathode ray tube (CRT) display, a thin film transistor (TFT) display, organic light-emitting diode, electroluminescent panel, plasma panel, or any other type of display. The computing system 4700 may also include one or more peripheral controllers or interfaces 4705 for one or more peripherals 4706. Examples of peripherals may include one or more printers, scanners, input devices, output devices, sensors, and the like. A communications controller 4714 may interface with one or more communication devices 4715, which enables the system 4700 to connect to remote devices through any of a variety of networks including the Internet, a cloud resource (e.g., an Ethernet cloud, a Fibre Channel over Ethernet (FCOE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 4700 comprises one or more fans or fan trays 4718 and a cooling subsystem controller or controllers 4717 that monitors thermal temperature(s) of the system 4700 (or components thereof) and operates the fans/fan trays 4718 to help regulate the temperature.

In the illustrated system, all major system components may connect to a bus 4716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

FIG. 48 depicts an alternative block diagram of an information handling system, according to embodiments of the present disclosure. It will be understood that the functionalities shown for system 4800 may operate to support various embodiments of the present disclosure—although it shall be understood that such system may be differently configured and include different components, additional components, or fewer components.

The information handling system 4800 may include a plurality of I/O ports 4805, a network processing unit (NPU) 4815, one or more tables 4820, and a CPU 4825. The system includes a power supply (not shown) and may also include other components, which are not shown for sake of simplicity.

In one or more embodiments, the I/O ports 4805 may be connected via one or more cables to one or more other network devices or clients. The network processing unit 4815 may use information included in the network data received at the node 4800, as well as information stored in the tables 4820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim may be arranged differently including having multiple dependencies, configurations, and combinations.

What is claimed is:

1. A method for configuring a network topology comprising:

given a set of one or more railpods, in which each railpod comprises a plurality of racks and each rack comprises:
a set of compute nodes;
n number of ports; and
a first network that interconnects processors of the compute nodes;
connecting each rack via a number of connections (c) to a set of leaf switches (l) in which:
c×l equals an integer divisor of the number of ports (n) of a rack;
each leaf switch forms a rail; and
the number of ports of a leaf switch of the set of leaf switches is not an integer multiple of the number of ports (n) of a rack; and
responsive to extending the rails to a second tier comprising spine switches:
connecting the leaf switches to sets of two or more spine switches, in which:
each set of two or more spine switches corresponds to a rail; and
within a rail, each leaf switch is connected to the spine switches with a number of connections dependent upon a cluster scale; and
connecting each of the sets of spine switches to a corresponding row of superspine switches to facilitate data crossing rails.

2. The method of claim 1 wherein:
the number of sets of two or more spine switches is an equal to the number as of leaf switches.

3. The method of claim 1 wherein:
the leaf switches are fully populated, in which all ports of each leaf switch are used; and
the spine switches are fully populated, in which all ports of each spine switch are used.

4. The method of claim 1 wherein:
the superspine switches represent a superspine tier and the superspine tier is oversubscribed.

5. The method of claim 1 wherein:
the number of ports (n) of a rack is 72.

6. The method of claim 5 wherein a number of ports for each of the leaf switches and the spine switches is 64.

7. The method of claim 6 wherein:
a railpod comprises 16 racks;

the number of leaf switches (l) in the set of leaf switches is 36; and the number of connections (c) for each rack in the railpod to each leaf switch in the set of 36 leaf switches is 2 connections.

8. The method of claim 6 wherein dual-port small form factor pluggable modules are used in one or more connections and the method further comprises:

a railpod comprises 8 racks;

the number of leaf switches (l) in the set of leaf switches is 18; and the number of connections (c) for each rack in the railpod to each leaf switch in the set of 18 leaf switches is 4 connections.

9. The method of claim 5 wherein a number of ports for each of the leaf switches and the spine switches is 128.

10. The method of claim 9 wherein:

a railpod comprises 64 racks;

the number of leaf switches (l) in the set of leaf switches is 72; and the number of connections (c) for each rack in the railpod to each leaf switch in the set of 72 leaf switches is one connection.

11. The method of claim 9 wherein dual-port small form factor pluggable modules are used in one or more connections and the method further comprises:

a railpod comprises 32 racks;

the number of leaf switches (l) in the set of leaf switches is 36; and the number of connections (c) for each rack in the railpod to each leaf switch in the set of 36 leaf switches is 2 connections.

12. A network system comprising:

a set of processors, in which each processor comprises two corresponding interfaces-one interface for connecting to a scale-up network and one interface for connecting to a scale-out network; and a scale-out network using radix-64 switches or a scale-out network using radix-128 switches, wherein, when the scale-out network uses radix-64 switches, the scale-out network comprises:

the set of processors grouped in a railpod comprising 16 groups of 72 processors;

36 leaf switches for connecting each group of 72 processors to the 36 leaf switches via two links, in which each leaf switch is a network rail;

groups of 36 spine switches for connecting to the 36 leaf switches, in which each group of 36 spine switches is a network rail corresponding to the network rail of its connected leaf switch; and groups of 32 superspine switches for connecting to the groups of 36 spine switches, in which each group of 32 superspine switches is configured to connect with a corresponding group of 36 spine switches; and wherein, when the scale-out network uses radix-128 switches, the scale-out network comprises:

the set of processors grouped in a railpod comprising 64 groups of 72 processors;

72 leaf switches for connecting each group of 72 processors to the 72 leaf switches via one link, in which each leaf switch is a network rail;

groups of 72 spine switches for connecting to the 72 leaf switches, in which each group of 72 spine switches is a network rail corresponding to the network rail of its connected leaf switch; and groups of 64 superspine switches for connecting to the groups of 72 spine switches, in which each group of 64 superspine switches is configured to connect with a corresponding group of 72 spine switches.

13. The network system of claim 12 wherein:

for the scale-out network using radix-64 switches, each group of spine switches comprises two to 32 switches, depending on the number of processors in the network system; and for the scale-out network using radix-128 switches, each group of spine switches comprises two to 64 switches, depending on the number of processors in the network system.

14. The network system of claim 12 wherein rail crossing data transmissions occur only at the superspine switches.

15. The network system of claim 12 wherein the leaf switches are fully populated and the superspine switches are oversubscribed.

16. A network system comprising:

a set of processors, in which each processor comprises two corresponding interfaces-one interface for connecting to a scale-up network and one interface for connecting to a scale-out network; and a scale-out network built using radix-64 switches that use dual-port Small Form Factor Pluggable (SFP) connectors or a scale-out network built using radix-128 switches that use dual-port SFP connectors, wherein, when the scale-out network uses radix-64 switches, the scale-out network comprises:

the set of processors grouped in a railpod comprising 8 groups of 72 processors;

18 leaf switches for connecting each group of 72 processors to the 18 leaf switches via four links, in which each leaf switch is a network rail;

groups of 18 spine switches for connecting to the 18 leaf switches, in which each group of 18 spine switches is a network rail corresponding to the network rail of its connected leaf switch; and groups of 16 superspine switches for connecting to the groups of 18 spine switches, in which each group of 16 superspine switches is configured to connect with a corresponding group of 18 spine switches; and wherein, when the scale-out network uses radix-128 switches, the scale-out network comprises:

the set of processors grouped in a railpod comprising 32 groups of 72 processors;

36 leaf switches for connecting each group of 72 processors to the 36 leaf switches via two links, in which each leaf switch is a network rail;

groups of 36 spine switches for connecting to the 36 leaf switches, in which each group of 36 spine switches is a network rail corresponding to the network rail of its connected leaf switch; and groups of 32 superspine switches for connecting to the groups of 36 spine switches, in which each group of 32 superspine switches is configured to connect with a corresponding group of 36 spine switches.

17. The network system of claim 16 wherein:

for the scale-out network built using radix-64 switches, each group of spine switches comprises two to 32 switches, depending on the number of processors in the network system; and for the scale-out network built using radix-128 switches, each group of spine switches comprises two to 32 switches, depending on the number of processors in the network system.

18. The network system of claim 16 wherein:

for the scale-out network built using radix-64 switches, each leaf switch is connected to its corresponding group of spine switches via a number of links ranging from 16 to 1 depending on the number of processors in the network system; and for the scale-out network built using radix-128 switches, each leaf switch is connected to its corresponding group of spine switches via a number of links ranging from 32 to 1 depending on the number of processors in the network system.

19. The network system of claim 16 wherein the superspine switches are used for rail crossing data transmissions.

20. The network system of claim 16 wherein the leaf switches are fully populated and the superspine switches are oversubscribed.

* * * * *